US010664787B2

(12) United States Patent
Parris

(10) Patent No.: US 10,664,787 B2
(45) Date of Patent: May 26, 2020

(54) CUSTOMER CONTROLLED MANAGEMENT OF SHIPMENTS

(71) Applicant: United Parcel Service of America, Inc., Atlanta, GA (US)

(72) Inventor: Carrie Parris, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 793 days.

(21) Appl. No.: 14/049,605

(22) Filed: Oct. 9, 2013

(65) Prior Publication Data

US 2015/0100513 A1 Apr. 9, 2015

(51) Int. Cl.
*G06Q 10/08* (2012.01)

(52) U.S. Cl.
CPC ....... *G06Q 10/083* (2013.01); *G06Q 10/0837* (2013.01)

(58) Field of Classification Search
CPC ............ G06Q 10/083; G06Q 10/0837; G06Q 10/087; B07C 3/02
USPC ..................................................... 705/340, 2
See application file for complete search history.

(56) References Cited

U.S. PATENT DOCUMENTS

| | | |
|---|---|---|
| 3,721,096 A | 3/1973 | Deckert, Jr. et al. |
| 3,876,059 A | 4/1975 | Durst |
| 3,933,031 A | 1/1976 | Uhlarik |
| 4,111,601 A | 9/1978 | Richard |
| 4,832,204 A | 5/1989 | Handy et al. |
| 5,153,842 A | 10/1992 | Dlugos, Sr. et al. |
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,460,110 A | 10/1995 | Eronen et al. |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,659,731 A | 8/1997 | Gustafson |
| 5,668,543 A | 9/1997 | Jones |
| 5,711,670 A | 1/1998 | Barr |
| 5,786,748 A | 7/1998 | Nikolic et al. |
| 5,831,860 A | 11/1998 | Foladare et al. |

(Continued)

FOREIGN PATENT DOCUMENTS

| | | |
|---|---|---|
| CN | 1643534 A | 7/2005 |
| CN | 101203873 A | 6/2008 |

(Continued)

OTHER PUBLICATIONS

United States Patent and Trademark Office, Office Action for U.S. Appl. No. 10/696,180, dated Mar. 13, 2014, 30 pages, USA.

(Continued)

*Primary Examiner* — Hiep V Nguyen

(74) *Attorney, Agent, or Firm* — Shook, Hardy & Bacon L.L.P.

(57) ABSTRACT

Computer program products, methods, systems, apparatus, and computing entities are provided for customer controlled management of shipments. For example, customers can define handling identifiers to determine how items should be handled based on the handling identifier. Further, customers can define refund classifications to determine when refunds should be initiated.

18 Claims, 33 Drawing Sheets

(56) References Cited

U.S. PATENT DOCUMENTS

| | | |
|---|---|---|
| 5,835,377 A | 11/1998 | Bush |
| 5,884,272 A | 3/1999 | Walker et al. |
| 6,029,140 A | 2/2000 | Martin et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,292,709 B1 | 9/2001 | Uhl et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,422,506 B1 | 7/2002 | Colby |
| 6,442,589 B1 | 8/2002 | Takahashi et al. |
| 6,463,354 B1 | 10/2002 | Pintsov |
| 6,463,420 B1 | 10/2002 | Guidice et al. |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,606,604 B1 | 8/2003 | Dutta |
| 6,618,668 B1 | 9/2003 | Laird |
| 6,634,551 B2 | 10/2003 | Barta et al. |
| 6,683,542 B1 | 1/2004 | Jones |
| 6,700,507 B2 | 3/2004 | Jones |
| 6,701,299 B2 | 3/2004 | Kraisser et al. |
| 6,714,859 B2 | 3/2004 | Jones |
| 6,741,927 B2 | 5/2004 | Jones |
| 6,748,318 B1 | 6/2004 | Jones |
| 6,748,320 B2 | 6/2004 | Jones |
| 6,763,299 B2 | 7/2004 | Jones |
| 6,763,300 B2 | 7/2004 | Jones |
| 6,765,487 B1 | 7/2004 | Holmes et al. |
| 6,772,130 B1 | 8/2004 | Karbowski et al. |
| 6,804,606 B2 | 10/2004 | Jones |
| 6,845,448 B1 | 1/2005 | Chaganti et al. |
| 6,859,722 B2 | 2/2005 | Jones |
| 6,862,612 B1 | 3/2005 | Horn et al. |
| 6,902,109 B2 | 6/2005 | Barta et al. |
| 6,904,359 B2 | 6/2005 | Jones |
| 6,931,314 B2 | 8/2005 | Holland et al. |
| 6,952,645 B1 | 10/2005 | Jones |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,994,253 B2 | 2/2006 | Miller et al. |
| 7,028,895 B2 | 4/2006 | Ashaari |
| 7,030,781 B2 | 4/2006 | Jones |
| 7,031,959 B2 | 4/2006 | Garner et al. |
| 7,039,813 B2 | 5/2006 | Algazi et al. |
| 7,130,803 B1 | 10/2006 | Couch et al. |
| 7,152,375 B1 | 12/2006 | Mastro et al. |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,257,552 B1 | 8/2007 | Franco |
| 7,305,404 B2 | 12/2007 | Owens et al. |
| 7,312,702 B1 | 12/2007 | Willms et al. |
| 7,331,248 B2 | 2/2008 | Maresca, Jr. et al. |
| 7,363,126 B1 | 4/2008 | Zhong et al. |
| 7,376,598 B2 | 5/2008 | Estes et al. |
| 7,385,499 B2 | 6/2008 | Horton et al. |
| 7,422,149 B2 | 9/2008 | Aptekar |
| 7,479,899 B2 | 1/2009 | Horstemeyer |
| 7,501,946 B2 | 3/2009 | Lanigan et al. |
| 7,511,617 B2 | 3/2009 | Burman |
| 7,528,722 B2 | 5/2009 | Nelson |
| 7,531,163 B2 | 5/2009 | Samadpour |
| 7,542,972 B2 | 6/2009 | Owens et al. |
| 7,574,366 B2 | 8/2009 | Burman |
| 7,580,845 B2 | 8/2009 | Burman |
| 7,624,024 B2 | 11/2009 | Levis et al. |
| 7,647,231 B2 | 1/2010 | Kuebert et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins |
| 7,912,854 B2 | 3/2011 | Owens et al. |
| 7,925,524 B2 | 4/2011 | Florence |
| 7,962,422 B1 | 6/2011 | Melechko et al. |
| 7,969,306 B2 | 6/2011 | Ebert et al. |
| 7,984,289 B2 | 7/2011 | Orbke et al. |
| 7,996,328 B1 | 8/2011 | Lundberg et al. |
| 8,015,023 B1 | 9/2011 | Lee et al. |
| 8,027,933 B2 | 9/2011 | Lou et al. |
| 8,036,993 B2 | 10/2011 | Estes |
| 8,068,930 B2 | 11/2011 | Perez et al. |
| 8,103,521 B2 | 1/2012 | Kuebert et al. |
| 8,103,716 B2 | 1/2012 | Boyce et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,291,234 B2 | 10/2012 | Snapp et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,386,516 B2 | 2/2013 | Owens et al. |
| 8,429,019 B1 | 4/2013 | Yeatts et al. |
| 8,463,568 B1 | 6/2013 | Wynn |
| 8,489,520 B2 | 7/2013 | Kuebert et al. |
| 8,554,694 B1 | 10/2013 | Ward et al. |
| 8,577,802 B1 | 11/2013 | Nichols et al. |
| 8,645,232 B1 | 2/2014 | Cole et al. |
| 8,731,699 B2 | 5/2014 | Nagy et al. |
| 8,736,633 B2 | 5/2014 | Gurusamy |
| 8,812,374 B1 | 8/2014 | Sriram et al. |
| 9,032,032 B2 | 5/2015 | Mills et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0032573 A1 | 3/2002 | Williams et al. |
| 2002/0032612 A1 | 3/2002 | Williams et al. |
| 2002/0032623 A1 | 3/2002 | Wheeler et al. |
| 2002/0042808 A1 | 4/2002 | Smith et al. |
| 2002/0070882 A1 | 6/2002 | Jones |
| 2002/0073039 A1 | 6/2002 | Ogg et al. |

(56) References Cited

U.S. PATENT DOCUMENTS

| | | |
|---|---|---|
| 2002/0082770 A1 | 6/2002 | Jones |
| 2002/0087371 A1 | 7/2002 | Abendroth |
| 2002/0103724 A1 | 8/2002 | Huxter |
| 2002/0107820 A1 | 8/2002 | Huxter |
| 2002/0111914 A1 | 8/2002 | Terada et al. |
| 2002/0120475 A1 | 8/2002 | Morimoto |
| 2002/0130065 A1 | 9/2002 | Bloom |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0178074 A1 | 11/2002 | Bloom |
| 2003/0003936 A1 | 1/2003 | Tighe |
| 2003/0004893 A1 | 1/2003 | Blaesche |
| 2003/0032573 A1 | 2/2003 | Tanner et al. |
| 2003/0036938 A1 | 2/2003 | Dutta et al. |
| 2003/0037009 A1 | 2/2003 | Tobin et al. |
| 2003/0074411 A1 | 4/2003 | Nale |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0182017 A1 | 9/2003 | O'Donohue et al. |
| 2003/0193414 A1 | 10/2003 | Jones |
| 2003/0195811 A1 | 10/2003 | Hayes et al. |
| 2004/0030478 A1 | 2/2004 | Holland et al. |
| 2004/0073499 A1 | 4/2004 | Martin et al. |
| 2004/0088224 A1 | 5/2004 | Mukai |
| 2004/0093312 A1 | 5/2004 | Cordery et al. |
| 2004/0117326 A1 | 6/2004 | Amato |
| 2004/0133446 A1 | 7/2004 | Myrick et al. |
| 2004/0149824 A1 | 8/2004 | Miller et al. |
| 2004/0158351 A1 | 8/2004 | Rivalto |
| 2004/0193438 A1* | 9/2004 | Stashluk, Jr. ............ G06Q 10/08 705/304 |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215531 A1* | 10/2004 | Stashluk, Jr. ......... G06Q 10/087 705/28 |
| 2004/0227630 A1 | 11/2004 | Shannon et al. |
| 2004/0241644 A1 | 12/2004 | Samadpour |
| 2004/0243430 A1 | 12/2004 | Horstemeyer |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0038758 A1 | 2/2005 | Hilbush et al. |
| 2005/0043845 A1 | 2/2005 | Wiechers |
| 2005/0071258 A1 | 3/2005 | Kumakawa |
| 2005/0080638 A1 | 4/2005 | Maseruka |
| 2005/0082752 A1 | 4/2005 | Acosta |
| 2005/0104716 A1 | 5/2005 | Simms et al. |
| 2005/0114221 A1* | 5/2005 | Walters ............... G06Q 10/0837 705/340 |
| 2005/0177387 A1 | 8/2005 | Mojsa |
| 2005/0216144 A1 | 9/2005 | Baldassa |
| 2005/0216294 A1 | 9/2005 | Labow |
| 2005/0216553 A1 | 9/2005 | Mallonee et al. |
| 2005/0251402 A1 | 11/2005 | Olsen et al. |
| 2005/0252596 A1 | 11/2005 | Olsen et al. |
| 2006/0010037 A1 | 1/2006 | Angert et al. |
| 2006/0022895 A1 | 2/2006 | Kodger, Jr. |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0074729 A1 | 4/2006 | Capotosto et al. |
| 2006/0085273 A1 | 4/2006 | Mayer et al. |
| 2006/0097896 A1 | 5/2006 | Jones |
| 2006/0100970 A1 | 5/2006 | Morony et al. |
| 2006/0149577 A1 | 7/2006 | Stashluk et al. |
| 2006/0229895 A1 | 10/2006 | Kodger, Jr. |
| 2006/0248941 A1 | 11/2006 | Maresca et al. |
| 2006/0255136 A1 | 11/2006 | Wagner et al. |
| 2006/0282277 A1 | 12/2006 | Ng |
| 2007/0000989 A1 | 1/2007 | Kadaba |
| 2007/0005452 A1 | 1/2007 | Klingenberg et al. |
| 2007/0078797 A1 | 4/2007 | Won et al. |
| 2007/0083410 A1 | 4/2007 | Hanna |
| 2007/0133876 A1 | 6/2007 | Chande et al. |
| 2007/0150533 A1 | 6/2007 | Krause et al. |
| 2007/0156415 A1 | 7/2007 | Foth et al. |
| 2007/0156439 A1 | 7/2007 | Fyda et al. |
| 2007/0192191 A1 | 8/2007 | Neal et al. |
| 2007/0200671 A1 | 8/2007 | Kelley et al. |
| 2007/0202802 A1 | 8/2007 | Kallio et al. |
| 2007/0257774 A1 | 11/2007 | Stumpert et al. |
| 2008/0004995 A1 | 1/2008 | Klingenberg et al. |
| 2008/0125959 A1 | 5/2008 | Doherty et al. |
| 2008/0133261 A1 | 6/2008 | Ray |
| 2008/0154781 A1 | 6/2008 | Kumar |
| 2008/0162241 A1 | 7/2008 | Betancourt |
| 2008/0172305 A1 | 7/2008 | Estes et al. |
| 2008/0201155 A1 | 8/2008 | Som |
| 2008/0208772 A1 | 8/2008 | Rundle |
| 2008/0210749 A1 | 9/2008 | Skaaksrud et al. |
| 2008/0221913 A1 | 9/2008 | Cook et al. |
| 2008/0223940 A1 | 9/2008 | Lee et al. |
| 2008/0264834 A1* | 10/2008 | Olsen ..................... B07C 7/005 209/547 |
| 2008/0281719 A1 | 11/2008 | Hall et al. |
| 2008/0312991 A1 | 12/2008 | Bharadwaj et al. |
| 2008/0319970 A1 | 12/2008 | Garner et al. |
| 2008/0320092 A1 | 12/2008 | Campbell et al. |
| 2009/0012802 A1 | 1/2009 | Pinney |
| 2009/0046892 A1 | 2/2009 | Avant et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0164390 A1 | 6/2009 | Calman et al. |
| 2009/0173672 A1 | 7/2009 | Avant et al. |
| 2009/0187489 A1 | 7/2009 | Mallick et al. |
| 2009/0269760 A1 | 10/2009 | Samadpour |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2009/0327361 A1 | 12/2009 | Mills et al. |
| 2010/0004960 A1 | 1/2010 | Frankenberg et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100229 A1* | 4/2010 | Whitson ............ G06Q 10/087 700/225 |
| 2010/0100497 A1 | 4/2010 | Kuebert et al. |
| 2010/0121689 A1 | 5/2010 | Wallace et al. |
| 2010/0185565 A1 | 7/2010 | Wade |
| 2010/0211426 A1 | 8/2010 | McClurg |
| 2010/0211444 A1 | 8/2010 | Spear |
| 2010/0235210 A1 | 9/2010 | Nadrotowicz, Jr. |
| 2010/0299278 A1 | 11/2010 | Kriss et al. |
| 2010/0332284 A1 | 12/2010 | Hilbush et al. |
| 2011/0004562 A1 | 1/2011 | Hennessy et al. |
| 2011/0022532 A1 | 1/2011 | Kriss |
| 2011/0060552 A1 | 3/2011 | Ono |
| 2011/0125665 A1 | 5/2011 | Kadaba |
| 2011/0238195 A1 | 9/2011 | Nagy et al. |
| 2011/0270714 A1 | 11/2011 | Myrick et al. |
| 2011/0320308 A1 | 12/2011 | Herrington |
| 2012/0016948 A1 | 1/2012 | Sinha |
| 2012/0030133 A1 | 2/2012 | Rademaker |
| 2012/0047085 A1 | 2/2012 | Naghshineh et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0173308 A1 | 7/2012 | Brown et al. |
| 2012/0173448 A1 | 7/2012 | Rademaker |
| 2012/0179622 A1 | 7/2012 | Amato |
| 2012/0208559 A1 | 8/2012 | Svendsen et al. |
| 2012/0235791 A1 | 9/2012 | Donlan et al. |
| 2012/0246077 A1 | 9/2012 | Skaaksrud et al. |
| 2012/0303538 A1 | 11/2012 | Marcus et al. |

(56) References Cited

U.S. PATENT DOCUMENTS

| | | |
|---|---|---|
| 2012/0303539 A1 | 11/2012 | Marcus et al. |
| 2012/0303540 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2013/0006731 A1 | 1/2013 | Cook et al. |
| 2013/0006777 A1 | 1/2013 | Krishnareddy et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0024525 A1 | 1/2013 | Brady et al. |
| 2013/0054054 A1 | 2/2013 | Tollenaere et al. |
| 2013/0066744 A1 | 3/2013 | Higgins et al. |
| 2013/0073336 A1 | 3/2013 | Heath |
| 2013/0113819 A1 | 5/2013 | Gurusamy |
| 2013/0144428 A1 | 6/2013 | Irwin et al. |
| 2013/0212037 A1 | 8/2013 | Briggman et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262336 A1 | 10/2013 | Wan et al. |
| 2013/0275328 A1 | 10/2013 | Klingenberg et al. |
| 2013/0291079 A1 | 10/2013 | Lowe et al. |
| 2014/0052661 A1 | 2/2014 | Shakes et al. |
| 2014/0222711 A1 | 8/2014 | Tibbs et al. |
| 2014/0266668 A1 | 9/2014 | Blankenship et al. |
| 2015/0081587 A1 | 3/2015 | Gillen |
| 2015/0134560 A1 | 5/2015 | Krishnaiahsetty |
| 2015/0154559 A1 | 6/2015 | Barbush et al. |

FOREIGN PATENT DOCUMENTS

| | | |
|---|---|---|
| CN | 102567883 A1 | 7/2012 |
| DE | 19644163 A1 | 5/1998 |
| DE | 10007897 C1 | 6/2001 |
| GB | 2483220 A | 3/2012 |
| JP | 10-207956 | 7/1998 |
| JP | 11-139540 | 5/1999 |
| JP | 2000-339373 | 8/2000 |
| JP | 2001-014393 | 1/2001 |
| JP | 2001-022678 | 1/2001 |
| JP | 2002-042008 | 2/2002 |
| JP | 2002-056307 | 2/2002 |
| JP | 2005-213020 A | 8/2005 |
| JP | 2006-206225 A | 8/2006 |
| TW | 201220221 A | 5/2012 |
| WO | WO 2000/019170 A1 | 4/2000 |
| WO | WO 2000/019171 A1 | 4/2000 |
| WO | WO 00/030014 | 5/2000 |
| WO | WO 00/046726 | 8/2000 |
| WO | WO 00/046728 | 8/2000 |
| WO | WO 2000/052422 A1 | 9/2000 |
| WO | WO 01/016889 | 3/2001 |
| WO | WO 01/029778 | 4/2001 |
| WO | WO 01/035344 | 5/2001 |
| WO | WO 01/039031 A2 | 5/2001 |
| WO | WO 01/065454 | 9/2001 |
| WO | WO 01/067344 | 9/2001 |
| WO | WO 2001/065451 A1 | 9/2001 |
| WO | WO 2001/065523 A1 | 9/2001 |
| WO | WO 2001/065524 A1 | 9/2001 |
| WO | WO 01/072109 | 10/2001 |
| WO | WO 01/084359 A2 | 11/2001 |
| WO | WO 01/088831 | 11/2001 |
| WO | WO 01/097101 A2 | 12/2001 |
| WO | WO 02/007104 | 1/2002 |
| WO | WO 02/017045 | 2/2002 |
| WO | WO 02/052378 | 7/2002 |
| WO | WO 2003/034293 A1 | 4/2003 |
| WO | WO 2004/015518 | 2/2004 |
| WO | WO 2005/105329 A1 | 11/2005 |
| WO | WO 2011/017286 A2 | 2/2011 |
| WO | WO 2011/0150971 A1 | 12/2011 |
| WO | WO 2012/045182 A1 | 4/2012 |
| WO | WO 2012/129529 A1 | 9/2012 |
| WO | WO 2012/135143 A2 | 10/2012 |
| WO | WO 2012/161728 A1 | 11/2012 |
| WO | WO 2012/161730 A2 | 11/2012 |
| WO | WO 2012/161731 A2 | 11/2012 |
| WO | WO 2012/161732 A2 | 11/2012 |

OTHER PUBLICATIONS

United States Patent and Trademark Office, Office Action for U.S. Appl. No. 13/181,185, dated Mar. 27, 2014, 21 pages, USA.

International Searching Authority, International Search Report and Written Opinion for International Application No. PCT/US2013/68219, dated Feb. 21, 2014, 13 pages, USA.

United States Patent and Trademark Office, Notice of Allowance for U.S. Appl. No. 13/913,198, dated Mar. 6, 2014, 7 pages, USA.

United States Patent and Trademark Office, Office Action for U.S. Appl. No. 13/326,851, dated Feb. 21, 2014, 29 pages, USA.

European Patent Office, Communication Pursuant to Article 94(3) EPC for Application No. 06773704.9, dated Feb. 5, 2014, 6 pages, The Netherlands.

United States Patent and Trademark Office, Office Action for U.S. Appl. No. 13/913,185, dated May 16, 2014, 25 pages, USA.

International Searching Authority, International Search Report and Written Opinion for International Application for PCT/US2013/68210, dated May 20, 2014, 9 pages, United States Patent and Trademark Office, USA.

United States Patent and Trademark Office, Notice of Allowance for U.S. Appl. No. 13/326,750, dated Jun. 17, 2014, 17 pages, USA.

United States Patent and Trademark Office, Office Action for U.S. Appl. No. 13/326,807, dated Jun. 26, 2014, 19 pages, USA.

United States Patent and Trademark Office, Office Action for U.S. Appl. No. 13/326,851, dated Aug. 5, 2014, 39 pages, USA.

United States Patent and Trademark Office, Office Action for U.S. Appl. No. 13/174,269, dated Aug. 18, 2014, 21 pages, USA.

United States Patent and Trademark Office, Office Action for U.S. Appl. No. 13/174,306, dated Aug. 18, 2014, 21 pages, USA.

United States Patent and Trademark Office, Office Action for U.S. Appl. No. 13/174,248, dated Aug. 18, 2014, 21 pages, USA.

United States Patent and Trademark Office, Office Action for U.S. Appl. No. 13/174,299, dated Aug. 18, 2014, 20 pages, USA.

United States Patent and Trademark Office, Office Action for U.S. Appl. No. 13/174,290, dated Aug. 18, 2014, 20 pages, USA.

United States Patent and Trademark Office, Office Action for U.S. Appl. No. 13/746,842, dated Aug. 19, 2014, 22 pages, USA.

Canadian Intellectual Property Office, Requisition by the Examiner for Application No. 2,609,841, dated Oct. 6, 2014, 3 pages, Canada.

United States Patent and Trademark Office, Office Action for U.S. Appl. No. 13/746,854, dated Aug. 19, 2014, 20 pages, USA.

United States Patent and Trademark Office, Office Action for U.S. Appl. No. 13/746,862, dated Aug. 20, 2014, 21 pages, USA.

United States Patent and Trademark Office, Office Action for U.S. Appl. No. 13/569,316, dated Aug. 22, 2014, 20 pages, USA.

United States Patent and Trademark Office, Office Action for U.S. Appl. No. 13/762,969, dated Aug. 29, 2014, 38 pages, USA.

United States Patent and Trademark Office, Office Action for U.S. Appl. No. 13/326,750, dated Sep. 5, 2014, 7 pages, USA.

United States Patent and Trademark Office, Office Action for U.S. Appl. No. 13/326,807, dated Sep. 18, 2014, 6 pages, USA.

United States Patent and Trademark Office, Office Action for U.S. Appl. No. 13/326,887, dated Sep. 25, 2014, 16 pages, USA.

United States Patent and Trademark Office, Office Action for U.S. Appl. No. 13/465,555, dated Oct. 7, 2014, 42 pages, USA.

United States Patent and Trademark Office, Office Action for U.S. Appl. No. 13/181,185, dated Nov. 7, 2014, 25 pages, USA.

United States Patent and Trademark Office, Office Action for U.S. Appl. No. 13/913,171, dated Nov. 20, 2014, 13 pages, USA.

United States Patent and Trademark Office, Office Action for U.S. Appl. No. 13/465,555, dated Nov. 20, 2014, 9 pages, USA.

United States Patent and Trademark Office, Office Action for U.S. Appl. No. 13/913,066, dated Nov. 26, 2014, 17 pages, USA.

(56) References Cited

OTHER PUBLICATIONS

United States Patent and Trademark Office, Office Action for U.S. Appl. No. 13/913,198, dated Dec. 1, 2014, 15 pages, USA.
United States Patent and Trademark Office, Office Action for U.S. Appl. No. 13/913,191, dated Dec. 5, 2014, 17 pages, USA.
International Preliminary Examining Authority, International Preliminary Report on Patentability for International Application No. PCT/US2013/068219, dated Dec. 12, 2014, 8 pages, United States Patent and Trademark Office, USA.
International Searching Authority, International Search Report and Written Opinion for International Application No. PCT/US2011/059508, dated Feb. 4, 2015, 9 pages, U.S. Patent and Trademark Office, USA.
International Preliminary Examining Authority, International Preliminary Report on Patentability for International Application No. PCT/US2013/068210, dated Jan. 2, 2015, 9 pages, U.S. Patent and Trademark Office, USA.
U.S. Patent and Trademark Office, Office Action for U.S. Appl. No. 13/913,185, dated Jan. 30, 2015, 20 pages, USA.
U.S. Patent and Trademark Office, Office Action for U.S. Appl. No. 13/746,842, dated Feb. 27, 2015, 19 pages, USA.
U.S. Patent and Trademark Office, Office Action for U.S. Appl. No. 13/746,854, dated Feb. 27, 2015, 17 pages, USA.
U.S. Patent and Trademark Office, Office Action for U.S. Appl. No. 13/746,862, dated Mar. 2, 2015, 19 pages, USA.
U.S. Patent and Trademark Office, Office Action for U.S. Appl. No. 13/174,299, dated Mar. 2, 2015, 16 pages, USA.
U.S. Patent and Trademark Office, Office Action for U.S. Appl. No. 13/174,269, dated Mar. 2, 2015, 16 pages, USA.
U.S. Patent and Trademark Office, Office Action for U.S. Appl. No. 13/174,290, dated Mar. 2, 2015, 15 pages, USA.
U.S. Patent and Trademark Office, Office Action for U.S. Appl. No. 13/174,306, dated Mar. 2, 2015, 16 pages, USA.
U.S. Patent and Trademark Office, Office Action for U.S. Appl. No. 13/569,316, dated Mar. 3, 2015, 18 pages, USA.
U.S. Patent and Trademark Office, Office Action for U.S. Appl. No. 13/174,248, dated Mar. 4, 2015, 16 pages, USA.
U.S. Patent and Trademark Office, Office Action for U.S. Appl. No. 13/913,191, dated Mar. 10, 2015, 15 pages, USA.
U.S. Patent and Trademark Office, Office Action for U.S. Appl. No. 13/913,198, dated Mar. 11, 2015, 14 pages, USA.
U.S. Patent and Trademark Office, Office Action for U.S. Appl. No. 13/465,555, dated Mar. 12, 2015, 11 pages, USA.
U.S. Patent and Trademark Office, Office Action for U.S. Appl. No. 13/913,066, dated Mar. 20, 2015, 14 pages, USA.
United States Patent and Trademark Office, Office Action for U.S. Appl. No. 13/913,171, dated Mar. 24, 2015, 13 pages, USA.
United States Patent and Trademark Office, Office Action for U.S. Appl. No. 13/326,807, dated Apr. 7, 2015, 19 pages, USA.
United States Patent and Trademark Office, Office Action for U.S. Appl. No. 13/326,887, dated Apr. 9, 2015, 20 pages, USA.
United States Patent and Trademark Office, Office Action for U.S. Appl. No. 13/762,969, dated Apr. 14, 2015, 12 pages, USA.
United States Patent and Trademark Office, Office Action for U.S. Appl. No. 13/326,750, dated Apr. 20, 2015, 18 pages, USA.
United States Patent and Trademark Office, Office Action for U.S. Appl. No. 13/326,851, dated Apr. 29, 2015, 21 pages, USA.
International Searching Authority, International Search Report and Written Opinion for International Application No. PCT/US2013/75572, dated Feb. 20, 2015, 14 pages, United States Patent and Trademark Office, USA.
United States Patent and Trademark Office, Office Action for U.S. Appl. No. 13/913,185, dated Jun. 15, 2015, 21 pages, USA.
United States Patent and Trademark Office, Office Action for U.S. Appl. No. 13/181,185, dated Jun. 10, 2015, 29 pages, USA.
United States Patent and Trademark Office, Office Action for U.S. Appl. No. 10/696,180, dated Jun. 25, 2015, 45 pages, USA.
United States Patent and Trademark Office, Office Action for U.S. Appl. No. 13/839,398, dated Jul. 7, 2015, 8 pages, USA.
United States Patent and Trademark Office, Office Action for U.S. Appl. No. 13/465,555, dated Jul. 17, 2015, 12 pages, U.S.A.
United States Patent and Trademark Office, Office Action for U.S. Appl. No. 13/569,316, dated Jul. 23, 2015, 21 pages, U.S.A.
United States Patent and Trademark Office, Office Action for U.S. Appl. No. 13/746,854, dated Jul. 23, 2015, 21 pages, U.S.A.
United States Patent and Trademark Office, Office Action for U.S. Appl. No. 13/174,269, dated Jul. 23, 2015, 15 pages, U.S.A.
United States Patent and Trademark Office, Office Action for U.S. Appl. No. 13/746,862, dated Jul. 23, 2015, 21 pages, U.S.A.
United States Patent and Trademark Office, Office Action for U.S. Appl. No. 13/746,842, dated Jul. 23, 2015, 22 pages, U.S.A.
United States Patent and Trademark Office, Office Action for U.S. Appl. No. 13/174,290, dated Jul. 23, 2015, 19 pages, U.S.A.
United States Patent and Trademark Office, Office Action for U.S. Appl. No. 13/174,248, dated Jul. 23, 2015, 20 pages, U.S.A.
United States Patent and Trademark Office, Office Action for U.S. Appl. No. 13/174,306, dated Jul. 23, 2015, 20 pages, U.S.A.
United States Patent and Trademark Office, Office Action for U.S. Appl. No. 13/174,299, dated Jul. 23, 2015, 19 pages, U.S.A.
International Searching Authority, International Search Report and Written Opinion for International Application No. PCT/US2014/042959, dated Aug. 4, 2015, 8 pages, United States Patent and Trademark Office, U.S.A.
Canadian Intellectual Property Office, Requisition by the Examiner for Application No. 2,609,841, dated Aug. 26, 2015, 5 pages, Canada.
Internet Archive WayBackMachine: www.usps.com, specifically, QuantumViewTM, https://web.archive.org/web/20021002110106/http://www.ups.com/iovs/ivs_learnmore.html, QuantumView Inbound, QuantumView Outbound, How QuantumView Outbound Works, Quantum View Service Options, QuantumView and UPS Administration, 15 pages, retrieved Sep. 27-28, 2015.
United States Patent and Trademark Office, Office Action for U.S. Appl. No. 13/913,198, dated Sep. 24, 2015, 24 pages, U.S.A.
United States Patent and Trademark Office, Office Action for U.S. Appl. No. 13/913,191, dated Sep. 24, 2015, 23 pages, U.S.A.
United States Patent and Trademark Office, Office Action for U.S. Appl. No. 10/696,180, dated Oct. 8, 2015, 27 pages, U.S.A.
United States Patent and Trademark Office, Office Action for U.S. Appl. No. 13/913,185, dated Oct. 20, 2015, 20 pages, U.S.A.
United States Patent and Trademark Office, Office Action for U.S. Appl. No. 13/174,299, dated Nov. 10, 2015, 15 pages, U.S.A.
United States Patent and Trademark Office, Office Action for U.S. Appl. No. 13/913,066, dated Nov. 13, 2015, 24 pages, U.S.A.
United States Patent and Trademark Office, Office Action for U.S. Appl. No. 13/174,306, dated Nov. 17, 2015, 17 pages, U.S.A.
United States Patent and Trademark Office, Office Action for U.S. Appl. No. 13/174,290, dated Nov. 17, 2015, 16 pages, U.S.A.
United States Patent and Trademark Office, Office Action for U.S. Appl. No. 13/174,269, dated Nov. 17, 2015, 17 pages, U.S.A.
United States Patent and Trademark Office, Office Action for U.S. Appl. No. 13/174,248, dated Nov. 17, 2015, 20 pages, U.S.A.
United States Patent and Trademark Office, Office Action for U.S. Appl. No. 13/569,316, dated Nov. 17, 2015, 21 pages, 17 pages, U.S.A.
United States Patent and Trademark Office, Office Action for U.S. Appl. No. 13/746,854, dated Nov. 17, 2015, 17 pages, U.S.A.
United States Patent and Trademark Office, Office Action for U.S. Appl. No. 13/746,862, dated Nov. 17, 2015, 18 pages, U.S.A.
International Searching Authority, International Search Report and Written Opinion for International Application No. PCT/US2015/016025, dated Apr. 29, 2015, 10 pages, European Patent Office, The Netherlands.
International Searching Authority, International Search Report and Written Opinion for International Application No. PCT/US2015/019475, dated Aug. 31, 2015, 15 pages, European Patent Office, The Netherlands.
Canadian Intellectual Property Office, Requisition by the Examiner for Application No. 2,842,840, dated Nov. 4, 2015, 5 pages, Canada.
United States Patent and Trademark Office, Office Action for U.S. Appl. No. 13/913,171, dated Dec. 15, 2015, 26 pages, U.S.

(56) References Cited

OTHER PUBLICATIONS

United States Patent and Trademark Office, Office Action for U.S. Appl. No. 13/465,555, dated Nov. 19, 2015, 22 pages, U.S.
United States Patent and Trademark Office, Office Action for U.S. Appl. No. 13/326,887, dated Dec. 17, 2015, 28 pages, U.S.
United States Patent and Trademark Office, Office Action for U.S. Appl. No. 13/326,750, dated Dec. 23, 2015, 26 pages, U.S.
United States Patent and Trademark Office, Office Action for U.S. Appl. No. 13/326,851, dated Dec. 24, 2015, 29 pages, U.S.
United States Patent and Trademark Office, Office Action for U.S. Appl. No. 13/746,842, dated Jan. 22, 2016, 22 pages, U.S.
United States Patent and Trademark Office, Office Action for U.S. Appl. No. 13/839,398, dated Jan. 20, 2016, 48 pages, U.S.
United States Patent and Trademark Office, Office Action for U.S. Appl. No. 13/839,398, dated Feb. 22, 2016, 9 pages, U.S.
United States Patent and Trademark Office, Office Action for U.S. Appl. No. 13/181,185, dated Apr. 13, 2016, 34 pages, U.S.
United States Patent and Trademark Office, Office Action for U.S. Appl. No. 13/465,555, dated Mar. 17, 2016, 22 pages, U.S.
United States Patent and Trademark Office, Office Action for U.S. Appl. No. 14/100,556, dated Mar. 25, 2016, 54 pages, U.S.
Canadian Intellectual Property Office, Requisition by the Examiner for Application No. 2,885,818, dated May 30, 2016, 4 pages, Canada.
Canadian Intellectual Property Office, Requisition by the Examiner for Application No. 2,884,747, dated May 30, 2016, 4 pages, Canada.
European Patent Office, Communication Pursuant to Rules 70(2) and 70a(2) EPC for Application No. 13796181.9, dated May 24, 2016, 9 pages, Germany.
European Patent Office, Extended European Search Report for Application No. 13821253.5, dated May 17, 2016, 11 pages, Germany.
European Patent Office, Extended European Search Report for Application No. 13795343.6, dated May 19, 2016, 9 pages, Germany.
United States Patent and Trademark Office, Office Action for U.S. Appl. No. 10/696,180, dated Jun. 1, 2016, 28 pages, U.S.A.
United States Patent and Trademark Office, Office Action for U.S. Appl. No. 13/913,066, dated May 27, 2016, 25 pages, U.S.A.
United States Patent and Trademark Office, Office Action for U.S. Appl. No. 13/913,171, dated Jun. 8, 2016, 22 pages, U.S.A.
United States Patent and Trademark Office, Office Action for U.S. Appl. No. 13/913,198, dated Jun. 14, 2016, 23 pages, U.S.A.
United States Patent and Trademark Office, Office Action for U.S. Appl. No. 13/913,191, dated Jun. 9, 2016, 24 pages, U.S.A.
"Fedex Improves Internal, External Operations," *Frontline Solutions*, Apr. 5, 2001, pp. 1-2, www.frintlinemagazine.com/art_th/04052001.htx.
"Fedex Insight Empowers Customers with Enhanced Shipment Visibility and Control," *El Portal Del Transporte*, Apr. 11, 2001, pp. 9-10.
"Many Happy Returns—UPS Unveils Advanced Outline Return Solution," *Business Wire*, Sep. 20, 2000.
"RPS Adds Automated Package Pick-up to Dedesigned Web Site," www.fedex.com/us/about/ground/pressreleases/pressrelease111198.html?link=4, retrieved Sep. 10, 2003.
"Schedule Distribution Routes and Timeslots," IP Ventures; www.ipventure.com/onlineorder/distribution.php, retrieved on Apr. 16, 2008.
"Scheduling Software Helps Webvan Meet 30-Minute Delivery Window," www.stores.org, Jul. 2000.
Author Unknown, "Outlook 2000 Handbook First Edition", p. 95 (relevant part), last 9 lines; one page.
Author Unknown, ASP V16-System Walker List Works Manual (relevant part); p. 88, line 5, 3.4 Start up and termination of ListWORKS writer; one page.
Brewin, et al., "Follow that Package!" *Computer World*, Mar. 19, 2001, www.computerworld.com/printthis/2001/0,4814,58696,00.html.

Caminti, et al. "United Parcel Service Introduces Advanced Label Imaging System," *Business Wire*, Nov. 29, 1989, p. 1.
Canadian Intellectual Property Office, Requisition by Examiner for Application No. 2,609,841, dated Dec. 2, 2011, 4 pages, Canada.
Canadian Intellectual Property Office, Requisition by Examiner for Applicaton No. 2,504,285, dated Oct. 10, 2013, 2 pages, Canada.
Canadian Office Action dated Feb. 15, 2012, for Canadian Application No. 2,504,285.
De Marco, "E-tail Presents Can be Tougher to Send Back than Order," *Knight-Ridder/Tribune Business News*, Dec. 28, 1999, The Dialog Corporation, US.
Declaration of David Ellison pertaining to UPS and Mailbox etc. pre-filing activities from Mar. 2001-Nov. 1, 2002.
European Patent Office, Result of Consultation for Application No. 03778034.3, dated Dec. 2, 2013, 5 pages, The Netherlands.
Harrington, "The US Postal Service Gets Serious about Serving Business in the New Economy," *Journal*, May 2000, p. 2, vol. 41, No. 5, Penton Publishing, Inc., USA.
Henderson, "Buy.com Boosts Returns Process Efficiency with New Solution," *ProQuest Info and Learning*, Nov. 2000 pp. 72-76, vol. 82, No. 11.
International Search Report, dated Jul. 5, 2005 for International Application No. PCT/US 2003/34746 filed Oct. 31, 2003.
International Searching Authority, International Search Report and Written Opinion for International Application No. PCT/US11/59506, dated Aug. 3, 2012, 9 pages, United States Patent and Trademark Office, USA.
International Searching Authority, International Search Report and Written Opinion for International Application No. PCT/US06/24169, dated May 10, 2007, 7 pages, United States Patent and Trademark Office, USA.
International Searching Authority, International Search Report and Written Opinion for International Application No. PCT/US11/59513, dated Apr. 27, 2012.
International Searching Authority, International Search Report and Written Opinion for International Application No. PCT/US11/59511, dated May 2, 2012.
International Searching Authority, International Search Report and Written Opinion, dated Apr. 24, 2012, for International Application No. PCT/US11/59504.
Kihon, Kara Jissen, "Made Business Seikou No Tameno Kanpeki Guide—How to E-Commerce", p. 60, relevant part, one page.
Notice of Allowance dated Mar. 25, 2010 for U.S. Appl. No. 11/460,268.
Notice of Allowance dated Nov. 10, 2011 for U.S. Appl. No. 12/616,183.
Notice of Allowance dated Nov. 2, 2009 for U.S. Appl. No. 11/425,333.
Office Action dated Aug. 6, 2009 for U.S. Appl. No. 11/460,268.
Office Action dated Jan. 23, 2009 for U.S. Appl. No. 11/460,268.
Office Action dated Jan. 31, 2012, for U.S. Appl. No. 10/696,180, filed Oct. 28, 2003.
Office Action dated Jun. 11, 2009 for U.S. Appl. No. 11/425,333.
Office Action dated Oct. 15, 2008 for U.S. Appl. No. 11/425,333.
Office Action dated Sep. 23, 2011 for U.S. Appl. No. 12/616,183.
Office Action from U.S. Appl. No. 10/696,180 dated Aug. 19, 2009.
Office Action from U.S. Appl. No. 10/696,180 dated Dec. 9, 2009.
Office Action from U.S. Appl. No. 10/696,180 dated Feb. 3, 2009.
Office Action from U.S. Appl. No. 10/696,180 dated Feb. 15, 2011.
Office Action from U.S. Appl. No. 10/696,180 dated Jul. 7, 2011.
Office Action from U.S. Appl. No. 10/696,180 dated May 10, 2010.
Office Action from U.S. Appl. No. 10/696,180 dated Oct. 18, 2010.
Pender, "Hard Times are the Best Times," *Cio*, Aug. 15, 2001, p. 3, www.cio.com/archive/081501/besttimes_content.html.
United States Patent and Trademark Office, Office Action for U.S. Appl. No. 13/569,316, dated Sep. 19, 2012, 18 pages, USA.
United States Patent and Trademark Office, Office Action for U.S. Appl. No. 13/569,316, dated Nov. 6, 2012, 14 pages, USA.
United States Patent and Trademark Office, Office Action for U.S. Appl. No. 13/174,269, dated Nov. 7, 2012, 23 pages, USA.
United States Patent and Trademark Office, Office Action for U.S. Appl. No. 13/174,248, dated Nov. 27, 2012, 24 pages, USA.

(56) References Cited

OTHER PUBLICATIONS

United States Patent and Trademark Office, Office Action for U.S. Appl. No. 13/174,290, dated Nov. 28, 2012, 25 pages, USA.
United States Patent and Trademark Office, Office Action for U.S. Appl. No. 13/174,269, dated May 8, 2013, 14 pages, USA.
United States Patent and Trademark Office, Office Action for U.S. Appl. No. 13/569,316, dated May 10, 2013, 14 pages, USA.
United States Patent and Trademark Office, Office Action for U.S. Appl. No. 13/174,248, dated May 16, 2013, 13 pages, USA.
United States Patent and Trademark Office, Office Action for U.S. Appl. No. 13/174,306, dated May 21, 2013, 14 pages, USA.
United States Patent and Trademark Office, Office Action for U.S. Appl. No. 13/174,290, dated May 15, 2013, 13 pages, USA.
United States Patent and Trademark Office, Office Action for U.S. Appl. No. 13/181,185, dated Apr. 9, 2013, 19 pages, USA.
United States Patent and Trademark Office, Office Action for U.S. Appl. No. 13/913,185, dated Dec. 13, 2013, 31 pages, USA.
United States Patent and Trademark Office, Office Action for U.S. Appl. No. 13/913,171, dated Oct. 2, 2013, 36 pages, USA.
United States Patent and Trademark Office, Office Action for U.S. Appl. No. 13/746,854, dated Oct. 2, 2013, 30 pages, USA.
United States Patent and Trademark Office, Office Action for U.S. Appl. No. 13/174,290, dated Aug. 29, 2013, 15 pages, USA.
United States Patent and Trademark Office, Office Action for U.S. Appl. No. 13/174,269, dated Aug. 29, 2013, 14 pages, USA.
United States Patent and Trademark Office, Office Action for U.S. Appl. No. 13/174,306, dated Aug. 29, 2013, 14 pages, USA.
United States Patent and Trademark Office, Office Action for U.S. Appl. No. 13/569,316, dated Aug. 29, 2013, 15 pages, USA.
United States Patent and Trademark Office, Office Action for U.S. Appl. No. 13/181,185, dated Sep. 26, 2013, 27 pages, USA.
United States Patent and Trademark Office, Office Action for U.S. Appl. No. 13/746,862, dated Oct. 8, 2013, 31 pages, USA.
United States Patent and Trademark Office, Office Action for U.S. Appl. No. 13/174,248, dated Sep. 6, 2013, 14 pages, USA.
United States Patent and Trademark Office, Office Action for U.S. Appl. No. 13/913,066, dated Oct. 11, 2013, 22 pages, USA.
United States Patent and Trademark Office, Office Action for U.S. Appl. No. 13/746,842, dated Oct. 2, 2013, 28 pages, USA.
United States Patent and Trademark Office, Office Action for U.S. Appl. No. 13/174,306, dated Dec. 28, 2012, 27 pages, USA.
United States Patent and Trademark Office, Office Action for U.S. Appl. No. 13/174,269, dated Feb. 4, 2013, 13 pages, USA.
United States Patent and Trademark Office, Office Action for U.S. Appl. No. 13/569,316, dated Feb. 6, 2013, 11 pages, USA.
United States Patent and Trademark Office, Office Action for U.S. Appl. No. 13/174,248, dated Feb. 12, 2013, 11 pages, USA.
United States Patent and Trademark Office, Office Action for U.S. Appl. No. 13/174,306, dated Feb. 15, 2013, 11 pages, USA.
United States Patent and Trademark Office, Office Action for U.S. Appl. No. 13/174,290, dated Feb. 21, 2013, 12 pages, USA.
United States Patent and Trademark Office, Office Action for U.S. Appl. No. 13/913,191, dated Oct. 24, 2013, 26 pages, USA.
United States Patent and Trademark Office, Office Action for U.S. Appl. No. 13/913,198, dated Oct. 25, 2013, 25 pages, USA.
United States Patent and Trademark Office, Office Action for U.S. Appl. No. 10/696,180, dated Jul. 18, 2013, 38 pages, USA.
United States Patent and Trademark Office, Office Action for U.S. Appl. No. 13/174,299, dated Dec. 31, 2012, 27 pages, USA.
United States Patent and Trademark Office, Office Action for U.S. Appl. No. 13/174,299, dated Feb. 8, 2013, 9 pages, USA.
United States Patent and Trademark Office, Office Action for U.S. Appl. No. 13/174,299, dated May 15, 2013, 13 pages, USA.
United States Patent and Trademark Office, Office Action for U.S. Appl. No. 13/174,299, dated Aug. 29, 2013, 13 pages, USA.
United States Patent and Trademark Office, Office Action for U.S. Appl. No. 13/326,807, dated Feb. 5, 2014, 29 pages, USA.
United States Patent and Trademark Office, Office Action for U.S. Appl. No. 13/326,887, dated Feb. 13, 2014, 29 pages, USA.
United States Patent and Trademark Office, Office Action for U.S. Appl. No. 13/174,248, dated Dec. 27, 2013, 12 pages, USA.
United States Patent and Trademark Office, Office Action for U.S. Appl. No. 13/746,862, dated Dec. 23, 2013, 16 pages, USA.
United States Patent and Trademark Office, Office Action for U.S. Appl. No. 13/746,842, dated Feb. 13, 2014, 16 pages, USA.
United States Patent and Trademark Office, Office Action for U.S. Appl. No. 13/174,299, dated Dec. 27, 2013, 11 pages, USA.
United States Patent and Trademark Office, Office Action for U.S. Appl. No. 13/174,290, dated Dec. 27, 2013, 12 pages, USA.
United States Patent and Trademark Office, Office Action for U.S. Appl. No. 13/174,269, dated Dec. 27, 2013, 12 pages, USA.
United States Patent and Trademark Office, Office Action for U.S. Appl. No. 13/746,854, dated Dec. 27, 2013, 15 pages, USA.
United States Patent and Trademark Office, Office Action for U.S. Appl. No. 13/174,306, dated Dec. 26, 2013, 12 pages, USA.
United States Patent and Trademark Office, Office Action for U.S. Appl. No. 13/569,316, dated Dec. 24, 2013, 13 pages, USA.
United States Patent and Trademark Office, Office Action for U.S. Appl. No. 13/326,750, dated Jan. 30, 2014, 28 pages, USA.
United States Patent and Trademark Office, Notice of Allowance for U.S. Appl. No. 13/913,066, dated Feb. 5, 2014, 11 pages, USA.
United States Patent and Trademark Office, Notice of Allowance for U.S. Appl. No. 13/913,171, dated Feb. 11, 2014, 45 pages, USA.
United States Patent and Trademark Office, Notice of Allowance for U.S. Appl. No. 13/913,191, dated Feb. 20, 2014, 25 pages, USA.
Van Huzien, "Messaging: the Transport Part of the XML Puzzle," *IBM Developer Works*, Jul. 2000, www.106.ibm/developerworks/library/xml-messaging/.
Fedex, "FedEx Mobile Ship", retrieved from <http://www.fedex.com/us/mobile/label.html, redirected to http://mobilesolutions.fedex.com/shipping-label.html > on Sep. 25, 2013, 2 pages.
Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Raco Industries, "Increase Delivery Visibility and Simplify Your Process," retrieved from <http://www.racointeractive.com/media/834/raco_interactive-pd.pdf>, on Sep. 25, 2013, 2 pages.
United States Patent and Trademark Office, Office Action for U.S. Appl. No. 14/025,893, dated Sep. 22, 2016, 52 pages, U.S.A.
United States Patent and Trademark Office, Office Action for U.S. Appl. No. 14/049,828, dated Oct. 3, 2016, 64 pages, U.S.A.
United States Patent and Trademark Office, Office Action for U.S. Appl. No. 13/839,398, dated Oct. 6, 2016, 25 pages, U.S.A.
United States Patent and Trademark Office, Office Action for U.S. Appl. No. 13/465,555, dated Nov. 10, 2016, 19 pages, U.S.A.
Canadian Intellectual Property Office, Requisition by the Examiner for Application No. 2,609,841, dated Nov. 14, 2016, 8 pages, U.S.A.
United States Patent and Trademark Office, Office Action for U.S. Appl. No. 13/913,191, dated Jan. 12, 2017, 24 pages, U.S.A.
United States Patent and Trademark Office, Office Action for U.S. Appl. No. 13/913,171, dated Jan. 27, 2017, 25 pages, U.S.A.
United States Patent and Trademark Office, Office Action for U.S. Appl. No. 13/913,066, dated Dec. 22, 2016, 19 pages, U.S.A.
United States Patent and Trademark Office, Office Action for U.S. Appl. No. 10/696,180, dated Dec. 22, 2016, 31 pages, U.S.A.
United States Patent and Trademark Office, Office Action for U.S. Appl. No. 13/746,842, dated Jan. 11, 2017, 38 pages, U.S.A.
United States Patent and Trademark Office, Office Action for U.S. Appl. No. 13/569,316, dated Dec. 22, 2016, 36 pages, U.S.A.
United States Patent and Trademark Office, Office Action for U.S. Appl. No. 13/174,306, dated Dec. 23, 2016, 34 pages, U.S.A.
United States Patent and Trademark Office, Office Action for U.S. Appl. No. 13/174,248, dated Dec. 23, 2016, 37 pages, U.S.A.
United States Patent and Trademark Office, Office Action for U.S. Appl. No. 13/174,269, dated Jan. 10, 2017, 35 pages, U.S.A.
United States Patent and Trademark Office, Office Action for U.S. Appl. No. 13/174,299, dated Dec. 23, 2016, 36 pages, U.S.A.

(56) References Cited

OTHER PUBLICATIONS

United States Patent and Trademark Office, Office Action for U.S. Appl. No. 13/174,290, dated Dec. 28, 2016, 36 pages, U.S.A.
United States Patent and Trademark Office, Office Action for U.S. Appl. No. 13/913,198, dated Feb. 3, 2017, 28 pages, U.S.A.
Canadian Intellectual Property Office, Requisition by the Examiner for Application No. 2,924,132, dated Feb. 10, 2017, 4 pages, Canada.
European Patent Office, Communications pursuant to Article 94(3) EPC for Application No. 13796181.9, dated Feb. 10, 2017, 5 pages, Germany.
European Patent Office, Communications pursuant to Article 94(3) EPC for Application No. 13795343.6, dated Mar. 2, 2017, 5 pages, Germany.
European Patent Office, Communications pursuant to Article 94(3) EPC for Application No. 13158961.6, dated Mar. 3, 2017, 6 pages, Germany.
European Patent Office, Communications pursuant to Article 94(3) EPC for Application No. 13158964.0, dated Mar. 23, 2017, 7 pages, Germany.
European Patent Office, Communications pursuant to Article 94(3) EPC for Application No. 13158965.7, dated Mar. 23, 2017, 7 pages, Germany.
European Patent Office, Communications pursuant to Article 94(3) EPC for Application No. 13158966.5, dated Mar. 23, 2017, 6 pages, Germany.
European Patent Office, Communications pursuant to Article 94(3) EPC for Application No. 13158967.3, dated Mar. 23, 2017, 7 pages, Germany.
United States Patent and Trademark Office, Office Action for U.S. Appl. No. 13/465,555, dated Mar. 15, 2017, 13 pages, U.S.A.
United States Patent and Trademark Office, Office Action for U.S. Appl. No. 13/746,854, dated Mar. 9, 2017, 34 pages, U.S.A.
United States Patent and Trademark Office, Office Action for U.S. Appl. No. 13/746,862, dated Feb. 27, 2017, 43 pages, U.S.A.
United States Patent and Trademark Office, Office Action for U.S. Appl. No. 13/913,185, dated Mar. 23, 2017, 36 pages, U.S.A.
United States Patent and Trademark Office, Office Action for U.S. Appl. No. 14/049,828, dated May 3, 2017, 24 pages, U.S.A.
United States Patent and Trademark Office, Office Action for U.S. Appl. No. 14/100,556, dated May 1, 2017, 25 pages, U.S.A.
United States Patent and Trademark Office, Office Action for U.S. Appl. No. 14/025,893, dated Apr. 7, 2017, 27 pages, U.S.A.
Non-Final Rejection dated Jul. 21, 2017 for U.S. Appl. No. 14/640,753.
Non-Final Rejection dated Aug. 4, 2017 for U.S. Appl. No. 13/181,185.
Non-Final Rejection dated Aug. 3, 2017 for U.S. Appl. No. 14/623,145.
Final Rejection dated Sep. 11, 2017 for U.S. Appl. No. 13/913,185.
Final Rejection dated Jul. 28, 2017 for U.S. Appl. No. 13/913,198.
Final Rejection dated Jul. 18, 2017 for U.S. Appl. No. 13/913,171.
Final Rejection dated Jul. 11, 2017 for U.S. Appl. No. 13/746,854.
Final Rejection dated Jul. 10, 2017 for U.S. Appl. No. 13/913,191.
Final Rejection dated Jul. 10, 2017 for U.S. Appl. No. 13/746,862.
English Translation of CN Office Action dated Jun. 29, 2017 for CN Application No. 201380070854.
CN Office Action dated Jun. 29, 2017 for CN Application No. 201380070854.
CA Office Action dated Jul. 11, 2017 for CA Application No. 2942296.
Non-Final Rejection dated Oct. 24, 2017 for U.S. Appl. No. 13/913,066.
Non-Final Rejection dated Nov. 22, 2017 for U.S. Appl. No. 14/025,893.
Non-Final Rejection dated Nov. 13, 2017 for U.S. Appl. No. 14/707,039.
Non-Final Rejection dated Nov. 8, 2017 for U.S. Appl. No. 10/696,180.
Final Rejection dated Sep. 20, 2017 for U.S. Appl. No. 14/100,556.
Annex to the communication dated Sep. 15, 2017 for EP Application No. 06773704.
Annex to the communication dated Oct. 12, 2017 for EP Application No. 13796181.
Final Rejection dated Jun. 29, 2017 for U.S. Appl. No. 13/746,842.
Final Rejection dated Jun. 29, 2017 for U.S. Appl. No. 13/569,316.
Final Rejection dated Jun. 27, 2017 for U.S. Appl. No. 13/174,248.
Final Rejection dated Jun. 5, 2017 for U.S. Appl. No. 13/839,398.
English Translation of CN Office Action dated Jun. 27, 2017 for CN Application No. 201380070843.
English Translation of CN Office Action dated Apr. 27, 2017 for CN Application No. 201380067429.
Communication from the Examining Division dated Apr. 10, 2017 for EP Application No. 06773704.
CN Office Action dated Jun. 27, 2017 for CN Application No. 201380070843.
CN Office Action dated Apr. 27, 2017 for CN Application No. 201380067429.
CA Office Action dated May 24, 2017 for CA Application No. 2885818.
CA Office Action dated May 23, 2017 for CA Application No. 2891876.
CA Office Action dated Jun. 6, 2017 for CA Application No. 2881201.
CA Office Action dated Apr. 27, 2017 for CA Application No. 2884747.
Annex to the communication dated Apr. 10, 2017 for EP Application No. 06773704.
Final Office Action for U.S. Appl. No. 14/640,753, dated Jan. 16, 2018, 37 pages.
EPO Summons to Attend Oral Hearing for Application No. 13795343.6, dated Nov. 17, 2017, 9.
CA Office Action dated Nov. 22, 2017 for CA Application No. 2954156.
CA Office Action dated Nov. 20, 2017 for CA Application No. 2924132.
CA Office Action dated Dec. 27, 2017 for CA Application No. 2957135.
CA Office Action dated Dec. 22, 2017 for CA Application No. 2957133.
Office Action received for Canadian Patent Application No. 2,884,747, dated Nov. 9, 2018, 7 pages.

\* cited by examiner

Fig. 5

Membership Options

| Services | Member (Free Enrollment) | Premium Member ($40 Annual Subscription) |
|---|---|---|
| Delivery Alerts | 1 - Unlimited | 1 - Unlimited |
| Approximate Delivery Time | 1 - Unlimited | 1 - Unlimited |
| Delivery Options | 1 - Unlimited | 1 - Unlimited |
| Authorize Shipment Release | 1 - Unlimited | 1 - Unlimited |
| Will Call (hold for pickup at a UPS facility) | 1 - Unlimited | 1 - Unlimited |
| Printable InfoNotice | 1 - Unlimited | 1 - Unlimited |
| Deliver to a Retail Location (UPS Store) | 1 - $5.00 Fee | 1 - Unlimited |
| Reschedule Delivery | 1 - $5.00 Fee | 1 - Unlimited |
| Deliver to Another Address | 1 - $5.00 Fee | 1 - Unlimited |
| "Leave As" Instructions | X | 1 - Unlimited |
| Leave With Neighbor | X | 1 - Unlimited |
| Confirmed Delivery Window | X | 1 - $5.00 Additional Fee |
| Delivery Planner | X | 1 |

[Close]

| Scheduled Delivery Date | Delivery Time | Ship From | Shipment Information Tracking | Status | Delivery Alerts | Shipment Actions [?] Preview Delivery Instructions | Select Alternate Delivery | Change Delivery |
|---|---|---|---|---|---|---|---|---|
| 04/02/2011 | 10:00 AM - 2:00 PM | ABC Corporation Seddlebrook, NJ, US | 1Z12345678901 23456 | In Transit [?] | View/Edit | View/Edit | Select | Request |
| 04/04/2011 (Updated) | 10:00 AM - 2:00 PM | Amazon Chicago, IL, US | 1Z12345678901 23455 | In Transit [?] | View/Edit | Add | Select | Request |
| 04/05/2011 | 12:00 PM - 2:00 PM (Confirmed) | Buy.com Aliso Viejo, CA, US | 1Z12345678901 23343 | In Transit [?] | View/Edit | View/Edit | Change | Request |
| 04/05/2011 | 10:00 AM - 2:00 PM | Amazon Chicago, IL, US | 1Z12345678901 23460 | In Transit [?] C.O.D. 25.00 USD, Check | View/Edit | View/Edit | Select | Request |
| 04/06/2011 | 10:00 AM - 2:00 PM | Amazon Chicago, IL, US | 1Z12345678901 23460 | In Transit [?] Adult Signature Required C.O.D. - 25.00 USD, Money Order | View/Edit | | Select | Request |
| Not Available | Not Available | BLC Inc. London, UK | 1Z12345678901 23473 | Exception [?] Will Call | | | | Change |
| Not Available | Not Available | Amazon Chicago, IL, US | 1Z12345678901 23464 | Exception [?] Same Day Will Call Pickup By: 04/06/2010 | | | | Change |
| 04/07/2011 Updated | By End of Day | Amazon Chicago, IL, US | 1Z12345678901 23455 | Exception [?] Deliver to Another Address 532 Mar Street Roswell, GA, US 30076 | View/Edit | | | Change |
| 04/08/2011 Updated | 10:00 AM - 2:00 PM | Amazon Chicago, IL, US | 1Z12345678901 23446 | Exception [?] Reschedule Delivery | View/Edit | View/Edit | Select | Change |
| 04/08/2011 | Not Available | Amazon Chicago, IL, US | 1Z12345678901 23437 | Exception [?] Return to Sender | | | | Change |
| 04/08/2011 | 10:00 AM - 2:00 PM | Amazon Chicago, IL, US | 1Z12345678901 23428 | Exception [?] Leave With Neighbor 1234 Elm Street Roswell, GA, US 30076 Tel: 555-123-4567 | View/Edit | Add | | Change |
| 04/10/2011 Updated | By End of Day | Amazon Chicago, IL, US | 1Z12345678901 23419 | Exception [?] Deliver to a UPS Retail Location The UPS Store 1810 Manset Rd Roswell, GA, US 30076 Tel: 555-123-4567 | View/Edit | | | Change |
| 04/11/2011 Updated | 10:00 AM - 2:00 PM | Amazon Chicago, IL, US | 1Z12345678901 23123 | Exception [?] Signature Required Authorize Shipment Release | View/Edit | Add | | Change |

Fig. 10

UPS My Choice Delivery Alerts

You can change the delivery alerts[?] settings for this shipment below.

Note: Alerts will be sent based on your local time zone.

| Alert Type | Send By | Send To |
|---|---|---|
| ☐ Day Before Delivery Reminder | Select One ▼ | ▼ |
| ☑ Morning of Delivery Alert | SMS Text Message ▼ | Select one ▼ |
| ☑ Delivery Confirmation | E-mail ▼ | jsmith@email.com |

☐ Apply these changes to all packages in this multi-piece shipment.

[ Cancel ]  [ OK ]

Authorize Shipment Release:

By selecting I authorize shipment release, I authorize UPS to deliver packages addressed to me at this address without obtaining a signature. I understand that the UPS driver retains discretion not to deliver a package depending on delivery conditions (such as adverse weather or safety).

Note: The Leave At instructions will only be applied if you authorize shipment release.

☐ I authorize shipment release

[ Cancel ]   [ Save Changes ]

Enter a New Gate or Building Security Code

Gate or Building Security Code:

Re-Enter Your Gate or Building Security Code:

Cancel   Update

Fig. 19B

Edit

Security Code Entered: NO

Leave At:
None Selected

Cancel   Save Changes

Fig. 20

UPS My Choice Delivery Instructions

Enter your delivery instructions and select OK.

Security Code Entered: NO    Edit

Leave At:
[None Selected ▼]

Note: This will also apply to all other packages delivered on the same date.

Apply Delivery Instructions To:
● The current shipment
○ All my inbound shipments

[Cancel]  [OK]

Vacation Dates

1

04/01/2011 to 04/01/2011

Show Delivery Options

Vacation Delivery Options

2

Enter your vacation dates above and select Show Delivery Options to see the available options.

Cancel    Update Vacation Settings >

Fig. 24

Based on your vacation dates, you can reschedule the delivery of your shipments for a later date or deliver them to a participating UPS Retail Location so you can pick them up when you get back from vacation.

Vacation Delivery Options:
What would you like UPS to do with shipments scheduled for delivery during your vacation?

● Reschedule Delivery for
   mm/dd/yyyy

○ Deliver to a UPS Retail Location

[Show Locations Near Me]   [Show Locations Near Another Address]

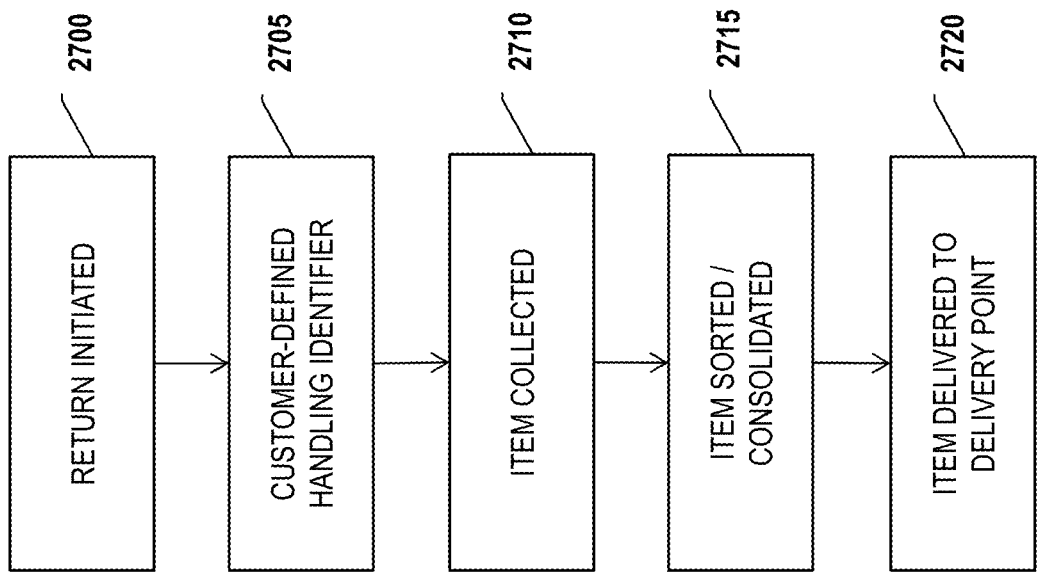

CUSTOMER CONTROLLED MANAGEMENT OF SHIPMENTS

BACKGROUND

Shipping customers are increasing their expectations regarding various delivery services. Thus, new concepts are needed to enhance customer experience and loyalty by improving the delivery experience.

BRIEF SUMMARY

In general, embodiments of the present invention provide systems, methods, apparatus, and computer program products for customer controlled management of shipments.

In accordance with one aspect, a method is provided. In one embodiment, the method comprises (1) receiving a request to return an item; (2) determining whether to authorize the return based at least in part on one or more business rules for processing returns; and (3) responsive to determining to authorize the return based at least in part on one or more business rules for processing returns, associating a handling identifier with the item, the handling identifier comprising a collection method portion, a return category portion, and a delivery point portion, wherein (a) the collection method portion indicates collection methods that are available for the item, (b) the return category portion indicates whether to consolidate the item with similar items, and (c) the delivery point portion indicates a delivery destination of the item.

In accordance with another aspect, a computer program product is provided. The computer program product may comprise at least one computer-readable storage medium having computer-readable program code portions stored therein, the computer-readable program code portions comprising executable portions configured to (1) receive a request to return an item; (2) determine whether to authorize the return based at least in part on one or more business rules for processing returns; and (3) responsive to determining to authorize the return based at least in part on one or more business rules for processing returns, associate a handling identifier with the item, the handling identifier comprising a collection method portion, a return category portion, and a delivery point portion, wherein (a) the collection method portion indicates collection methods that are available for the item, (b) the return category portion indicates whether to consolidate the item with similar items, and (c) the delivery point portion indicates a delivery destination of the item.

In accordance with yet another aspect, an apparatus comprising at least one processor and at least one memory including computer program code is provided. In one embodiment, the at least one memory and the computer program code may be configured to, with the processor, cause the apparatus to (1) receive a request to return an item; (2) determine whether to authorize the return based at least in part on one or more business rules for processing returns; and (3) responsive to determining to authorize the return based at least in part on one or more business rules for processing returns, associate a handling identifier with the item, the handling identifier comprising a collection method portion, a return category portion, and a delivery point portion, wherein (a) the collection method portion indicates collection methods that are available for the item, (b) the return category portion indicates whether to consolidate the item with similar items, and (c) the delivery point portion indicates a delivery destination of the item.

In accordance with one aspect, a method is provided. In one embodiment, the method comprises (1) receive one or more notifications associated with an item being returned, the item associated with a refund classification identifying one or more triggering events that indicate when a refund for the item being returned is to be initiated; (2) determine whether the one or more triggering events of the refund classification have occurred based at least in part on the one or more notifications; and (3) responsive to determining that the one or more triggering events of the refund classification have occurred based at least in part on the one or more notifications, initiate the refund for the item.

In accordance with another aspect, a computer program product is provided. The computer program product may comprise at least one computer-readable storage medium having computer-readable program code portions stored therein, the computer-readable program code portions comprising executable portions configured to (1) receive one or more notifications associated with an item being returned, the item associated with a refund classification identifying one or more triggering events that indicate when a refund for the item being returned is to be initiated; (2) determine whether the one or more triggering events of the refund classification have occurred based at least in part on the one or more notifications; and (3) responsive to determining that the one or more triggering events of the refund classification have occurred based at least in part on the one or more notifications, initiate the refund for the item.

In accordance with yet another aspect, an apparatus comprising at least one processor and at least one memory including computer program code is provided. In one embodiment, the at least one memory and the computer program code may be configured to, with the processor, cause the apparatus to (1) receive one or more notifications associated with an item being returned, the item associated with a refund classification identifying one or more triggering events that indicate when a refund for the item being returned is to be initiated; (2) determine whether the one or more triggering events of the refund classification have occurred based at least in part on the one or more notifications; and (3) responsive to determining that the one or more triggering events of the refund classification have occurred based at least in part on the one or more notifications, initiate the refund for the item.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 5-31 and 33 show exemplary input and output of various embodiments of the present invention.

DETAILED DESCRIPTION

Figure 1:
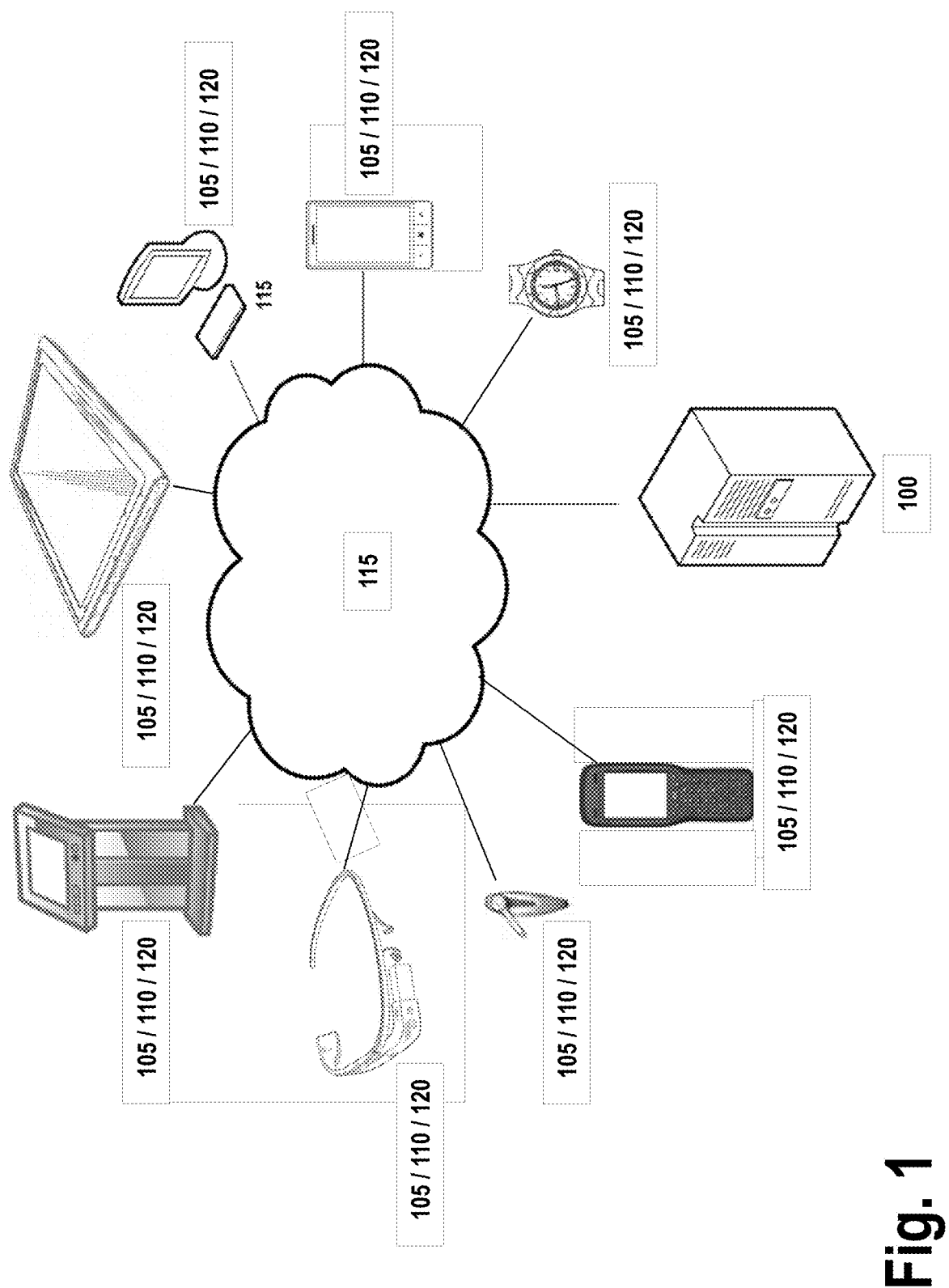
FIG. 1 is an overview of a system that can be used to practice embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

FIG. 1 provides an illustration of a system that can be used in conjunction with various embodiments of the present invention. As shown in FIG. 1, the system may include one or more carrier systems 100, one or more mobile stations 105, one or more consignee computing devices 110, one or more networks 115, and one or more consignor computing devices 120. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain communication system entities as separate, standalone entities, the various embodiments are not limited to this particular architecture.

1. Exemplary Carrier System

Figure 2:
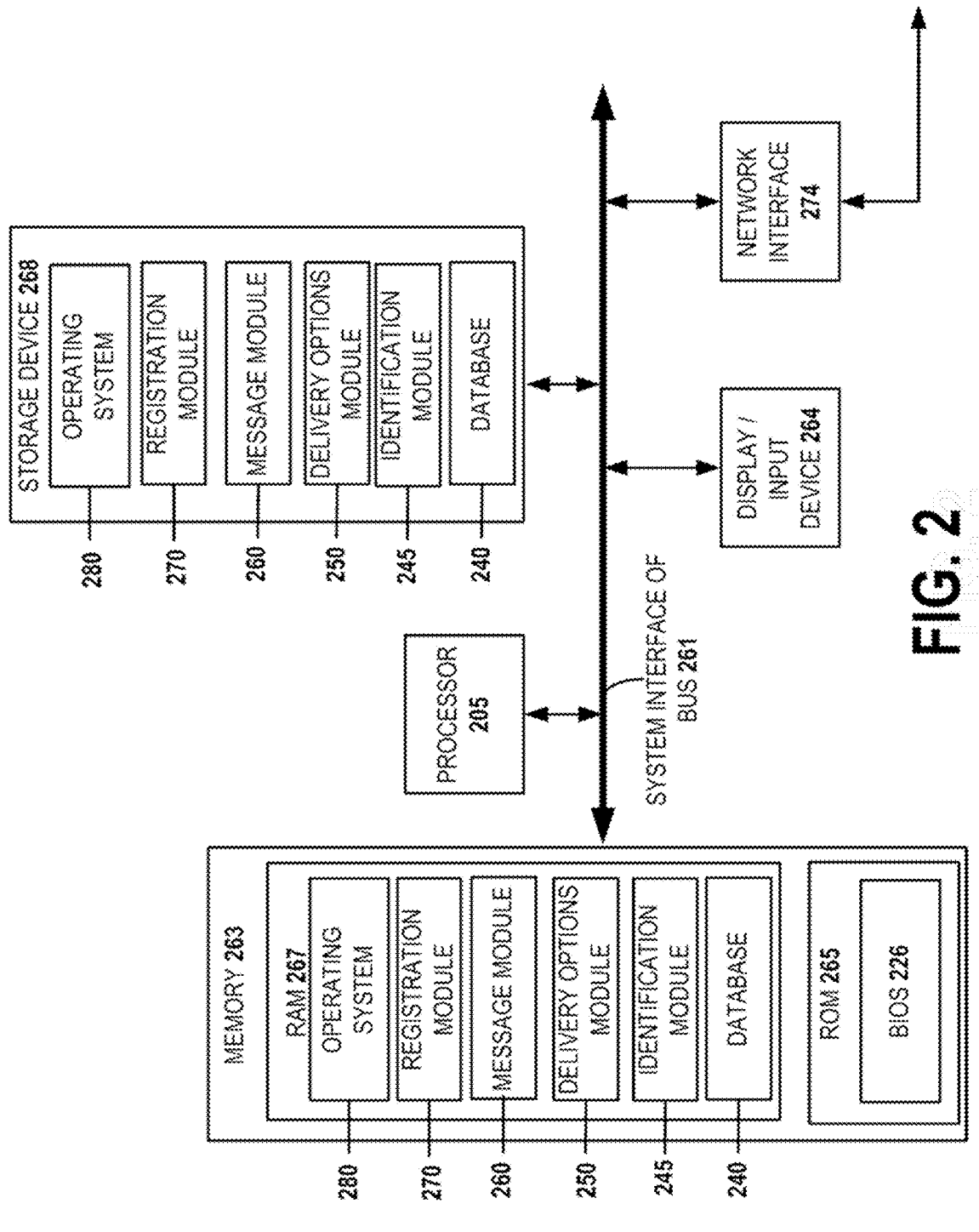
FIG. 2 is an exemplary schematic diagram of a carrier system according to one embodiment of the present invention.

FIG. 2 provides an exemplary schematic of a carrier system 100 according to one embodiment of the present invention. In general, the term "system" may refer to, for example, one or more computers, computing devices, mobile phones, desktops, notebooks or laptops, distributed systems, servers, blades, gateways, switches, processing devices, or combination of processing devices adapted to perform the functions described herein. However, the carrier system 100 may also comprise various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As will be understood from FIG. 1, in one embodiment, the carrier system 100 includes one or more processors 205 that communicate with other elements within the carrier system 100 via a system interface or bus 261. The processor 205 may be embodied in a number of different ways. For example, the processor 205 may be embodied as a processing element, processing circuitry, a coprocessor, a controller or various other processing devices including integrated circuits such as, for example, an application specific integrated circuit (ASIC), a field programmable gate array (FPGA), a hardware accelerator, or the like.

In an exemplary embodiment, the processor 205 may be configured to execute instructions stored in memory or otherwise accessible to the processor 205. As such, whether configured by hardware or software methods, or by a combination thereof, the processor 205 may represent an entity capable of performing operations according to embodiments of the present invention when configured accordingly. A display device/input device 264 for receiving and displaying data may also be included in the carrier system 100. This display device/input device 264 may be, for example, a keyboard or pointing device that is used in combination with a monitor. The carrier system 100 may further include transitory and non-transitory memory 263, which may include both random access memory (RAM) 267 and read only memory (ROM) 265. The carrier system's ROM 265 may be used to store a basic input/output system (BIOS) 226 containing the basic routines that help to transfer information to the different elements within the carrier system 100.

In addition, in one embodiment, the carrier system 100 may include at least one storage device 268, such as a hard disk drive, a CD drive, and/or an optical disk drive for storing information on various computer-readable media. The storage device(s) 268 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, or the like. Additionally, each of these storage devices 268 may be connected to the system bus 261 by an appropriate interface.

Furthermore, a number of executable instructions, applications, program modules, and/or the like may be stored by the various storage devices 268 and/or within RAM 267. Such executable instructions, applications, program modules, and/or the like may include an operating system 280, a registration module 270, an alert module 260, a delivery options module 250, and identification module 245. As discussed in more detail below, these executable instructions, applications, program modules, and/or the like may control certain aspects of the operation of the carrier system 100 with the assistance of the processor 205 and operating system 280—although their functionality need not be modularized. In addition to the program modules, the carrier system 100 may store or be in communication with one or more databases, such as database 240.

Also located within the carrier system 100, in one embodiment, is a network interface 274 for interfacing with various computing entities (e.g., with one or more mobile stations 105). For example, the carrier system 100 may be able to receive data and/or messages from and transmit data and/or messages to the mobile station 105, consignee computing devices 110, and consignor computing devices 120. This communication may be via the same or different wired or wireless networks (or a combination of wired and wireless networks). For instance, the communication may be executed using a wired data transmission protocol, such as fiber distributed datan interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth™ protocols, wireless universal serial bus (USB) protocols, and/or any other wireless protocol.

It will be appreciated that one or more of the carrier system's 100 components may be located remotely from other carrier system 100 components. Furthermore, one or more of the components may be combined and additional components performing functions described herein may be included in the carrier system 100.

2. Exemplary Mobile Station

Figure 3:
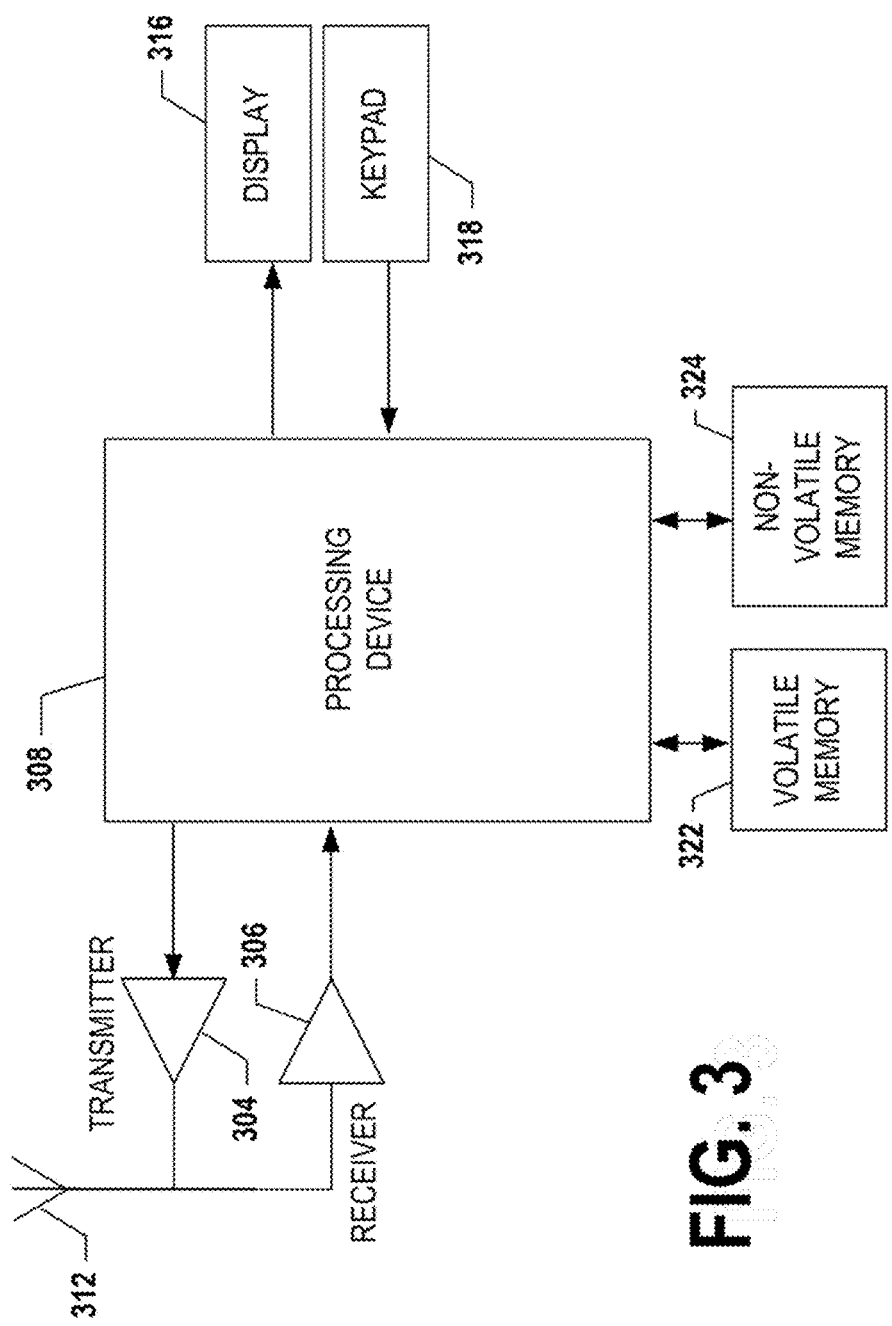
FIG. 3 is an exemplary schematic diagram of a mobile station according to one embodiment of the present invention.

FIG. 3 provides an illustrative schematic representative of a mobile station 105 that can be used in conjunction with the embodiments of the present invention. Mobile stations 105 can be operated by various parties, including carrier personnel (e.g., delivery drivers, sorters, and/or the like). As shown in FIG. 3, the mobile station 105 can include an antenna 312, a transmitter 304 (e.g., radio), a receiver 306 (e.g., radio), and a processing device 308 (e.g., a processor, controller, and/or the like) that provides signals to and receives signals from the transmitter 304 and receiver 306, respectively.

The signals provided to and received from the transmitter 304 and the receiver 306, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of wireless communication standards and protocols, such as those described above with regard to the carrier system 100. In a particular embodiment, the mobile station 105 may operate in accordance with multiple wireless communication standards and protocols (e.g., using a Gobi radio), such as GSM, UMTS, 1×RTT, and EVDO, and use multiple wireless carriers. To do so, the mobile station 105 may include integrated mobile reception diversity and integrated power management. Such a configuration can provide for global connectivity to the user.

Via these communication standards and protocols, the mobile station 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile station 105 can also download changes, add-ons, and updates, for instance, to its firmware, software (e.g., including executable instructions, applications, program modules), and operating system.

According to one embodiment, the mobile station 105 may include a location determining device and/or functionality. For example, the mobile station 105 may include a Global Positioning System (GPS) module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile station 105 may also comprise a user interface (that can include a display 316 coupled to a processing device 308) and/or a user input interface (coupled to the processing device 308). The user input interface can comprise any of a number of devices allowing the mobile station 105 to receive data, such as a keypad 318, a touch display, voice or motion interfaces, or other input device. In embodiments including a keypad 318, the keypad 318 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 322 and/or non-volatile memory 324, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

3. Exemplary Consignee Computing Device

The consignee computing devices 110 may each include one or more components that are functionally similar to those of the carrier system 100 and/or mobile station 105. For example, in one embodiment, each of the consignee computing devices may include: (1) a processor that communicates with other elements via a system interface or bus; (2) a user interface; (3) transitory and non-transitory memory; and (4) a communications interface. As noted, the consignee computing device 110 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignee computing device 110 to interact with and/or cause display of information from the carrier system 100, as described herein. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein. A customer may refer to either a consignor (e.g., a party shipping an item via carrier) or a consignee (e.g., a party receiving an item from a carrier). In the returns context, a consignee who received an item can become a consignor when returning an item.

4. Exemplary Consignor Computing Device

The consignor computing devices 120 may each include one or more components that are functionally similar to those of the carrier system 100 and/or mobile station 105. For example, in one embodiment, each of the consignor computing devices may include: (1) a processor that communicates with other elements via a system interface or bus; (2) a user interface; (3) transitory and non-transitory memory; and (4) a communications interface. As noted, the consignor computing device 120 may comprise a user interface (that can include a display device/input device coupled to a processing element 308) and/or a user input interface (coupled to a processing element 308). For example, the user interface may be a carrier application, browser, user interface, dashboard, webpage, and/or similar words used herein interchangeably executing on and/or accessible via the consignor computing device 120 to interact with and/or cause display of information from the carrier system 100, as described herein. These architectures are provided for exemplary purposes only and are not limiting to the various embodiments. The term "computing device" is used generically to refer to any computer, computing device, desktop, notebook or laptop, distributed system, carrier system, gateway, switch, or other processing device adapted to perform the functions described herein. A customer may refer to either a consignor (e.g., a party shipping an item via carrier) or a consignee (e.g., a party receiving an item from a carrier). In the returns context, a consignor who shipped an item can become a consignee when an item is being returned.

III. EXEMPLARY SYSTEM OPERATION

Figure 4:
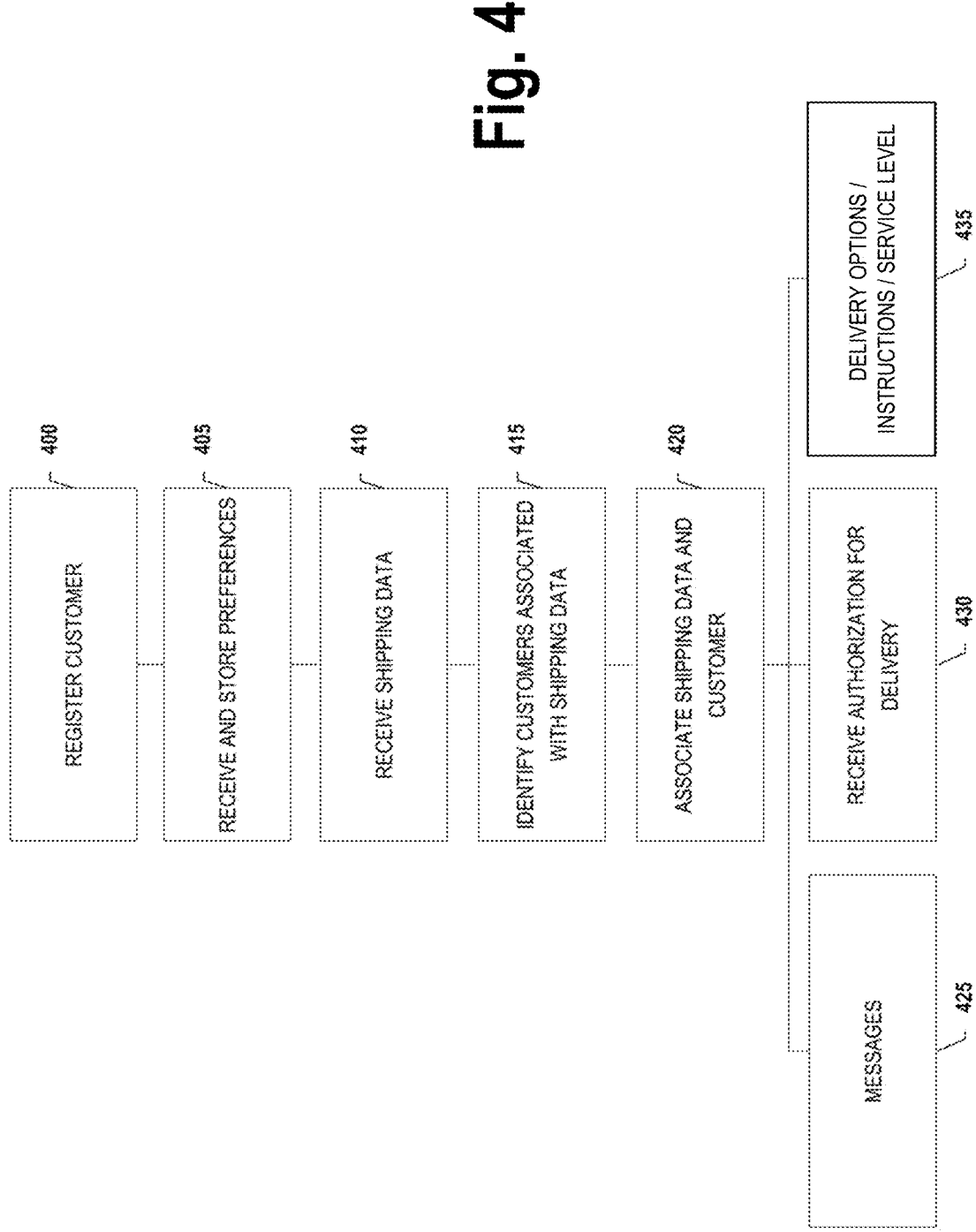
FIGS. 4 and 32 are flowcharts illustrating operations and processes that can be used in accordance with various embodiments of the present invention.
Figure 32:
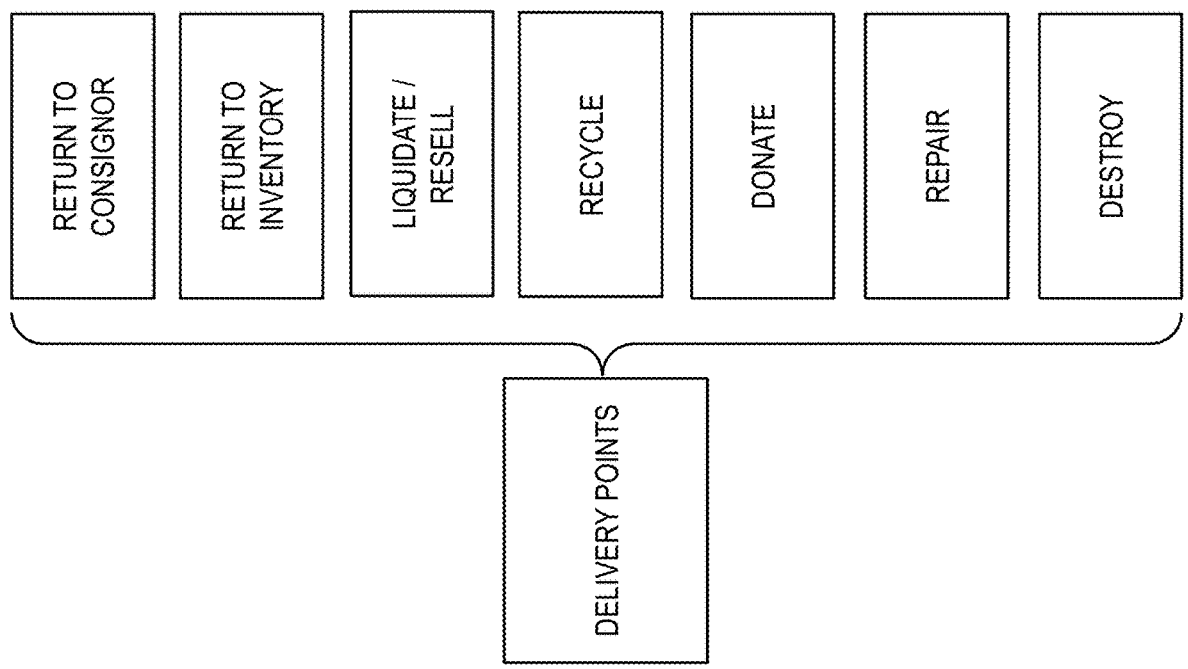

Reference will now be made to FIGS. 4-26. FIGS. 4 and 32 are flowcharts illustrating operations and processes that may be performed for customer controlled management of shipments. FIGS. 5-31 and 33 show exemplary input and output for customer controlled management of shipments.

1. Registration

Figure 5:
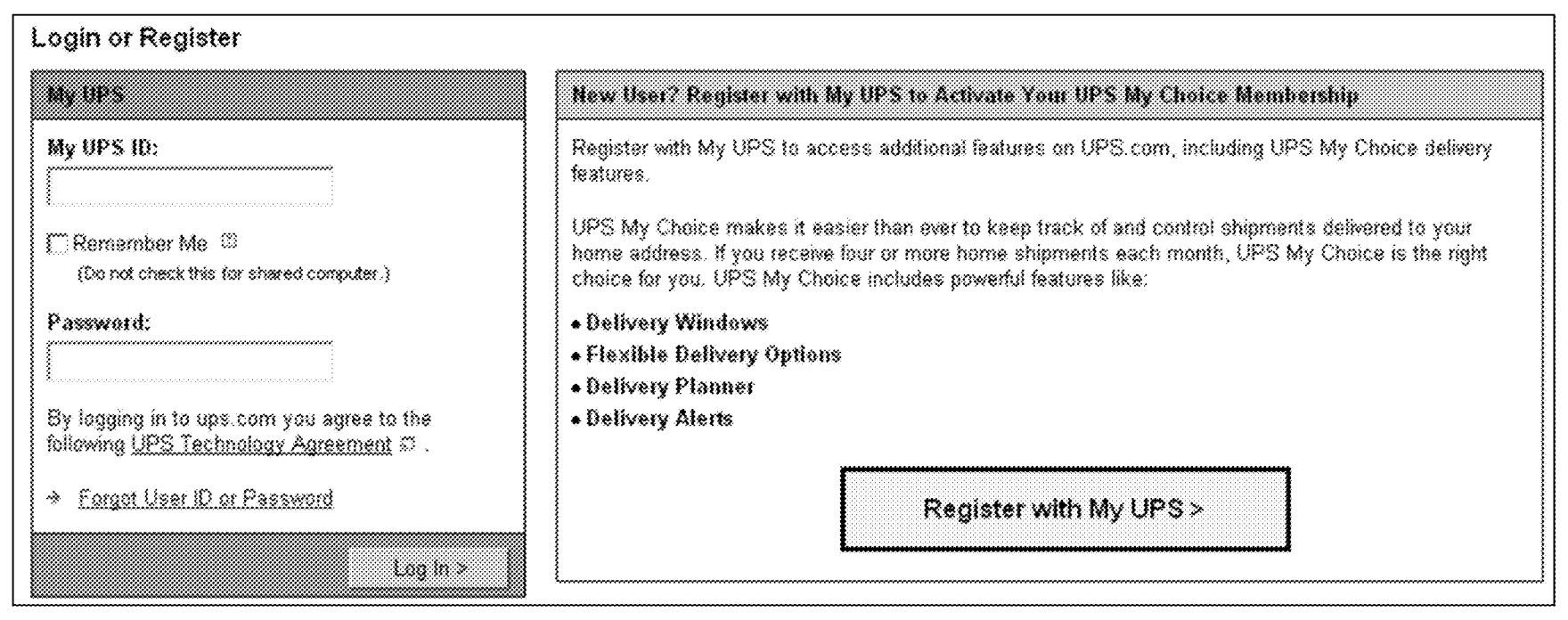
Figure 6:

In one embodiment, as indicated in Block 400 of FIG. 4, the process may begin with the enrollment/registration of one or more customers (e.g., consignors and/or consignees) for a customer pickup, delivery, and/or returns program. A customer (e.g., consignor or consignee) may be an individual, a family, a company, an organization, an entity, a department within an organization, a representative of an organization and/or person, and/or the like. To register, a customer (e.g., a customer or customer representative operating a consignee computing device 110 or consignor computing device 120) may access a webpage or portal of a carrier, such as United Parcel Service of America, Inc. (UPS). For instance, as shown in FIGS. 5 and 6, the carrier system 100 may transmit a webpage that provides the customer with an option of logging into a customer account or enrolling/registering for a customer pickup, delivery, and/or returns program.

In one embodiment, as part of the enrollment/registration process, the customer (e.g., operating a consignee computing device 110 or consignor computing device 120) may be requested to provide biographic and/or geographic information by the carrier system 100 (e.g., via the registration module 270). For instance, the customer may provide the customer's name, such as a first name, a last name, a company name, an entity name, and/or an organization name. The customer (e.g., consignor or consignee) may also provide any aliases associated with the customer. For instance, if the customer (e.g., consignor or consignee) were an individual named Joseph Brown, the customer (e.g., consignor or consignee) may provide Joe Brown or Joey Brown as aliases. The customer (e.g., consignor or consignee) may also provide one or more addresses associated with the customer (e.g., street address, city, state, postal code, and/or country). For instance, Joseph Brown's address may be 105 Main Street, Atlanta, Ga. 30309, USA. As indicated, the customer (e.g., consignor or consignee) may have multiple addresses associated with the account. For instance, Joseph Brown may have a home address and a business address associated with his account. Similarly, an organization may have multiple locations (e.g., addresses) associated with its account. For example, an Amazon account may have one or more address associated with outbound shipments, one or more addresses associated with inbound shipments, and/or one or more addresses associated with return shipments. When multiple addresses are provided, the customer may indicate which address should be used as the primary address. As will be recognized, the customer (e.g., consignor or consignee) may provide other biographic and/or geographic information to adapt to various needs and circumstances.

In one embodiment, once the carrier system 100 receives the necessary biographic and/or geographic information from the customer, the carrier system 100 may perform one or more validation operations. For example, the carrier system 100 may determine whether the primary address (and/or other addresses) in the specified country or postal code is eligible for a customer pickup, delivery, and/or returns program. The carrier system 100 may also determine whether the primary address (and/or other addresses) is valid, e.g., by passing the primary address through one or more address cleansing or standardization systems. The carrier system 100 may perform a variety of fraud prevention measures as well, such as determining whether the customer (e.g., consignor or consignee) or one of the customer's addresses has been "blacklisted" from customer pickup, delivery, and/or returns programs. As will be recognized, a variety of other approaches and techniques can be used to adapt to various needs and circumstances.

In one embodiment, the carrier system 100 may create a customer (e.g., consignor or consignee) profile for the customer via the enrollment/registration process. Accordingly, the carrier system 100 may create and store various customer profiles (e.g., via database 240). In addition to at least the information described above, a customer profile may include one or more corresponding usernames and passwords. Additionally, the carrier system 100 may also create and store a carrier-assigned customer identifier in association with the customer profile. In one embodiment, a carrier-assigned customer identifier may be used to uniquely identify a customer profile. In another embodiment, a carrier-assigned customer identifier may be used to uniquely identify a given address associated with a customer profile. In such an embodiment, if a customer profile is associated with four addresses, the carrier system 100 may create and store four carrier-assigned customer identifiers in association with the customer profile. The carrier-assigned customer identifier may also be stored in association with shipping data for an item to associate the item (and its shipping data) with the (a) correct customer (e.g., customer profile) and/or (b) correct address for a customer.

In one embodiment, a customer profile may correspond to one or more customer pickup, delivery, and/or returns programs. For instance, a customer (e.g., operating a consignee computing device 110 or consignor computing device 120) may subscribe to a specific customer pickup, delivery, and/or returns program. In one embodiment, there may be several customer pickup, delivery, and/or returns programs from which to choose, such as a free customer pickup, delivery, and/or returns program and a premium customer pickup, delivery, and/or returns program. Each customer pickup, delivery, and/or returns program may have different benefits, such as those shown in FIG. 7 and Table 1 below.

TABLE 1

| | Membership Options | |
| --- | --- | --- |
| Services | Member (Free Enrollment) | Premium Member ($40 Annual Subscription) |
| Delivery Alerts | I - Unlimited | I - Unlimited |
| Approximate Delivery Time | I - Unlimited | I - Unlimited |
| Delivery Options | I - Unlimited | I - Unlimited |
| Authorize Shipment Release | I - Unlimited | I - Unlimited |
| Will Call (hold for pickup at a UPS facility) | I - Unlimited | I - Unlimited |
| Printable InfoNotice | I - Unlimited | I - Unlimited |
| Deliver to a Retail Location (UPS Store) | I - $5.00 Fee | I - Unlimited |
| Reschedule Delivery | I - $5.00 Fee | I - Unlimited |
| Deliver to Another Address | I - $5.00 Fee | I - Unlimited |
| "Leave At" Instructions | X | I - Unlimited |
| Leave With Neighbor | X | I - Unlimited |
| Confirmed Delivery Window | X | I - $5.00 Additional Fee |

TABLE 1-continued

| | Membership Options | |
| --- | --- | --- |
| Services | Member (Free Enrollment) | Premium Member ($40 Annual Subscription) |
| Delivery Planner | X | I |
| Close | | |

As shown in Table 1 above and in FIG. 7 for illustrative purposes, the free customer pickup, delivery, and/or returns program and the premium customer pickup, delivery, and/or returns program may have different benefits. For example, the free customer pickup, delivery, and/or returns program may allow customers to have access to certain features, e.g., delivery alerts, approximate delivery times, change delivery options, electronically authorize the release of an item, and/or route items to will call. Similarly, the premium customer pickup, delivery, and/or returns program (e.g., requiring a fee) may allow customers to have access to certain features in addition to those provided via the free customer pickup, delivery, and/or returns program, e.g., route items to other retail locations, reschedule deliveries, request that items be delivered to another address, and/or provide instructions for pickup or delivery. As will be recognized, these features are provided for illustrative purposes and are not limiting to embodiments of the present invention. Moreover, a variety of other approaches and techniques can be used to adapt to various needs and circumstances.

Figure 8:
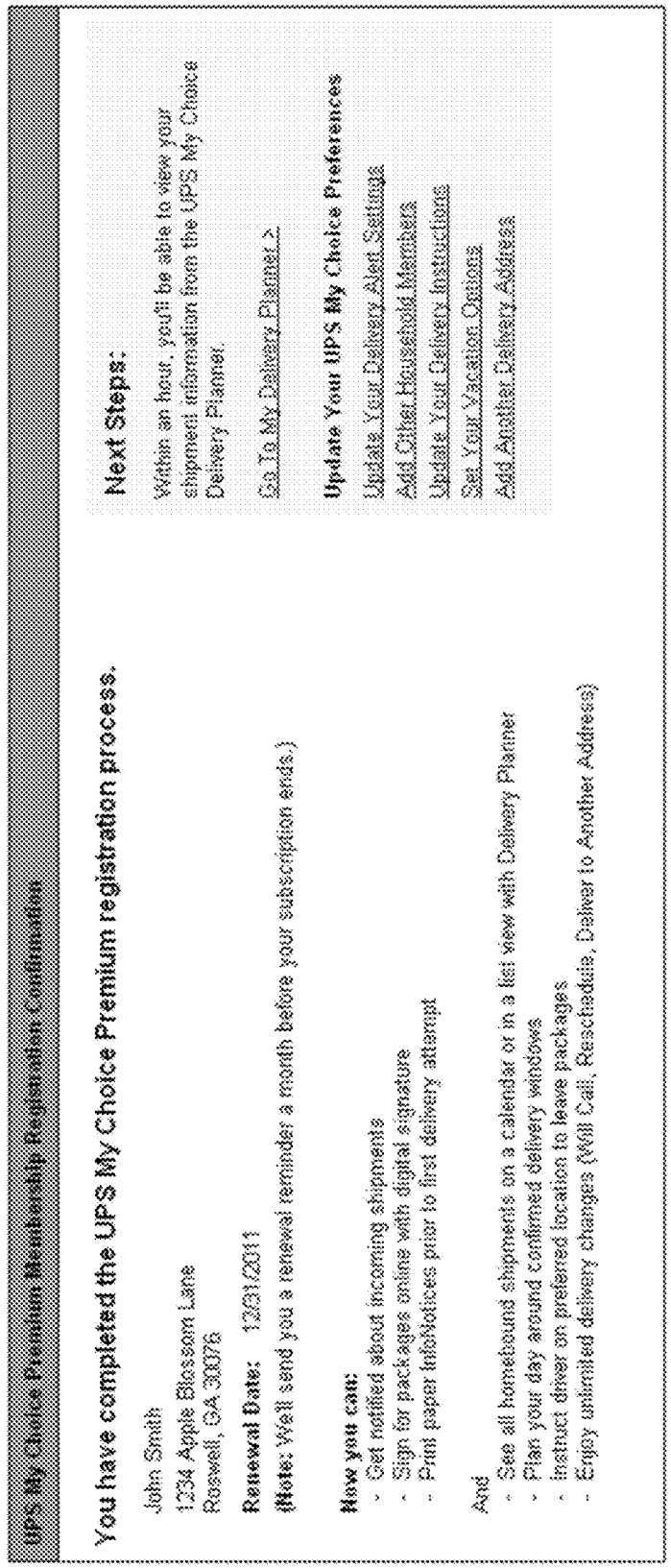
Figure 9:
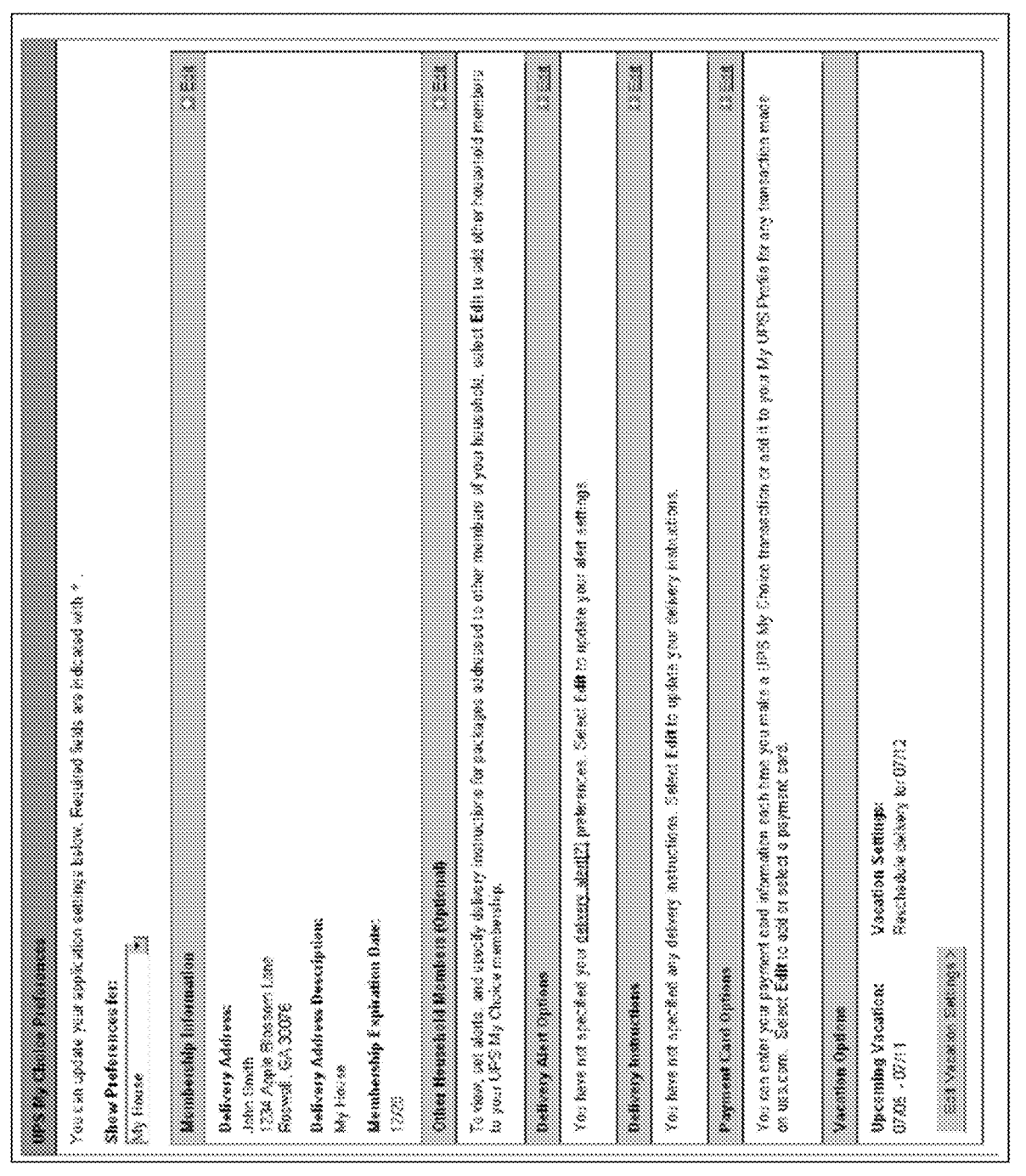

In one embodiment, once a customer profile has been created by the carrier system 100, the customer (e.g., operating a consignee computing device 110 or consignor computing device 120) can provide various preferences associated with the customer pickup, delivery, and/or returns program to the carrier system 100 via a webpage (Block 405 of FIG. 4), for example. For instance, as shown in FIGS. 8 and 9, the customer (e.g., operating a consignee computing device 110 or consignor computing device 120) can provide a variety of preferences, such communication preferences, pickup/delivery preferences, pickup/delivery options, and/or pickup/delivery instructions.

2. Customer and Item Matching

In one embodiment, once a customer (e.g., consignor or consignee) profile has been created by the carrier system 100, one or more items to be delivered to the customer by the carrier may need to be identified. By identifying items to be delivered to the customer, the carrier system 100 can provide the customer with access to various features of a customer pickup, delivery, and/or returns program for the item. As will be recognized, an item may be one or more packages, parcels, bags, containers, loads, crates, items banded together, vehicle parts, pallets, drums, the like, and/or similar words used herein interchangeably. In one embodiment, each item may include an item/shipment identifier, such as a barcode, a MaxiCode, electronic representation, and/or text (e.g., alphanumeric text). The unique item/shipment identifier (e.g., 123456789) may be used by the carrier to identify and track the item as it moves through the carrier's transportation network. Such item/shipment identifiers can be affixed to items by, for example, using a sticker (e.g., label) with the unique item/shipment identifier printed thereon (in human and/or machine readable form) or an RFID tag with the unique item/shipment identifier stored therein. Additionally, or alternatively, as will be described in greater detail below, customer-defined handling identifiers (and/or carrier-assigned customer identifiers) can also be used with the shipment of items being returned, for example. The customer-defined handling identifiers (also referred to herein as handling identifiers) may directly map to a given customer or customer profile and provide various information about handling and transporting the items and/or information about the corresponding customer.

In one embodiment, the carrier system 100 may store an item/shipment identifier, a carrier-assigned customer identifier, and/or a customer-defined handling identifier in association with shipping data for the item. The shipping data may include information about the item, such as delivery service level. For example, the delivery service level may be Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like. The shipping data may include information about the party shipping the item (e.g., consignor), such as the party's address, the party's phone number, the party's return address, the party's name, and/or the like. The shipping data may also include information about the customer to whom the item is to be delivered (e.g., consignee), such as the customer's address (e.g., delivery location), the customer's phone number, the customer's name, and/or the like.

In one embodiment, the shipping data may include information about the item itself and any tracking information. The tracking information may reflect the item's movement in the carrier's transportation network, including expected pickup or delivery date and time. To reflect the item's movement, an item/shipment identifier and/or a customer-defined handling identifier associated with the item may be scanned or otherwise electronically read at various points as the item is transported through the carrier's transportation network. For example, the unique item/shipment identifier, the carrier-assigned customer identifier, and/or the customer-defined handling identifier may be automatically scanned by a barcode or MaxiCode device, an RFID interrogator, by a camera controller, or by a carrier employee using a handheld device (e.g., mobile station 105). In one embodiment, each time the unique item/shipment identifier is scanned or read, an appropriate device can transmit the unique item/shipment identifier and other appropriate information (e.g., location and time of the scan or reading) to the carrier system 100. The carrier system 100 can then receive and use the information to track the item as it is transported though the carrier's transportation network and update the shipping data accordingly.

In one embodiment, the carrier system 100 can use the shipping data, the unique item/shipment identifier, and/or the customer-defined handling identifier to identify one or more customer profiles corresponding to the item (e.g., via the identification module 245). With regard to using shipping data, each customer profile may include one or more addresses associated with the customer. Thus, when the carrier system 100 receives shipping data (or a portion of shipping data) for an item (Block 410 of FIG. 4), the carrier system 100 can automatically determine whether the item corresponds to any customers enrolled/registered for a customer pickup, delivery, and/or returns program. In particular, the carrier system 100 can use the delivery address of the intended recipient (e.g., consignee) in the shipping data for an item to identify any customer profiles with a substantially similar delivery address (Block 415 of FIG. 4). For example, if the shipping data of an item indicates that the delivery address of the intended recipient is 105 Main St., Atlanta, Ga. 30309, the carrier system 100 may identify Joseph Brown's customer profile as corresponding to the item even though the address in Joseph Brown's profile is 105 Main Street, Atlanta, Ga. 30309, USA. In other words, in making such determinations, the carrier system 100 can accommodate variations for a given address. As will be recognized, the carrier system 100 may be configured to compensate for various discrepancies.

In one embodiment, as a secondary measure, the carrier system 100 can use the delivery name of the intended recipient (e.g., consignee) in the shipping data to confirm that the identified customer profile is correct. To do so, the carrier system 100 may compare the delivery name of the intended recipient in the shipping data to the primary name and/or any aliases in the identified customer profile. If the names are substantially similar, the carrier system 100 can confirm that the identified customer profile is correct. By way of example, if the shipping data indicates that the delivery name of the intended recipient is Joe Brown and Joseph Brown listed Joe as a first name alias, the carrier system 100 could confirm Joseph Brown's customer profile as corresponding to the item. As will be recognized, a variety of other approaches and techniques can be used to identify a customer profile corresponding to at least one item to be delivered by the carrier.

As will be recognized, a variety of techniques and approaches can be used to adapt to various needs and circumstances. For example, in one embodiment, the customer-defined handling identifier and/or the carrier-assigned customer identifier may be used to identify the corresponding customer from or to whom items are being shipped. Similarly, the unique item/shipment identifier may be used for similar purposes.

In one embodiment, after identifying the appropriate customer profile (e.g., based on the shipping data, the carrier-assigned customer identifier, the unique item/shipment identifier, and/or the customer-defined handling identifier), the carrier system 100 can associate the shipping data with the customer profile (Block 420 of FIG. 4). This may include appending the shipping data with the appropriate carrier-assigned customer identifier (or other identifier corresponding to the customer profile). For instance, the shipping data for all shipments corresponding to Joseph Brown's customer profile may be appended with the carrier-assigned customer identifier (or other identifier) created for Joseph Brown. In various embodiments, using this approach allows items (and their shipping data) to be linked to appropriate customer profiles. Thus, when Joseph Brown accesses his account, he can view all of his shipments (e.g., those shipments with shipping data appended with his carrier-assigned customer identifier (or other identifier)). Similarly, any actions selected by the customer for an item can be passed to the shipping data for the item.

3. Item Tracking

Figure 11:
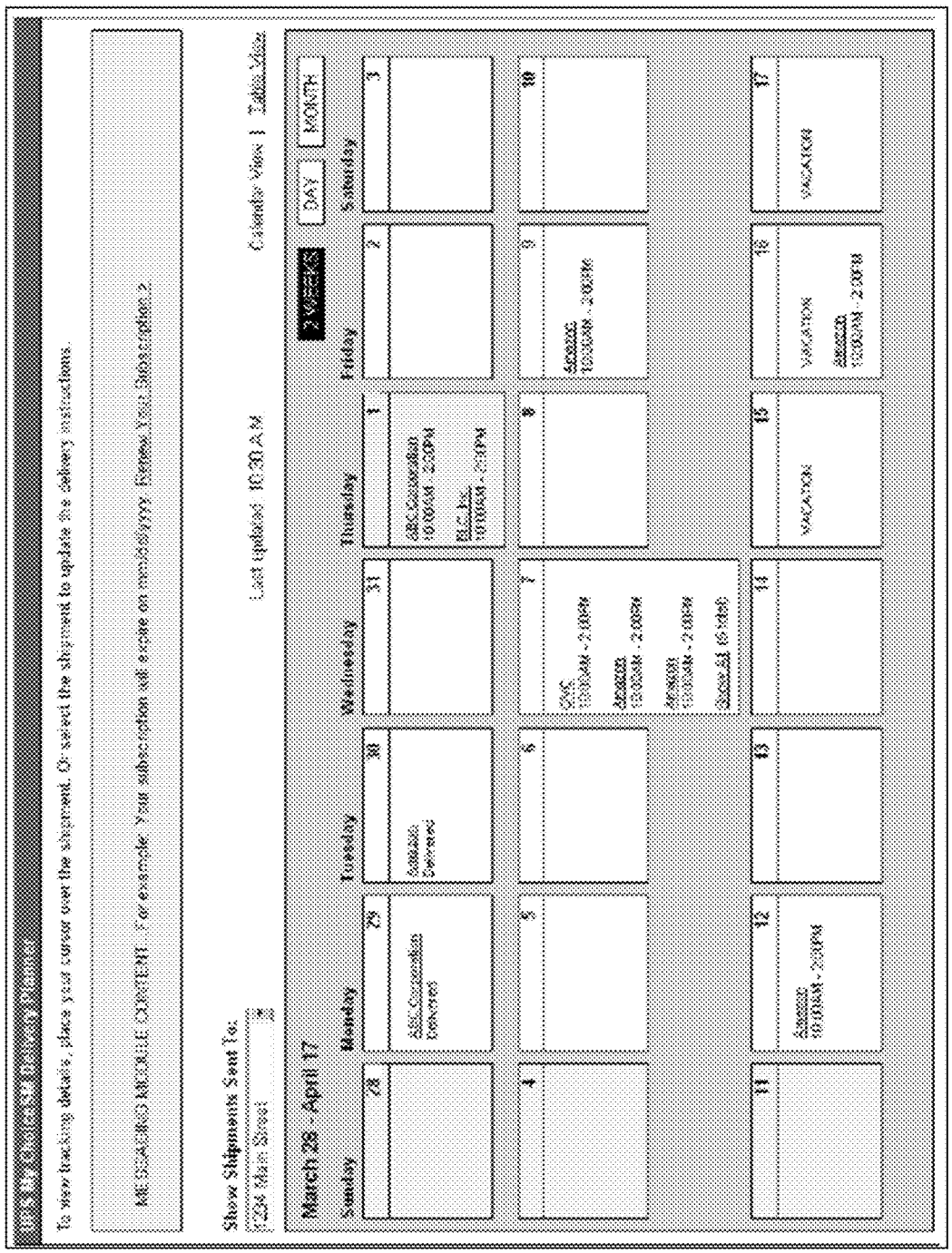
Figure 12:
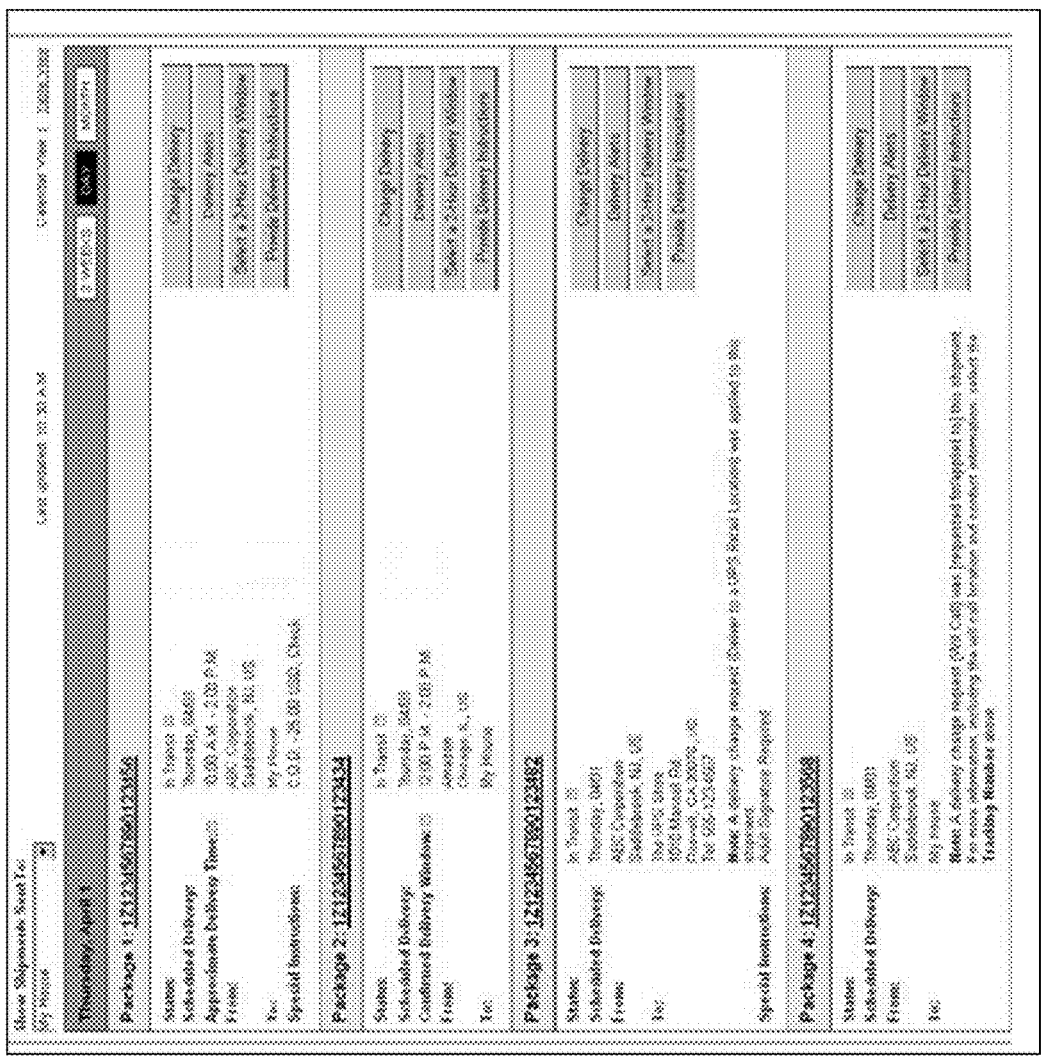

In one embodiment, by appending the shipping data with the appropriate carrier-assigned customer identifier, the corresponding customer can view tracking information for any shipments associated with the customer profile. For instance, as shown in FIGS. 10-12, the carrier system 100 can be used to identify (e.g., retrieve the shipping data with the appropriate carrier-assigned customer identifier) all shipments associated with a customer (e.g., customer profile) using the carrier-assigned customer identifier (and/or item/shipment identifier and/or a customer-defined handling identifier) and provide them to the customer for viewing in a customer-friendly format, such as via an interface (e.g., browser, dashboard, application). For example, FIG. 10 shows an interface (e.g., browser, dashboard, application) with a list of all inbound shipments to a customer. FIG. 11 shows an interface (e.g., browser, dashboard, application) with a calendar (which may have a day view, a week view, a multiple week view, and/or a month view) having a list of all inbound shipments to a customer. In FIG. 11, the calendar is sorted by delivery address, indicating that the customer has more than one delivery address associated with the customer profile. FIG. 12 shows another an interface (e.g., browser, dashboard, application) with a list of all inbound shipments to a customer. As will be recognized, a variety of other approaches and techniques can be used to adapt to various needs and circumstances, such as only displaying the deliveries for a defined time period (e.g., the past 90 days)

In various embodiments, these concepts can provide customers with ongoing visibility of all inbound packages (e.g., FIGS. 10, 11, and 12), as well as preferences, regardless of carrier. Such multi-carrier techniques are described in U.S. Publ. No. 20130024525, which is incorporated herein in its entirety. For instance, for each item, the interface (e.g., browser, dashboard, application) can be used to show the unique item/shipment identifier, the customer-defined handling identifier, the carrier-assigned customer identifier, the item price, the shipping cost, the order number, the order date, a status indicator, a pickup or delivery indicator, last activity scan date, a non-confirmed pickup or delivery window, a confirmed pickup or delivery window a commit time, whether an in-person signature is requested for delivery, a pickup or delivery service level, and/or various other information. Thus, through such an interface (e.g., browser, dashboard, application), customers (e.g., operating customer computing devices 110/120) can review and access all inbound shipments (from one or more carriers) using a single interface. As will be recognized, though, a variety of other approaches and techniques can be used to provide tracking information to a customer.

4. Messages/Alerts

Figure 13:

In one embodiment, the interface (e.g., browser, dashboard, application) in communication with the carrier system 100 can be used to customize and/or provide communication preferences regarding items to be delivered to customers (shown in FIG. 13). For example, the communication preferences may provide customers with the ability to request messages, alerts, notifications, and/or similar words used herein interchangeably at various stages of the delivery and reverse logistics cycles. In the returns context, such messages can be used to address the challenge of operational planning for "lumpy" return volume and to reduce end-to-end cycle times for processing recovered assets.

In one embodiment, as shown in FIG. 14, a customer (e.g., operating a consignee computing device 110 or consignor computing device 120) can identify one or more communication formats for communicating with the customer. The communication formats may include text messages (e.g., Short Message Service (SMS) and/or Multimedia Messaging Service (MMS), email messages, voice messages, and/or a variety of other messages in various communication formats. In addition to identifying one or more communication formats, the customer (e.g., operating a consignee computing device 110 or consignor computing device 120) can identify the corresponding electronic destination addresses to be used in providing information regarding items to be delivered to the customer. For instance, for text messages, the customer may provide one or more cellular phone numbers. For email messages, the customer may provide one or more email addresses. And for voice messages, the customer may provide one or more cellular or landline phone numbers. Additionally, in one embodiment, validation operations can be performed with respect to each input destination address—to ensure their accuracy. As will be recognized, a variety of other types of destination addresses can be used to adapt to various needs and circumstances.

In one embodiment, customers (e.g., operating a consignee computing device 110 or consignor computing device 120) may indicate the type of messages they want to receive (e.g., the content). For example, a customer may indicate that he only wants to receive messages when the shipping data for an item indicates that an in-person signature from the customer is requested for delivery of the item, when the pickup or delivery options for the item can be changed, when instructions for pickup or delivery of the item can be provided, or when the pickup or delivery service level of the item can be changed. In another example, a customer may indicate that he wants to receive messages for all items to be delivered to the customer with expected delivery dates and delivery times. In yet another example, a customer may indicate that it wants to receive message for returns that have been authorized for return, sorted, consolidated, shipped, repaired, refurbished, recycled, disposed of, and/or the like. As will be recognized, customers may indicate that they want to receive messages regarding items in a variety of other circumstances.

In one embodiment, customers (e.g., operating a consignee computing device 110 or consignor computing device 120) may identify/define time periods in which the messages providing information regarding items to be delivered should be transmitted to the customer (e.g., including real-time or near real-time). For instance, the time periods may include (a) after shipment and the day before an item is delivered and (b) after shipment and the morning of the day of delivery. In such cases, the messages can serve as a reminder to the customer that an item is being delivered. Similarly the time periods may be after delivery for confirmation of delivery. The carrier system 100 can store communication preferences for providing information in association with the customer profiles. Moreover, the communication preferences may apply to the customer profile globally, to selected customer addresses, to groups of items, and/or on an item-by-item basis.

In one embodiment, customers (e.g., operating a consignee computing device 110 or consignor computing device 120) may identify/define triggering events (e.g., one or more parameters) for which the messages providing information regarding items should be transmitted to the customer (e.g., including real-time or near real-time). For instance, the triggering events (e.g., one or more parameters) may be generating a label or receipt for returning an item, authorizing an item for return, receiving/collecting an item from a consignor for induction into the carrier's transportation and logistics network, sortation and/or consolidation of items as defined by a customer-defined handling identifier for returns, delivery of items to intermediate or final delivery points, after a repair has been started or completed for an item, and/or the like. The carrier system 100 can store such communication preferences for providing information in association with the customer profiles. Moreover, the communication preferences may apply to the customer profile globally, to selected customer addresses, to groups of items, and/or an item-by-item basis.

In one embodiment, the carrier system 100 may impose time constraints for placing, generating, and/or transmitting messages within the time periods identified by the customers. For example, the carrier system 100 may only transmit text messages to customers between 6:00 am-11:00 pm (based on time zones). Similarly, the carrier system 100 may place calls and transmit automated voice messages between 8:00 am-9:00 pm (based on time zones). And for email messages, the carrier system 100 may generate and transmit them without time constraints.

Figure 15B:
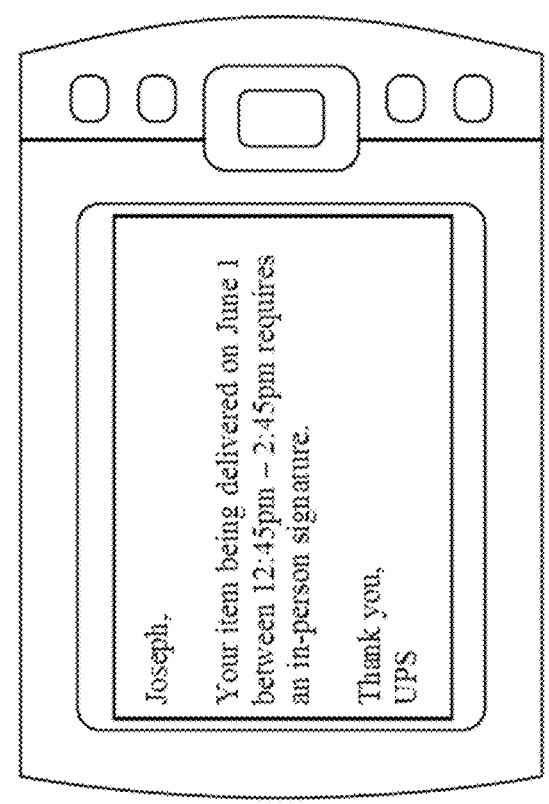
Figure 15A:
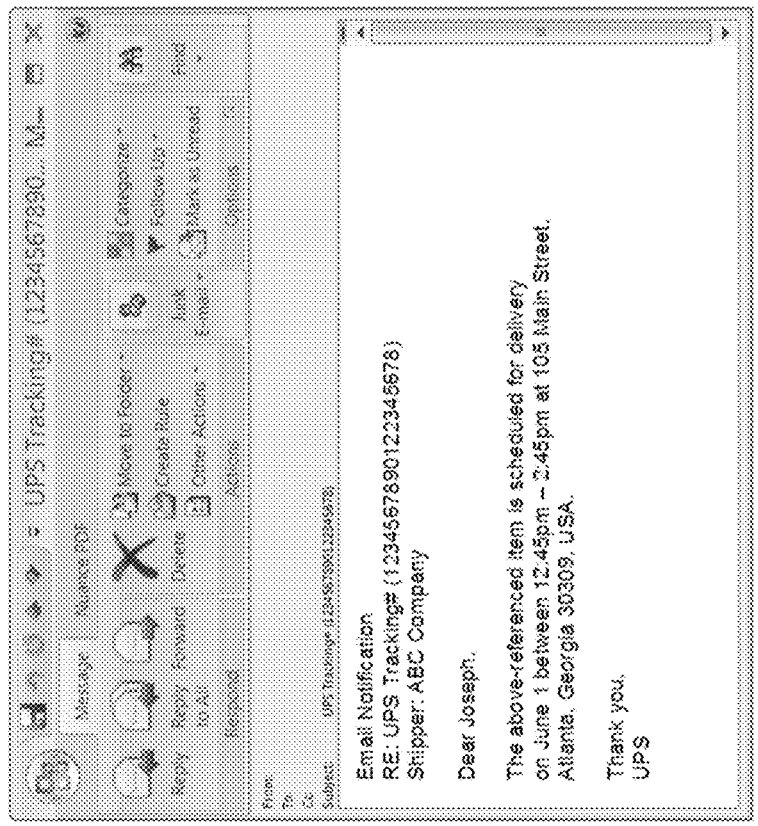

In one embodiment, the carrier system 100 can automatically generate (e.g., via the message module 260) one or more messages providing information regarding an item to be delivered to the customer (Block 425 of FIG. 4) in compliance with the customer's communication preferences and/or the carrier's time constraints. Similarly, the carrier system 100 can automatically transmit the one or more messages to the electronic destination addresses in compliance with the customer's communication preferences and the carrier's time constraints. For example, the carrier system 100 may generate (including select) and transmit an email message to Joseph Brown's email address and a text message to Joseph's cellular phone the day before an item is to be delivered to Joseph's home address. The messages may indicate the expected delivery date and/or delivery time, such as shown in FIGS. 15A and 15B, and a variety of other information. Similarly, the carrier system 100 can transmit notification messages to Amazon, for example, when corresponding triggering events (e.g., one or more parameters) for returns occur. As will be recognized, a variety of other operations and processes may be used with embodiments of the present invention. These operations and processes can be customized to adapt to various needs and circumstances.

5. Pickup/Delivery Times

Figure 16:
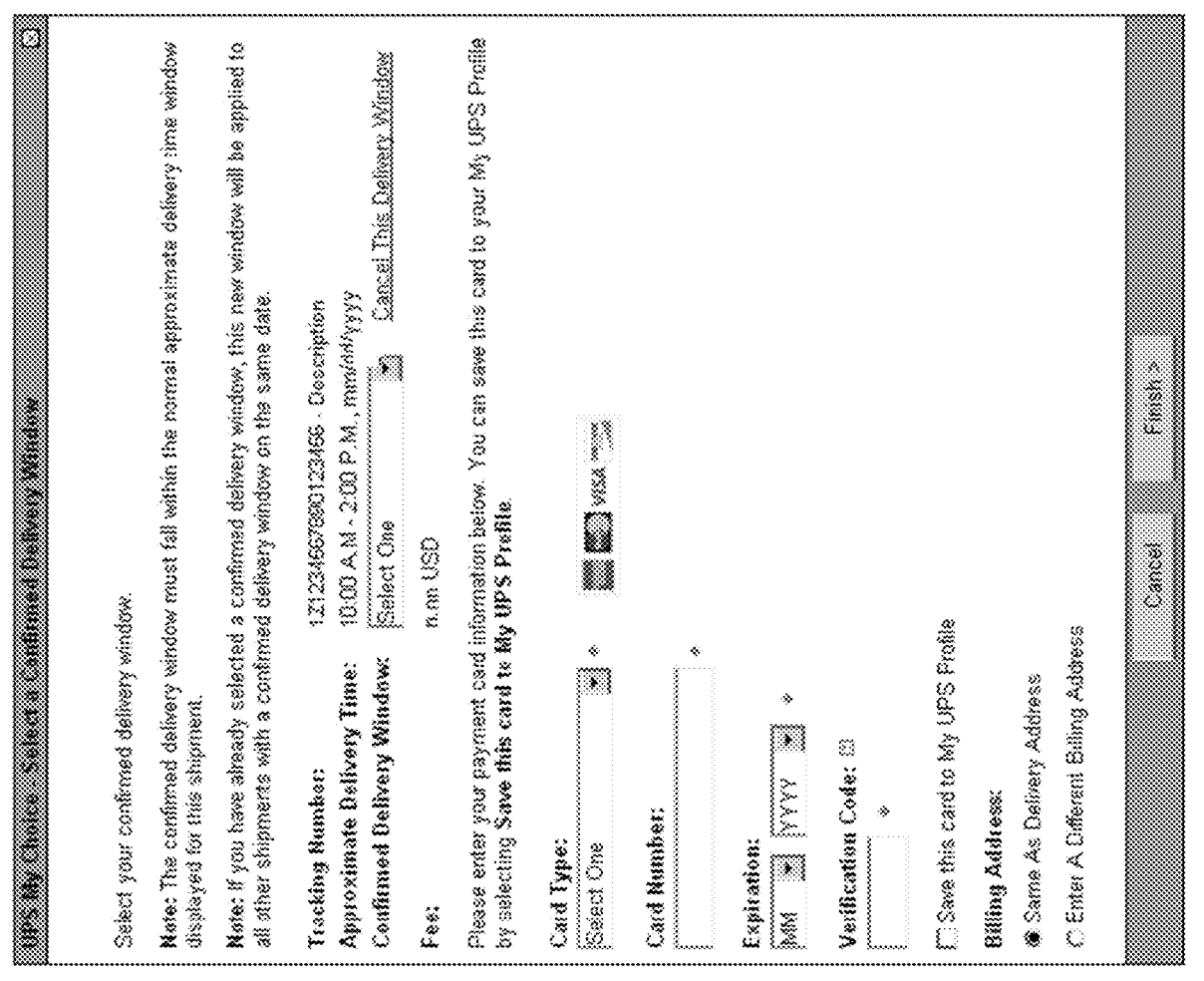
Figure 17:
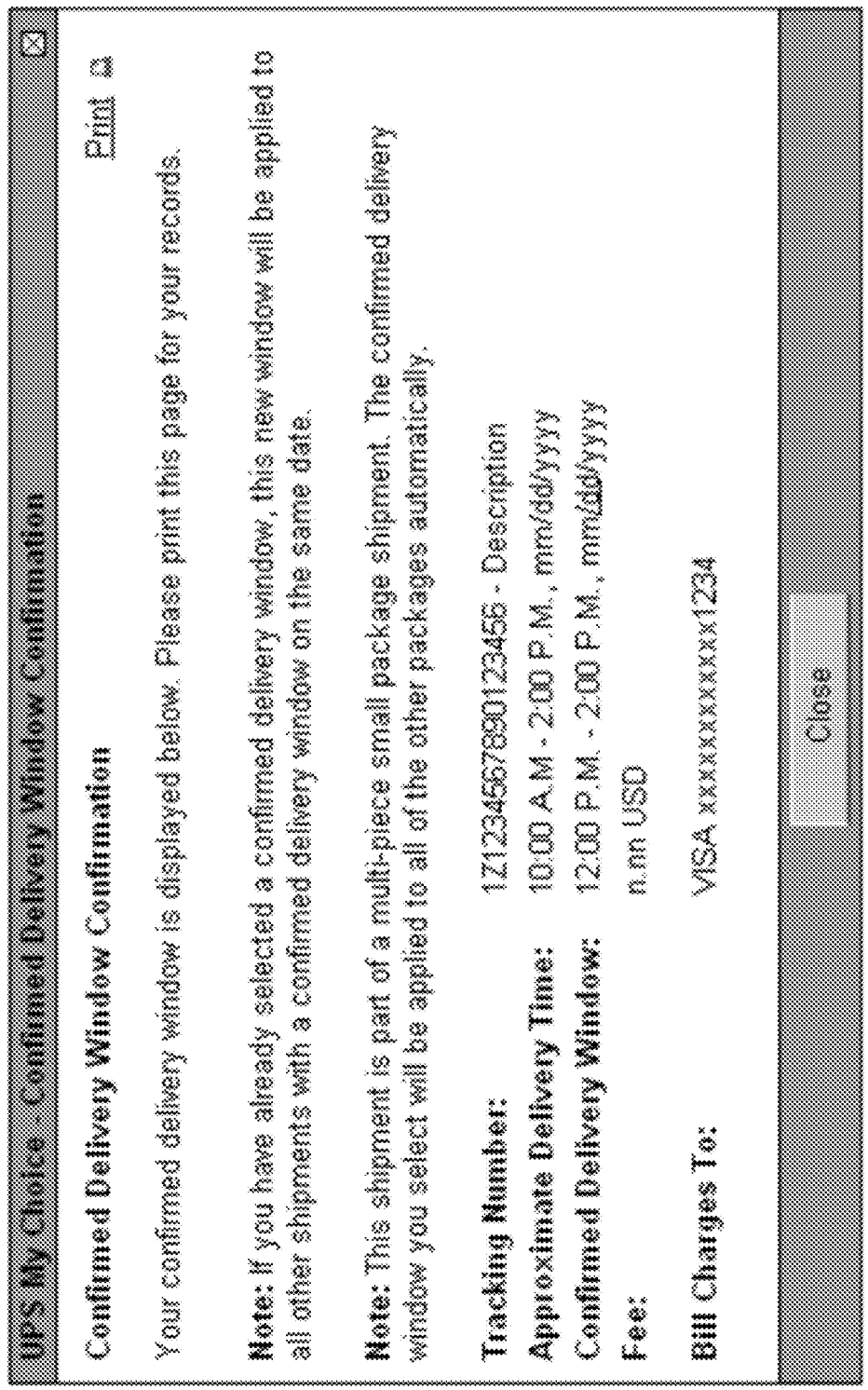

In one embodiment, the interface (e.g., browser, dashboard, application) can be used to view expected pickup or delivery times (estimate pickup or delivery windows and/or confirmed pickup or delivery windows). In one embodiment, estimated time windows may indicate an estimated pickup or delivery time of an item based on historical pickup or delivery times to the area. Such information may be included in messages to customers prior to the first pickup or delivery attempt. As shown in FIG. 13, the interface (e.g., browser, dashboard, application) may also be used by the customer (e.g., operating an appropriate customer computing device 110/120) to request that items be delivered within a delivery window. That is, the customer may want an item delivered within a specific time window. The carrier may provide such services as part of a customer pickup, delivery, and/or returns program or on a fee basis, as shown in FIGS. 16 and 17. Table 2 below provides illustrative estimated delivery windows and confirmed pickup or delivery windows from which the customer can select to have an item picked up or delivered.

TABLE 2

| Estimated Windows | Confirmed Windows |
|---|---|
| 11:45 am-3:45pm | 11:45 am-1:45 pm |
| | 12:45 pm-2:45 pm |
| | 1:45 pm-3:45 pm |
| 11:30 am-3:30 pm | 11:30 am-1:30 pm |
| | 12:30 pm-2:30 pm |
| | 1:30 pm-3:30 pm |
| 2:00 pm-5:45 pm | 2:00 pm-4:00 pm |
| | 3:45 pm-5:45 pm |
| 1:00 pm-4:15 pm | 1:00 pm-3:00 pm |
| | 2:15 pm-4:15 pm |
| 8:00 am-11:00 pm | 8:00 am-10:00 am |
| | 9:00 am-11:00 am |
| 3:00 pm-6:00 pm | 3:00 pm-5:00 pm |
| | 4:00 pm-6:00 pm |

TABLE 2-continued

| Estimated Windows | Confirmed Windows |
|---|---|
| 3:00 pm-5:45 pm | 3:00 pm-5:00 pm |
| | 3:45 pm-5:45 pm |
| 4:00 pm-6:00 pm | 4:00 pm-6:00 pm |

Additional information regarding estimated delivery windows and confirmed delivery windows can be found in U.S. Pat. Nos. 6,701,299, 7,233,907, and 7,925,524, all of which are incorporated herein in their entireties by reference. As will be recognized, a variety of other operations and processes may be used with embodiments of the present invention. These operations and processes can be customized to adapt to various needs and circumstances.

6. Electronic Authorization for Item Release

In one embodiment, consignors, consignees, and/or the carrier may request that a recipient's signature be obtained at the point of delivery for certain items. In-person signature requests may be for high-value and/or high-risk items, such as cellular phones, computers, narcotic medications, and/or a variety of other items. Similarly, in-person signature requests may be designated by the carrier for items being delivered in non-driver release areas. A non-driver release area may be an area in which items have been stolen after being left at the delivery location (e.g., not delivered to a person) and/or for various other reasons. The following describes two separate approaches for delivering such packages without in-person signatures.

A. Electronic Authorization for Item Release

In one embodiment, items that are shipped with a request for an in-person signature at the point of delivery may have a non-driver release status. The non-driver release status may be indicated in the shipping data. For example, the shipping data for an item may indicate that an in-person signature from a recipient (e.g., customer or representative of the customer) is requested for delivery of the item. In one embodiment, such information may be displayed via the interface (e.g., browser, dashboard, application)—shown in FIG. 13. For instance, the shipping data for the item represented in FIG. 13 indicates that an in-person signature is requested for delivery of the item. In addition to an in-person signature, in this example, payment of $25.00 is also needed for delivery.

In one embodiment, the customer (e.g., operating a consignee computing device 110 or consignor computing device 120) may electronically authorize delivery of the item without an in-person signature. To do so, the customer (e.g., operating a consignee computing device 110 or consignor computing device 120) may electronically authorize release of the item without an in-person signature through the interface (e.g., browser, dashboard, application) in communication with the carrier system 100, for example. Operatively, in one embodiment, the customer (e.g., operating a consignee computing device 110 or consignor computing device 120) may select a hyperlink (e.g., shown in FIG. 13) that reads "Authorize Shipment Release." After (e.g., in response to) the carrier system 100 receives the request to authorize shipment release, the carrier system 100 can provide the appropriate information via the interface (e.g., browser, dashboard, application) for the customer. For instance, as shown in FIG. 18, the carrier system 100 may provide an interface (e.g., browser, dashboard, application displayed via a consignor/consignee computing device) that provides a disclaimer for delivering the item without an in-person signature (e.g., delivering the item by leaving it at a front door of a house). The interface (e.g., browser, dashboard, application) may require the customer to check a box, type in his name, and/or perform other affirmative steps. The appropriate customer computing device 110/120 can then transmit the input authorization to the carrier system 100. The carrier system 100 can then receive the input authorization to deliver the item without an in-person signature (Block 430 of FIG. 4). After (e.g., in response to) receiving the authorization, the carrier system 100 can update the shipping data to reflect that the item can now be delivered without an in-person signature at the point of delivery.

In certain embodiments, an electronic authorization may have the same effect as an in-person signature at the point of the delivery. Such electronic signatures may apply to the customer profile globally (e.g., allowing all items for a particular address to be delivered without in-person signatures), to selected customer addresses, to groups of items, and/or an item-by-item basis. Such authorizations may be provided prior to the first delivery attempt by the carrier, further streamlining carrier operations and increasing customer satisfaction.

In addition to providing for electronic authorization to release items, the carrier system 100 can provide for payment of items so that cash-on-delivery items do not require an in-person transaction for delivery. As will be recognized, a variety of other operations and processes may be used with embodiments of the present invention. These operations and processes can be customized to adapt to various needs and circumstances.

B. Automatic Electronic Authorization for Item Release

In one embodiment, an interface (e.g., browser, dashboard, application) in communication with the carrier system 100 can be used to automatically authorize delivery of items without in-person signatures even when the corresponding shipping data indicates that in-person signatures are requested for delivery. For example, the customer (e.g., operating a consignee computing device 110 or consignor computing device 120) may access the interface (e.g., browser, dashboard, application) in communication with the carrier system 100 to provide authorization to allow all (or select) items to be delivered without in-person signatures even when the corresponding shipping data indicates that in-person signatures are requested for delivery.

Operatively, in one embodiment, the customer (e.g., operating a consignee computing device 110 or consignor computing device 120) may select a hyperlink (e.g., shown in FIG. 13) that reads "Authorize All Shipment Release." After (e.g., in response to) the carrier system 100 receives the request to authorize the release of all (or select) items, the carrier system 100 can provide the appropriate information via the interface (e.g., browser, dashboard, application) for the customer. For instance, as shown in FIG. 18, the carrier system 100 may provide an interface (e.g., browser, dashboard, application displayed via a consignor/consignee computing device) that provides a disclaimer for delivering the items without in-person signatures (e.g., delivering the item by leaving it at a front door of a house). The interface (e.g., browser, dashboard, application) may require the customer to check a box, type in his name, and/or perform other affirmative steps to properly acknowledge consent. The appropriate customer computing device 110/120 can then transmit the input authorization to the carrier system 100. The carrier system 100 can then receive the input authorization to deliver the items without in-person signatures (Block 430 of FIG. 4). After (e.g., in response to) receiving the authorization, the carrier system 100 can update the customer profile to reflect that the items with corresponding shipping data indicating that in-person signatures are requested for delivery can be delivered without in-person signatures. This feature can be configured for items that have yet to be purchased, shipped, or delivered (e.g., for future transactions).

Thus, when an item to be delivered to the customer is matched to the customer profile and has corresponding shipping data indicating that an in-person signature is requested for delivery, the carrier system 100 can automatically change the corresponding shipping data to reflect that the item can be delivered without an in-person signature (e.g., based on the customer profile). In certain embodiments, this may require applying a new item/shipment identifier and/or label. For example, the carrier system 100 can transmit to the appropriate mobile stations 105 (and/or other computing entities) updated shipping data indicating that the item can be delivered without an in-person signature. In one embodiment, the appropriate mobile stations 105 (and/or other computing entities) can receive the updated shipping data. Then, when carrier personnel sorting items or loading delivery vehicles, for example, scan the unique item/shipment identifier (e.g., using a mobile station 105), the mobile station 105 can provide the carrier personnel with an indication that the item can be delivered without an in-person signature. This may include indicating that a new label (and/or item/shipment identifier) needs to be affixed to the item. The item can then be transported and delivered with the new label by the carrier and delivered without requiring an in-person signature.

In another embodiment, this feature may also require that items satisfy certain criteria in order to automatically allow an item to be delivered without an in-person signature. For example, the customer may indicate that only items originating from identified consignors (e.g., Amazon, Lands' End, William Robinson, etc.) can be delivered without in-person signatures. In this example, customer Joseph Brown can update his customer profile such that all items to be delivered to him that originate from Lands' End are to be delivered without in-person signatures. Thus, as described above, in this example, all items to be delivered to Joseph Brown originating from Lands' End can be delivered without in-person signatures (if they were originally requested). As will be recognized, a variety of other approaches and techniques can be used to adapt to various needs and circumstances.

In various embodiments, the carrier may include such services as part of a customer pickup, delivery, and/or returns program and/or require a fee on a transaction basis. Moreover, a variety of other operations and processes may be used with embodiments of the present invention. For example, such features can be used in conjunction with customer and item matching features, item tracking features, messaging features, delivery time features, instructions for delivery features, delivery option features, and/or the like. Thus, these operations and processes can be customized to adapt to various needs and circumstances.

7. Instructions for Pickup or Delivery

In one embodiment, pickup or delivery persons working for a carrier (and other carrier personnel) may carry and operate mobile stations 105 to assist in the pickup or delivery of items. For example, shipping data (or at least a portion of shipping data) corresponding to items to be delivered can be transmitted regularly, periodically, continuously, and/or on demand to the appropriate mobile stations 105. Thus, for instance, carrier personnel can scan an item/shipment identifier on an item (e.g., using a mobile station 105) to view information about the pickup or delivery of the item. The mobile station 105 may also be used to provide instructions for pickup or delivery to carrier personnel. The instructions may include information, such as where an item should be left at a delivery location and/or access codes needed to pick up or deliver an item. The pickup or delivery person can also use the mobile station 105 to record information about the pickup or delivery of the item, such as where and at what time the item was picked up or delivered.

As will be recognized, in one embodiment, an interface (e.g., browser, dashboard, application) in communication with the carrier system 100 (e.g., via the delivery options module 250) can be used to provide instructions regarding items to be delivered to customers (e.g., prior to a delivery attempt by the carrier). For example, the customer (e.g., operating a consignee computing device 110 or consignor computing device 120) may access the interface (e.g., browser, dashboard, application) to view items to be delivered. The interface (e.g., browser, dashboard, application) may also provide the customer with the option of providing instructions for delivering one or more items.

In one embodiment, to provide such instructions, the customer (e.g., operating a consignee computing device 110 or consignor computing device 120) may select a button (e.g., shown in FIG. 13) that reads "Provide Delivery Instructions." After (e.g., in response to) the carrier system 100 receives the request to provide instructions, the carrier system 100 can provide the information to the customer via an appropriate interface (e.g., browser, dashboard, application). For instance, as shown in FIGS. 19A, 19B, and 20, the carrier system 100 may provide an interface (e.g., browser, dashboard, application) to the customer (e.g., displayed via an appropriate customer computing device 110/120) that provides the ability to input (e.g., via an input form) one or more instructions for using a code to enter an area proximate the pickup or delivery address, such as building code(s), door code(s), and/or gate code(s). The carrier system 100 may also provide an interface (e.g., browser, dashboard, application) to the customer (e.g., displayed via an appropriate customer computing device 110/120) that provides the ability to input (e.g., via a drop-down menu) one or more instructions that identify a location at the delivery address at which the item should be left. Table 3 below provides illustrative instructions and corresponding codes.

TABLE 3

| Leave-At Instructions | Optional |
| --- | --- |
| Leave at - Front Door | Security Code to Access Front Door |
| Leave at - Rear Door | Security Code to Access Rear Door |
| Leave at - Side Door | Security Code to Access Side Door |
| Leave at - Garage | Security Code to Access Garage |
| Leave at - Porch | Security Code to Access Porch |
| Leave at - Deck | Security Code to Access Deck |
| Leave at - Patio | Security Code to Access Patio |
| Leave at - Reception | Security Code to Access Reception |
| Leave at - Management Office | Security Code to Access Office |
| Leave at - Door Person | Security Code to Reach Door Person |
| Leave at - Neighbor | Security Code for Neighbor |

Figure 21:

In one embodiment, as indicated in Block 435 of FIG. 4, the carrier system 100 can receive the one or more instructions for delivery (e.g., before a first delivery attempt). After (e.g., in response to) receiving the one or more instructions for delivery, the carrier system 100 can update the shipping data to reflect that the item should be delivered in accordance with the one or more instructions. The updated shipping data (or at least a portion of updated shipping data) can be transmitted regularly, periodically, continuously, and/or on demand by the carrier system 100 to the appropriate mobile stations 105. The appropriate mobile station 105 can receive the updated shipping data (or at least a portion of updated shipping data). Then, a delivery person can scan an item/shipment identifier on an item (e.g., using a mobile station 105) to view information about the delivery of the item, and the updated shipping data (or at least a portion of updated shipping data) can be displayed, including the one or more instructions for delivery. The delivery person can then deliver the item in accordance with the one or more instructions for delivery. For instance, as shown in FIG. 21. The instructions may be to leave an item at a rear door at a delivery location and further provide a gate code needed to access the rear door. A variety of other instructions for pickup or delivery can be provided as well.

As will be recognized, the one or more instructions for pickup or delivery may apply to the customer profile globally (e.g., providing that all items be delivered in accordance with the instructions), to selected customer addresses, to groups of items, and/or an item-by-item basis. As indicated, such instructions may be provided prior to the first delivery attempt by the carrier. Moreover, a variety of other operations and processes may be used with embodiments of the present invention. These operations and processes can be customized to adapt to various needs and circumstances. For instance, the carrier may include such services as part of a customer pickup, delivery, and/or returns program and/or require a fee.

8. Pickup/Delivery Options

In one embodiment, as described, shipping data (or at least a portion of shipping data) corresponding to items to be delivered can be transmitted regularly, periodically, continuously, and/or on demand by the carrier system 100 to the appropriate mobile stations 105. Thus, for instance, carrier personnel can scan an item/shipment identifier on an item (e.g., using a mobile station 105) to view, access, provide, and/or retrieve information about the item or pickup or delivery of the item. In one embodiment, shipping data can be updated to change pickup or delivery options, such as changing the pickup or delivery location, the pickup or delivery date, the pickup or delivery time, and/or the pickup or delivery service level.

A. Non-Vacation Delivery Options

In one embodiment, an interface (e.g., browser, dashboard, application) in communication with the carrier system 100 (e.g., via the delivery options module 250) can be used to change delivery options regarding items to be delivered to customers (e.g., prior to a delivery attempt by the carrier). For example, the customer (e.g., operating a consignee computing device 110 or consignor computing device 120) may access the interface (e.g., browser, dashboard, application) in communication with the carrier system 100 to view items to be delivered. The interface (e.g., browser, dashboard, application) may provide the customer with the option of changing delivery options for one or more items.

Figure 22:
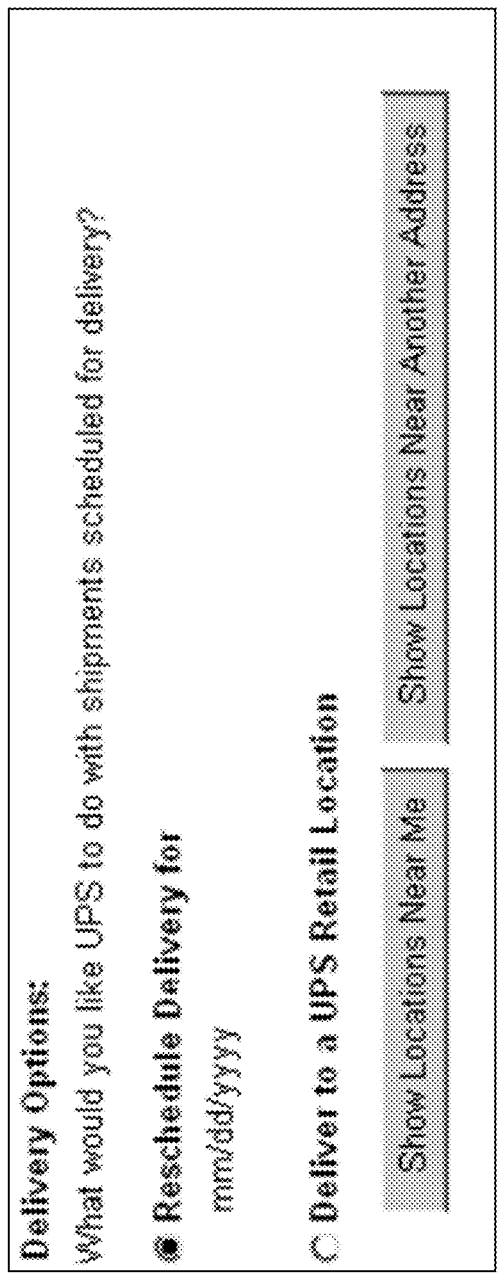
Figure 23:
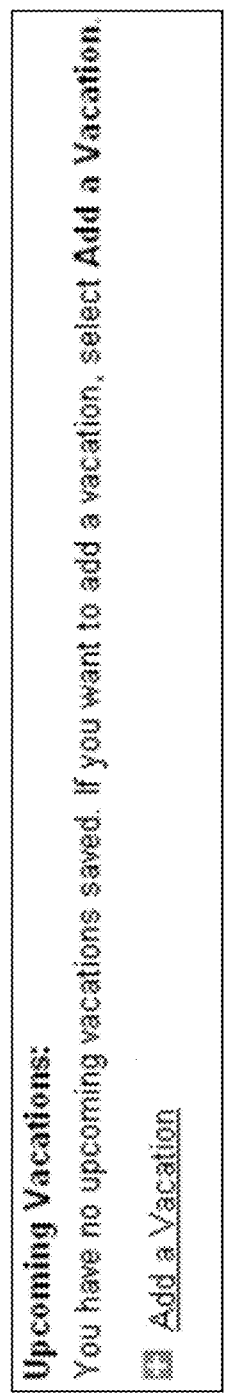

In one embodiment, to change delivery options, the customer (e.g., operating a consignee computing device 110 or consignor computing device 120) may select a button (e.g., shown in FIG. 13) that reads "Change Delivery." After (e.g., in response to) the carrier system 100 receives the request to change delivery options, the carrier system 100 can provide the information to the customer via an appropriate interface (e.g., browser, dashboard, application). For instance, as shown in FIG. 22, the carrier system 100 may provide an interface (e.g., browser, dashboard, application) to the customer (e.g., displayed via an appropriate customer computing device 110/120) that provides the ability to change delivery options. The delivery options may allow the customer to request to have the item held at a carrier facility for pick up (e.g., will call or same day will call). The delivery options may allow the customer to request to reschedule delivery of the item for another date and/or time (e.g., a future date and time). The delivery options may allow the customer to change the delivery service level of the item (e.g., change the delivery service level from Ground to 2nd Day Air or Ground to SurePost) after the item has been shipped. In one embodiment, this may allow for the item to be delivered earlier than initially indicated (e.g., both date and time). The delivery options may allow the customer request to change the delivery location to a carrier facility (or other location), such as a UPS Store. And the delivery options may allow the customer to request to return the item to the consignor. As will be recognized, embodiments of the present invention may also allow a customer to change a variety of other delivery options.

In one embodiment, as indicated in Block 435 of FIG. 4, the carrier system 100 can receive the changed delivery options as input from the customer. After (e.g., in response to) the changed delivery options, the carrier system 100 can accept the requested changes (e.g. including validating the changes). The carrier system 100 can then update the shipping data to reflect that the item should be delivered in accordance with the changed delivery options. In one embodiment, the change in delivery options may require applying a new item/shipment identifier and/or label. For example, as described, the updated shipping data (or at least a portion of updated shipping data) corresponding to items to be delivered can be transmitted regularly, periodically, continuously, and/or on demand by the carrier system 100 to the appropriate mobile stations 105 (and/or other computing entities).

In one embodiment, the appropriate mobile stations 105 (and/or other computing entities) can receive the updated shipping data (or at least a portion of updated shipping data) corresponding to items to be delivered. Thus, carrier personnel sorting items or loading delivery vehicles can scan an item/shipment identifier (e.g., using a mobile station 105) on an item to view information about the delivery of the item, and the updated shipping data (or at least a portion of updated shipping data) can be displayed. The updated shipping information may indicate that a new label (and/or item/shipment identifier) needs to be affixed to the item (e.g., the new label may indicate the new delivery address). The item can then be delivered in accordance with the changed delivery options.

In various embodiments, the carrier may include such services as part of a customer pickup, delivery, and/or returns program and/or require a fee. As indicated, in one embodiment, the delivery options may be changed prior to the first delivery attempt by the carrier. Moreover, a variety of other operations and processes may be used with embodiments of the present invention. These operations and processes can be customized to adapt to various needs and circumstances.

B. Vacation Delivery Options

In one embodiment, an interface (e.g., browser, dashboard, application) in communication with the carrier system 100 (e.g., via the delivery options module 250) can be used to change delivery options regarding items to be delivered to customers while the customers are on vacation (or otherwise away from the delivery location, such as being out of town on a business trip). For example, a customer (e.g., operating a consignee computing device 110 or consignor computing device 120) may access the interface (e.g., browser, dashboard, application) in communication with the carrier system 100 to input delivery options while the customer is on vacation.

In one embodiment, to input such delivery options, the customer (e.g., operating a consignee computing device 110 or consignor computing device 120) may select a button (e.g., shown in FIG. 23) that reads "Add a Vacation." After (e.g., in response to) the carrier system 100 receives the request to add a vacation, the carrier system 100 can provide the information to the customer via an appropriate interface (e.g., browser, dashboard, application). For instance, as shown in FIGS. 24, 25, 26A, and 26B, the carrier system 100 may provide an interface (e.g., browser, dashboard, application) to the customer (e.g., displayed via an appropriate customer computing device 110/120) that provides the ability to input vacation dates and/or delivery options (e.g., the delivery location, the delivery date, and/or the delivery time). During the vacation time period, the delivery options may allow the customer to request to have items held at a carrier facility for will call or to be rescheduled for delivery on another date. Similarly, during the vacation time period, the delivery options may allow the customer to request to have all items delivered to a carrier facility, such as a UPS Store.

Figures 26A, 26B:
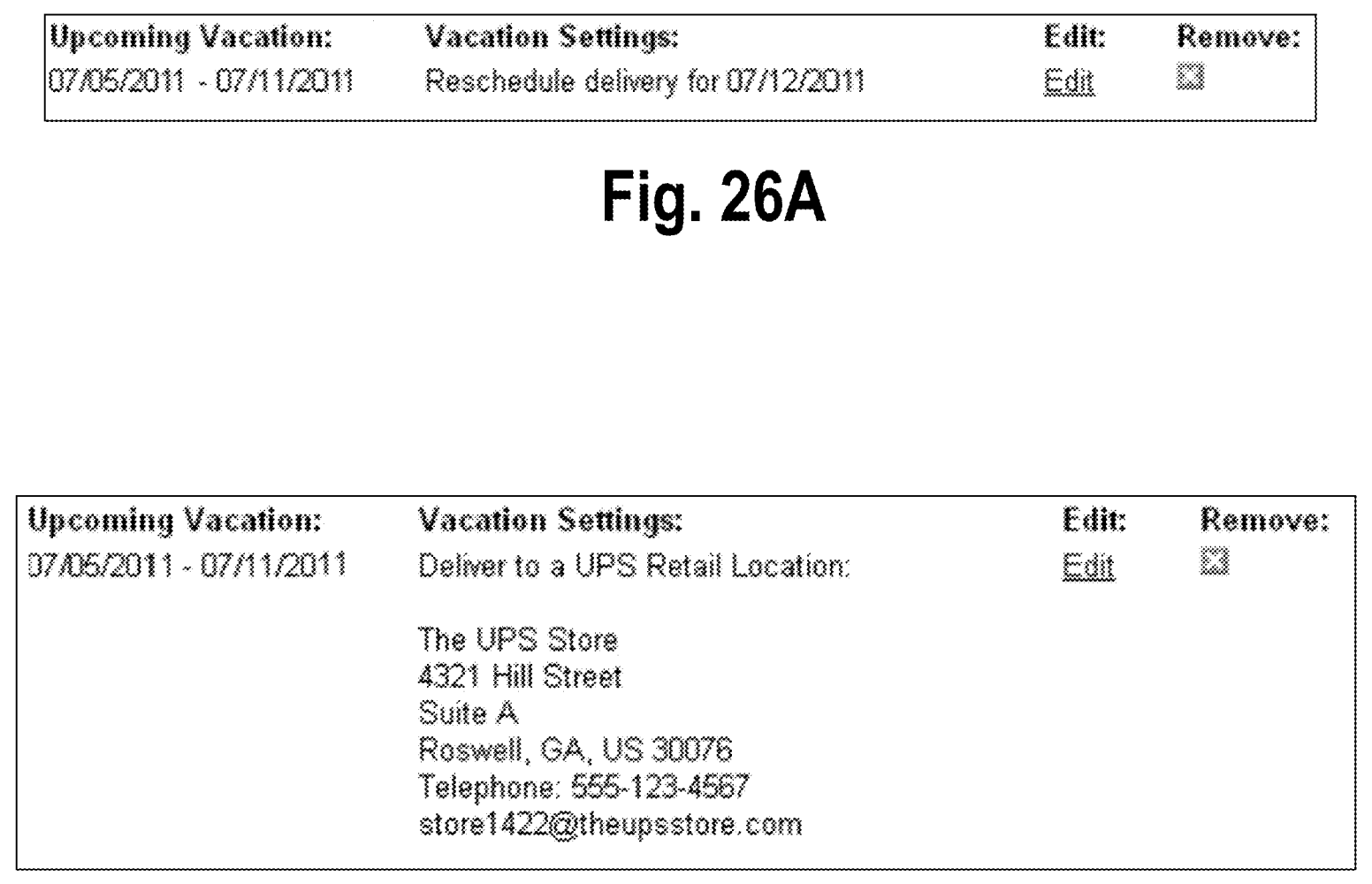

In one embodiment, as indicated in Block 435 of FIG. 4, the carrier system 100 can receive the input vacation dates and/or delivery options. After (e.g., in response to) receiving the input vacation dates and/or delivery options, the carrier system 100 can apply the vacation delivery options to all items to be delivered to the customer (and/or one of the customer's addresses in his customer profile) during the vacation time period. For instance, as shown in FIG. 26A, all items to be delivered to a customer between Jul. 5, 2011 and Jul. 11, 2011 can be rescheduled for delivery on Jul. 12, 2011. Similarly, as shown in FIG. 26B, all items to be delivered to a customer between Jul. 5, 2011 and Jul. 11, 2011 can be delivered to a carrier facility (such as a UPS Store) for later pickup by the customer. In one embodiment, vacation options may require applying a new label (and/or item/shipment identifier) to items to be delivered during the vacation time period.

C. Change in Pickup or Delivery Service Level

In one embodiment, an interface (e.g., browser, dashboard, application) in communication with the carrier system 100 can be used to change pickup or delivery service levels for items to be picked up from or delivered to customers. For example, the customer (e.g., operating a consignee computing device 110 or consignor computing device 120) may access the interface (e.g., browser, dashboard, application) in communication with the carrier system 100 to view items to be delivered. The interface (e.g., browser, dashboard, application) may provide the customer with the option of changing the delivery service levels for one or more items (e.g., change the delivery service level from Ground to 2nd Day Air or from Ground to SurePost).

In one embodiment, to change the delivery service level for an item, the customer (e.g., a customer or customer representative operating a consignee computing device 110 or consignor computing device 120) may select a button, icon, or graphic (similar to FIG. 13, although not shown in FIG. 13) that reads "Change Service Level." After (e.g., in response to) the carrier system 100 receives the request to change the delivery service level, the carrier system 100 can provide the appropriate information via the interface (e.g., browser, dashboard, application) to the customer. For instance, the carrier system 100 may be in communication with an interface (e.g., browser, dashboard, application displayed via a consignor/consignee computing device) that provides the ability to change the delivery service level. For example, this may allow the customer to change the delivery service level from SurePost to Ground, from Ground to 2nd Day Air, from 2nd Day Air to Next Day Air, from 2nd Day Air to Ground, and/or the like. Thus, the delivery service level can be changed from a first delivery service level with which it was originally shipped to a second delivery service level (after the item has been shipped but) prior to the first delivery attempt of the item. In one embodiment, this may allow for the item to be delivered earlier or later than initially indicated (e.g., both date and time).

In one embodiment, as indicated in Block 435 of FIG. 4, the carrier system 100 can receive the request to change the delivery service level as input from the customer. After (e.g., in response to) receiving such a request, the carrier system 100 can accept the requested changes (e.g. including validating the changes). The carrier system 100 can then update the shipping data to reflect that the item should be delivered in accordance with the second (e.g., changed) delivery service level, which may automatically change the delivery date and/or cost associated with delivering the item. In one embodiment, the change in the delivery service level may require applying a new item/shipment identifier and/or label. For example, as described, the updated shipping data (or at least a portion of updated shipping data) corresponding to items to be delivered can be transmitted regularly, periodically, continuously, and/or on demand by the carrier system 100 to the appropriate mobile stations 105 (and/or other computing entities).

In one embodiment, the appropriate mobile stations 105 (and/or other computing entities) can receive the updated shipping data (or at least a portion of updated shipping data) corresponding to items to be delivered. Thus, carrier personnel sorting items or loading delivery vehicles can scan an item/shipment identifier (e.g., using a mobile station 105) on an item to view information about the delivery of the item, and the updated shipping data (or at least a portion of updated shipping data) can be displayed. The updated shipping information may indicate that a new label (and/or item/shipment identifier) needs to be affixed to the item (e.g., the new label may indicate the new delivery service level). The item can then be transported and delivered with the new label by the carrier in accordance with the second (e.g., changed) delivery service level.

In various embodiments, the carrier may include such services as part of a customer pickup, delivery, and/or returns program and/or require a fee on a transaction basis. As indicated, in one embodiment, the delivery options may be changed prior to the first delivery attempt by the carrier. Moreover, a variety of other operations and processes may be used with embodiments of the present invention. For example, changing the delivery service level feature can be used in conjunction with other features described herein, such as customer and item matching features, item tracking features, messaging features, delivery time features, electronic authorization for item release features, instructions for delivery features, and/or delivery option features. Thus, these operations and processes can be customized to adapt to various needs and circumstances.

D. Automatic Change in Pickup or Delivery Service Level

In one embodiment, an interface (e.g., browser, dashboard, application) in communication with the carrier system 100 can be used to automatically change pickup or delivery service levels for items to be picked up from or delivered to customers. For example, the customer (e.g., a customer or customer representative operating a consignee computing device 110 or consignor computing device 120) may access the interface (e.g., browser, dashboard, application) in communication with the carrier system 100 to view delivery service level options for items that have yet to be purchased, shipped, or delivered. In one embodiment, the interface (e.g., browser, dashboard, application) may provide the customer with the option of automatically changing the delivery service level for all (or select) items to be delivered via a specific delivery service level (e.g., Next Day Air, Next Day Air Early AM, Next Day Air Saver, 2nd Day Air, 2nd Day Air Early AM, 3 Day Select, Ground, and/or SurePost).

In one embodiment, to automatically change the delivery service level for all (or select) items to be delivered via a specific delivery service level, the customer (e.g., a customer or customer representative operating a consignee computing device 110 or consignor computing device 120) may select a button, icon, or graphic that reads "Automatic Service Level Change." After (e.g., in response to) the carrier system 100 receives the request to automatically change delivery service levels, the carrier system 100 can provide the appropriate information via the interface (e.g., browser, dashboard, application) to the customer. For instance, the carrier system 100 may be in communication with an interface (e.g., browser, dashboard, application displayed via a consignor/consignee computing device) that provides the ability to set automatic delivery service level changes for all (or select) items to be delivered via the specific delivery service level. For instance, the customer can input that all (or select) items to be delivered via a first delivery service level (e.g., SurePost) should automatically be changed to a second delivery service level (e.g., Ground). Thus, this feature may allow the customer to automatically change the delivery service level for all items to be delivered via a first delivery service level to a second delivery service level (e.g., from SurePost to Ground, from Ground to 2nd Day Air, from 2nd Day Air to Next Day Air, from 2nd Day Air to Ground, and/or the like). Thus, delivery service levels can be automatically changed from a first delivery service level (used when originally shipped) to a second delivery service level, which may automatically change the delivery dates and/or costs associated with delivering the item. As indicated, this may even occur after the items have been shipped but prior to the first delivery attempt of the items.

In one embodiment, as indicated in Block 435 of FIG. 4, the carrier system 100 can receive the request to automatically change the delivery service level as input from the customer. After (e.g., in response to) receiving such a request, the carrier system 100 can accept the requested changes (e.g. including validating the changes). The carrier system 100 can then update the customer profile to reflect that items to be delivered in accordance with the first delivery service level (and/or from a specific consignor) should be automatically changed to a second delivery service level during transport by the carrier.

Thus, when an item to be delivered to the customer is matched to the customer profile and is to be delivered via the first delivery service level (e.g., SurePost), the carrier system 100 can automatically change the first delivery service level to the second delivery service level as reflected in the customer profile. As described, this may require applying a new item/shipment identifier and/or label. For example, the carrier system 100 can transmit regularly, periodically, continuously, and/or on demand to the appropriate mobile stations 105 (and/or other computing entities) that the first delivery service level (e.g., SurePost) should be changed to a second delivery service level (e.g., Ground) for the item. In one embodiment, the appropriate mobile stations 105 (and/or other computing entities) can receive the indication. Then, when carrier personnel sorting items or loading delivery vehicles, for example, scan the unique item/shipment identifier (e.g., using a mobile station 105), the mobile station 105 can provide the carrier personnel with an indication that the first delivery service level should be changed to the second delivery service level. This may include indicating that a new label (and/or item/shipment identifier) needs to be affixed to the item (e.g., the new label may indicate the new delivery service level). The item can then be transported and delivered with the new label by the carrier in accordance with the second (e.g., changed) delivery service level.

In another embodiment, this feature may also require that items satisfy other criteria in order to automatically change the delivery service level. For example, the customer may indicate that only items originating from identified consignors (e.g., Amazon, Lands' End, William Robinson, etc.) have their delivery service levels changed automatically. In this example, customer Joseph Brown can update his customer profile such that all items to be delivered to him that originate from Lands' End are to be automatically changed to the Second Day Air delivery service level (if not already Second Day Air). Similarly, customer Joseph Brown can update his profile such that all items originating from identified consignors (e.g., Amazon, Lands' End, William Robinson, etc.) and to be delivered via a first delivery service level (e.g., SurePost) have their delivery service level automatically changed to a second delivery service level (e.g., Ground). In this example, all items to be delivered to Joseph Brown via SurePost and originating from Lands' End can be automatically changed from the SurePost delivery service level to the Ground delivery service level. As will be recognized, a variety of other approaches and techniques can be used to adapt to various needs and circumstances.

In various embodiments, the carrier may include such services as part of a customer pickup, delivery, and/or returns program and/or require a fee on a transaction basis. As indicated, in one embodiment, the delivery options may be changed prior to the first delivery attempt by the carrier. Moreover, a variety of other operations and processes may be used with embodiments of the present invention. For example, changing the delivery service level feature can be used in conjunction with other features, such as customer and item matching features, item tracking features, messaging features, delivery time features, electronic authorization for item release features, instructions for delivery features, delivery option features, and/or the like. Thus, these operations and processes can be customized to adapt to various needs and circumstances.

9. Returns

In various embodiments, the carrier system 100, in coordination with a variety of other computing entities, can be used to initiate and carry out the return of items in the reverse logistics cycle. The term "return" may refer to returning an item (a) to a consignor; (b) to inventory managed by a carrier or another entity; (c) for limited or full repair or refurbishment; (d) for liquidation, recycling, destruction, donation; and/or (e) the like. Further, in the returns context, an original or initial consignee (e.g., first consignee) who received an item can become a consignor (e.g., second consignor) when returning an item. Thus, an original or initial consignor (e.g., first consignor) can also become a consignee (e.g., second consignee).

In one embodiment, the carrier system 100 can provide or be in communication with an interface through which a customer (e.g., a customer or customer representative operating a consignee computing device 110 or consignor computing device 120) can initiate the return of items that have been previously delivered or are in the possession of a customer. As will be recognized, returns may be initiated by a customer (e.g., a consignee or a consignor) via the interface shown in FIG. 10 (showing a list of all inbound shipments to the customer), for example. Similarly, returns may be initiated by a customer (e.g., a customer or customer representative operating a consignee computing device 110 or consignor computing device 120) via the interfaces shown in FIG. 11 or 12 with a calendar or list of all inbound shipments to a customer for the past 90 days, for example. In yet another embodiment, a customer (e.g., a customer or customer representative operating a consignee computing device 110 or consignor computing device 120) can initiate a return via a carrier returns portal/interface (e.g., browser, dashboard, application) in a variety of ways—see FIG. 28. In one embodiment, returns may be initiated through these and various other interfaces regardless of by whom or how the items were delivered to the customer.

In one embodiment, there may be two types of returns: authorized returns and unauthorized returns. Authorized returns may be for items being returned to consignors (e.g., first consignors) that participate in a returns program with the carrier. Through such returns programs, consignors can ensure that carriers return items in compliance with the consignors' return policies. For example, through such a program, consignors can approve the returns and pay for the shipping of the items. Such payments/refunds may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth™ low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like. Similarly, unauthorized returns may be for items being returned to consignors that do not participate in a returns program with the carrier. The following describes exemplary processes for both authorized returns and unauthorized returns.

A. Authorized Returns

For authorized returns (Block 2700 of FIG. 27), the carrier system 100 may provide the ability to initiate/request returns via an interface (e.g., browser, dashboard, application) provided by the carrier on behalf of specific consignors, for example. For instance, to offload the processing of returns for participating consignors, the carrier system 100 can provide return merchandise authorizations (RMA) or RMA integration with consignors (e.g., via consignors' websites) to provide return authorizations, processing, shipping, routing, and handling in accordance with consignors' return policies. In one embodiment, this process with a customer can occur remotely (e.g., via a customer accessing an online interface) or in-person (e.g., at a carrier location or carrier-designated location of a third party). A carrier location may be, for example, a carrier store (e.g., UPS Store) or a carrier kiosk, while carrier-designated locations of third parties may be electronics stores, grocery stores, post offices of the United States Postal Service (USPS), and/or the like. As will be recognized, such carrier-designated locations need not be the stores, for example, from which the items were purchased. That is, a carrier may contract with Publix Supermarkets, for instance, to handle all or select in-person returns for the carrier. In such an example, customers may be able to take items to be returned to any Publix Supermarket for processing and shipping in accordance with the respective return policies of various consignees.

In one embodiment, the returns process may require an RMA for a participating consignor. Thus, a user may be required to input return item attributes regarding the return via an interface (e.g., customer or third party operating a computing device). For each item or groups of items being returned, the return attributes may include a stock keeping unit (SKU) or item number, an item class or category (e.g., apparel, consumer electronics, sports equipment, medical devices), a return category, a reason for the return (e.g., damaged, not wanted, duplicate, and/or the like), an order or confirmation number from the purchase of the item, the date the order was placed for the item, the date the item was delivered to the consignee, the carrier that delivered the item, an indication of whether the item is seasonal, the geographic zone of original fulfillment (e.g., Kentucky, California), and/or the like. In some embodiments, the customer may not need to input the return attributes; rather, the carrier system 100 may pull, access, or identify the return item attributes based on the order or confirmation number, for example, by accessing the consignee's email or communicating with the first consignors. As will be recognized, a variety of return attributes can be used to adapt to various needs and circumstances.

In one embodiment, to implement the return polices for returns based on the return attributes, the consignor may define business rules for execution by the carrier system 100 that indicate (based on the input for the return) whether a return for an item should be authorized. Further, if authorized, the business rules may indicate how the item should be processed, the location to which the item should be shipped, how the item should be transported through the carrier's transportation and logistics network, whether multiple items should be consolidated before shipment, whether the item should be repaired, how carrier personnel or those associated with the carrier should handle the item, delivery point information, and/or the like. Further, use of the return attributes may allow the carrier (e.g., via the carrier system 100) to limit returns to items that are in compliance with the corresponding consignor's return policies, such as requiring (a) that items be returned within 30 days of delivery, (b) that non-functioning electronics be sent directly for repair, (c) that all returns be inspected prior to acceptance, and/or (d) the like. As will be recognized, a variety of business rules can be used to adapt to various needs and circumstances.

In one embodiment, if the carrier system 100 (or other appropriate computing entity) determines that a return is in compliance with the corresponding consignor's business rules (e.g., based at least in part on the return attributes), the carrier system 100 can authorize the return. The carrier system 100 can also assign or associate therewith an RMA number to the item being returned. The RMA process can be used by the first consignor as a gatekeeping process in the reverse logistics cycle.

In addition to or as an alternative to assigning to or associating therewith an RMA number, the carrier system 100 may determine a customer-defined handling identifier for, assign a customer-defined handling identifier to, and/or associate a customer-defined handling identifier (see FIGS. 29-32) with each item or group of items being returned (Block 2705 of FIG. 27). The customer-defined handling identifier (e.g., handling identifier) can be used to indicate (e.g., based on the business rules application) how the item should be processed, the available methods of collection, the location to which the item should be shipped, how the item should be transported through the carrier's transportation and logistics network, whether multiple items should be consolidated before shipment (e.g., for reduce shipping costs), whether the item should be repaired, how carrier personnel or those associated with the carrier should handle the item, delivery point information, and/or the like. In one embodiment, to do so, the customer-defined handling identifier may be an alphanumeric string that comprises a return category portion, a collection method portion, and a delivery point portion. Although the customer-defined handling identifier shows the portions in a specific order, the order and length of each portion of the customer-defined handling identifier may vary to adapt to various needs and circumstances. Further, the customer-defined handling identifier may also be in the form of a barcode (see FIG. 30), a Quick Response (QR) code (see FIG. 31), a MaxiCode, and/or the like. The customer-defined handling identifier may also be in the form of an RFID tag or other readable medium. Thus, the customer-defined handling identifier may take many forms to adapt to various needs and circumstances.

Figure 33:

In one embodiment, as part of the collection, after the RMA is approved, the carrier system 100 can transmit a shipping label, a web form, a barcode, a QR code, a receipt image, and/or the like that comprises or is associated with the RMA, a carrier-assigned customer identifier, an item/shipment identifier, a customer-defined handling identifier to the corresponding customer (e.g., operating a customer computing device 110/120)—see FIG. 33. Similarly, the carrier system 100 may also provide such information to the original or initial consignor (e.g., second consignee). The shipping label, web form, barcode, QR code, receipt image, and/or the like can be used to induct the item into the carrier's transportation and logistics network (e.g., via pickup, drop-off, etc.), which may include picking up, dropping off, packing, labeling, and/or beginning shipment of the item or groups of items (Block 2710 of FIG. 27).

In one embodiment, the collection method portion may be used to indicate the collection methods that are available for a given consignor and/or item. For example, a first consignor may want to restrict the potential available paths within a carrier's transportation and logistics network to maximize the yield of the various return categories. This may be because the various paths within a transportation and logistics network have cost and time implications associated therewith. For instance, the collection methods may include or exclude carrier personnel pickup of returns, carrier location drop-offs, carrier-designated locations for drop-offs (e.g., grocery stores, post offices, and/or the like). Thus, a consignor may define business rules that allow for consumer electronics to use all the available paths for return in a carrier's transportation and logistics network, while limiting apparel returns to carrier locations and carrier-designated locations. The collection methods may be defined by a customer by SKU or item number, item class or category (e.g., apparel, consumer electronics, sports equipment, medical devices), return category, return code (e.g., reason for the return), return timing (e.g., within 30 days, 45 days, 60 days, >90 days, unknown timing), seasonal return, geographic zone of original fulfillment (e.g., returns to Kentucky, California, etc.), and/or the like. As will be recognized, a variety of collection method concepts can be used to adapt to various needs and circumstances—including exception handling.

Operatively, carrier personnel can scan or read (e.g., using a mobile station 105) the customer-defined handling identifier of an item and/or other identifying indicia associated with the item as described herein. For instance, carrier personnel can scan or read the shipment identifier that can be used to access the customer-defined handling identifier. With the customer-defined handling identifier, the carrier system 100 can determine what collection methods are available for the item and/or whether the collection method being used is available for the item (based at least in part on the collection method portion). Responsive to such a determination, the carrier system 100 can provide such an indication for display to an appropriate computing entity.

In one embodiment, the return category portion may be used to indicate to the carrier whether, how, and when, for example, the items should be sorted and/or consolidated for a given consignor (e.g., first consignor). For example, a first consignor may want to consolidate items in specific return categories, of similar types, during certain times of the year, or that have been damaged to be returned in bulk (e.g., 20 or more items) or in minimum collection numbers. To do so, the return category portion may represent the sortation and consolidation (in accordance with the business rules) defined by a customer. Thus, the sortation and consolidation may be defined by a customer by SKU or item number, item class or category (e.g., apparel, consumer electronics, sports equipment, medical devices), return category, return code (e.g., reason for the return), return timing (e.g., within 30 days, 45 days, 60 days, >90 days, unknown timing), seasonal return, geographic zone of original fulfillment (e.g., returns to Kentucky, California, etc.), and/or the like.

In one embodiment, the carrier may simply sort and/or consolidate items assigned to a unique return category portion (Block 2715 of FIG. 27). For instance, all items with the same return category portion of the customer-defined handling identifier (e.g., consumer electronics or 7th Generation iPod nanos, sports shirts or Nike Core Compression S/S Top 1.2 shirts, delivered >90 days ago or delivered to zip code 30097 >90 days ago) can be sorted together. After or as a part of sortation, items with the same return category portion for a consignor can also be consolidated for return based on the customer-defined handling identifier. In one example, the carrier system 100 can implement a low level of sortation and/or consolidation, such as by using a fixed attribute value that would prevent the separation of return items (e.g., returns would remain in the carrier's transportation and logistics network to be delivered (unsorted and unconsolidated) to a delivery point). In another example, the carrier system 100 can implement a medium level of sortation and/or consolidation using the customer-defined handling identifier, such as by having set values for each return category to instruct carrier personnel and/or equipment to sort and/or consolidate the return items of the corresponding category (e.g., return items can be delivered in the carrier's transportation and logistics network to be sorted, consolidated, and/or aged). In yet another example, the carrier system 100 can implement a high level of sortation and/or consolidation, for instance, by having a link between each return category and the contents of the return shipment (e.g., SKU level detail). In high level of sortation and/or consolidation, the customer-defined handling identifier can be used to change the delivery location (e.g., having the delivery location change from one identifier to another). Further, the returns can be sorted by customer-defined handling identifiers with each identifier having a different destination (e.g., based on customer and/or carrier business rules). For instance, customer business rules could establish the level of sorting and the locations for delivery (customer site or carrier site). If a carrier site is to be used, then the carrier business rules can automatically determine the final delivery address. As will be recognized, a variety of sortation and consolidation concepts can be used to adapt to various needs and circumstances.

In one embodiment, as described, shipping data and/or the various identifiers (e.g., item/shipment identifier, carrier-assigned customer identifier, and/or customer-defined handling identifier) corresponding to items can be transmitted regularly, periodically, continuously, and/or on demand (e.g., in response to certain triggers) by the carrier system 100 to the appropriate mobile stations 105. Thus, for instance, carrier personnel can scan or read a customer-defined handling identifier and/or item/shipment identifier (or other identifier) on an item (e.g., using a mobile station 105) to view, access, provide, and/or retrieve information about the handling, processing, sorting, and/or consolidating of the item and carry out the instructions regarding the same. With the customer-defined handling identifier, the carrier system 100 can determine whether and how the item should be sorted and/or consolidated and provide such an indication for display to an appropriate computing entity (based at least in part on the return category portion).

In one embodiment, the delivery point portion may be used to indicate the delivery destination/point of the item or items being returned and/or what actions should be performed at the delivery destination/point (see FIG. 32). For instance, in one embodiment, the goal may be to deliver the item or items in accordance with a consignor's business rules for yield maximization in the reverse logistics cycle. In one embodiment, the item or groups of items may be returned to the original vendor (e.g., the first consignor) or to inventory managed by the carrier or another entity. In another embodiment, the carrier may deliver the item or groups of items to a center or facility for liquidation or resale. With regard to liquidation and resale, the carrier system 100 may provide yield performance metrics to the carrier and/or the original vendor (e.g., first consignor) regarding the same. In another embodiment, the carrier may deliver the item or groups of items to a recycling center or facility for recycling or a donation center or facility for donation (and provide yield metrics regarding the same). In still another embodiment, the carrier may deliver the item or groups of items to repair centers or facilities, whether operated by the carrier, the original vendor (e.g., first consignor), or a third party. And in still another embodiment, the carrier may deliver the item or groups of items to a facility or center for destruction, disposal, or aging. In one embodiment, the carrier may provide such services for a standard transportation and delivery fee, for a percentage of any liquidation or resale profits, as a premium service with a transaction fee, and/or the like. As will be recognized, the items or groups of items can be delivered to a variety of delivery points to adapt to various needs and circumstances.

By way of example, the carrier system 100 can implement a low level of delivery point selection/routing, such as by using a fixed attribute value that routes all of a consignor's returns to a single delivery point (e.g., a consignor's dedicated returns processing center). In another example, the carrier system 100 can implement a higher level of delivery point selection/routing using the customer-defined handling identifier, such as by routing returned items by the return category and collection method values, such as delivery point=5 (a third party liquidator) may be used if the returns category=1 (post-season apparel) and the collection method=3 (drop-off at carrier-designated locations). Similarly, delivery point=1 (consignor's original fulfillment location) may be used if the returns category=3 (current inventory high tech.) and the collection method=2 (carrier pickup).

In one embodiment, as described, shipping data and/or the various identifiers (e.g., item/shipment identifier, carrier-assigned customer identifier, and/or customer-defined handling identifier) corresponding to items can be transmitted regularly, periodically, continuously, and/or on demand (e.g., in response to certain triggers) by the carrier system 100 to the appropriate mobile stations 105. Thus, for instance, carrier personnel can scan an item/shipment identifier (or other identifier) on an item (e.g., using a mobile station 105) to view, access, provide, and/or retrieve information about the handling and/or delivery of the item and carry out the instructions regarding the same (Block 2720 of FIG. 27). With the customer-defined handling identifier, the carrier system 100 can determine to where the item should be routed and/or handled within and outside the carrier's transportation and logistics network.

B. Unauthorized Returns

Figure 28:
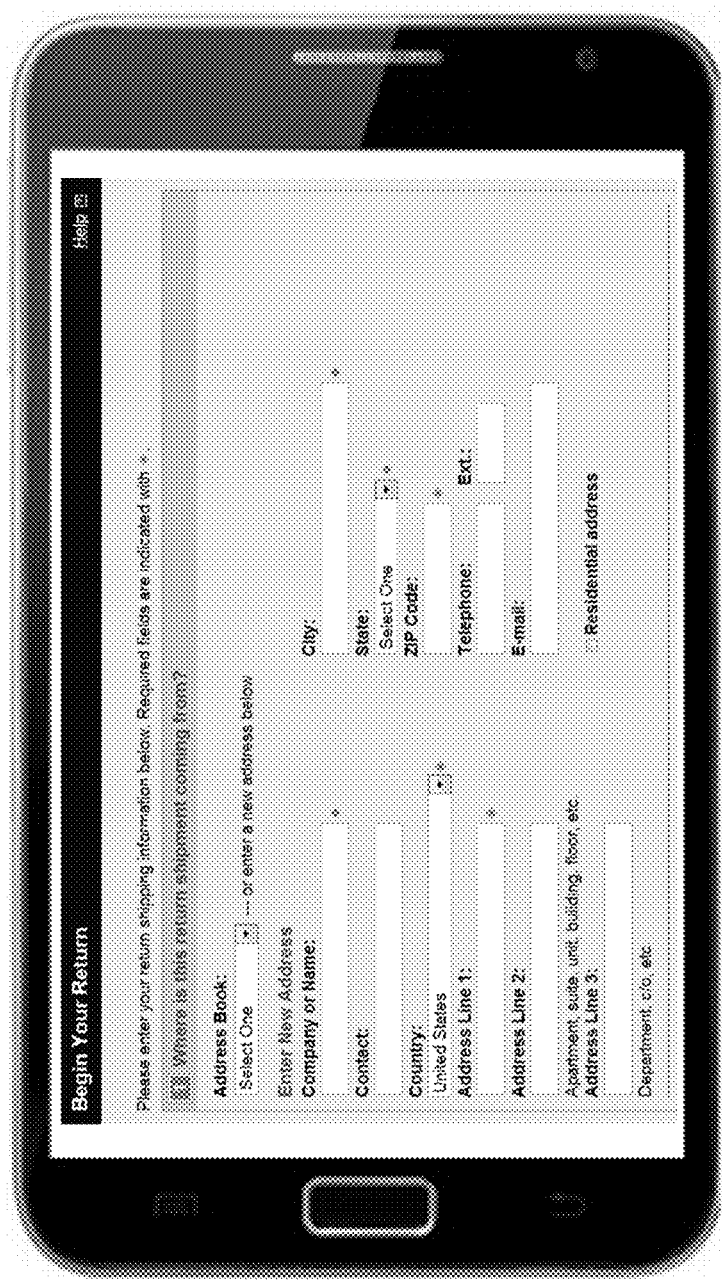
Figure 29:
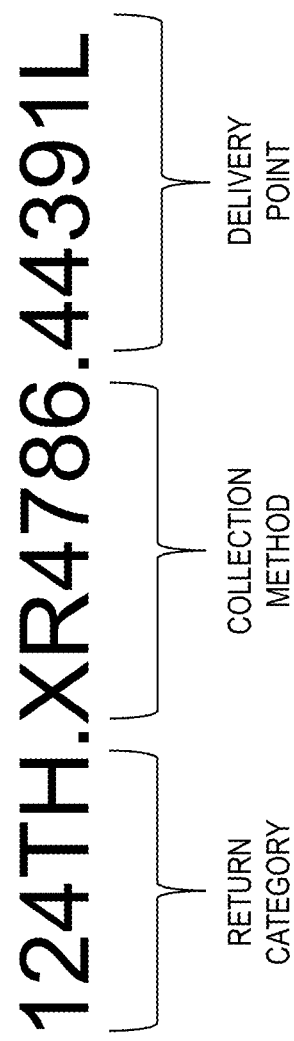
Figure 30:
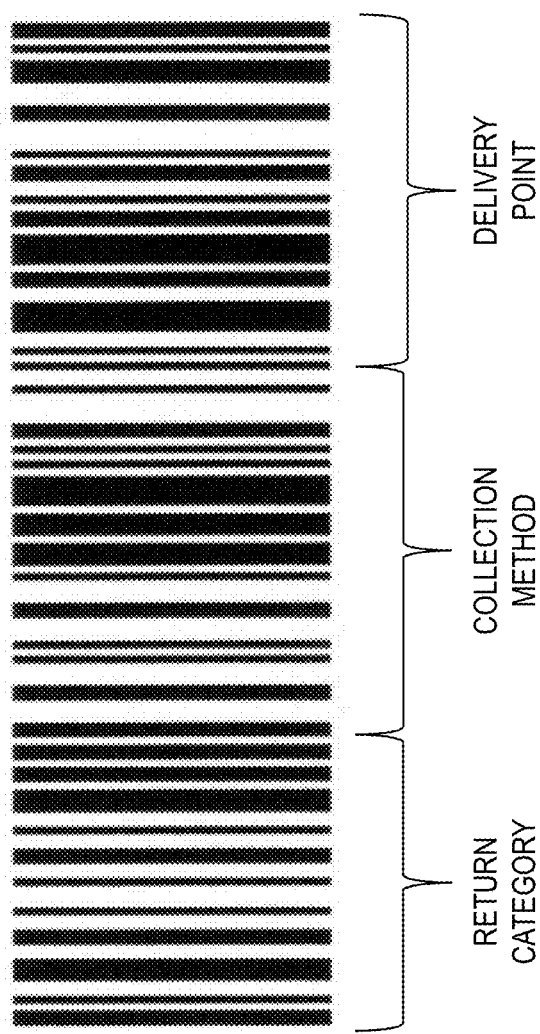
Figure 31:
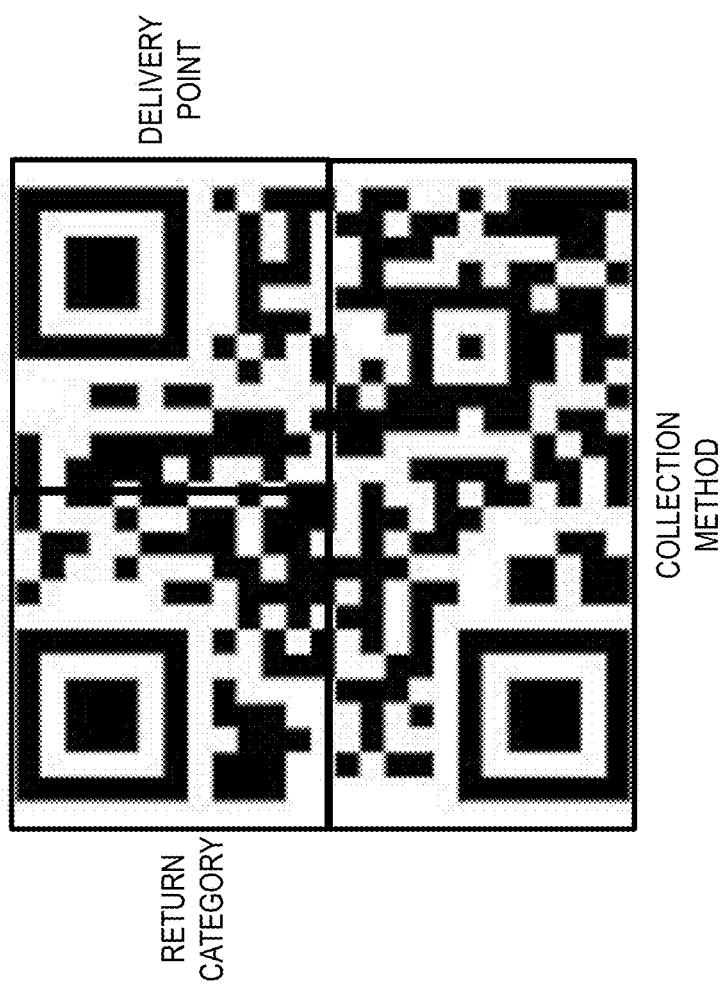

For unauthorized returns, the carrier system 100 may provide the ability to initiate returns via an interface (e.g., browser, dashboard, application) provided by the carrier. For example, as shown in FIG. 28, a customer (e.g., a customer or customer representative operating a consignee computing device 110 or consignor computing device 120) can initiate a return via a carrier returns portal/interface (e.g., browser, dashboard, application) in a variety of ways regardless of by whom or how the items were delivered to the customer—see FIG. 28. Via the carrier returns portal/interface (e.g., browser, dashboard, application), a customer (e.g., a customer or customer representative operating a consignee computing device 110 or consignor computing device 120) can input information regarding the return, which may include return attributes as described above with regard to authorized returns. Via the carrier returns portal/interface (e.g., browser, dashboard, application), the customer (e.g., a customer or customer representative operating a consignee computing device 110 or consignor computing device 120) can input or select addresses from his or her address book or from a list of consignors corresponding to the customer's profile.

In one embodiment, based on the attributes or characteristics of the shipment, the carrier system 100 can provide shipping options, rates, and collection methods available to the customer. The customer (e.g., a customer or customer representative operating a consignee computing device 110 or consignor computing device 120) can then select and pay for the desired shipping services. In one embodiment, the carrier system 100 may also offer incentives to customers for increased returns volume. For instance, the carrier system 100 may offer reduced rates or additional collection methods to customers with a minimum number of items being returned or with an average shipping volume, for example.

As part of this process, the carrier system 100 may determine a customer-defined handling identifier for, assign a customer-defined handling identifier to, and/or associate a customer-defined handling identifier with each item or group of items being returned. As previously described, the customer-defined handling identifier can be used to indicate (e.g., based on the business rules application) how the item should be processed, shipped, and/or handled. In one embodiment, for unauthorized returns, the carrier system 100 may determine a customer-defined handling identifier for, assign a customer-defined handling identifier to, and/or associate a customer-defined handling identifier with each item or group of items being returned as described above with regard to authorized returns. In another embodiment, though, the carrier system 100 can use fixed or static return category portions, collection method portions, and delivery point portions such that the item or group of items will transported through the carrier's transportation and logistics network to the delivery point identified by the original or initial consignee (e.g., second consignor). As will be recognized, a variety of other approaches and techniques can be used to adapt to various needs and circumstances.

In one embodiment, after the return is completed via the carrier returns portal/interface (e.g., browser, dashboard, application), the carrier system 100 can transmit a shipping label, a web form, a barcode, a QR code, a receipt image, and/or the like that comprises or is associated with a carrier-assigned customer identifier, an item/shipment identifier, a customer-defined handling identifier, and/or the like to the corresponding customer (e.g., operating a customer computing device 110/120)—see FIG. 33. Similarly, the carrier system 100 may also provide such information to the original or initial consignor (e.g., second consignee). The shipping label, web form, barcode, QR code, receipt image, and/or the like can be used to induct the item into the carrier's transportation and logistics network (e.g., via pickup, drop-off, etc.), which may include picking up, dropping off, packing, labeling, and/or beginning shipment of the item or groups of items.

In one embodiment, as described, shipping data and/or the various identifiers (e.g., item/shipment identifier, carrier-assigned customer identifier, and/or customer-defined handling identifier) corresponding to items can be transmitted regularly, periodically, continuously, and/or on demand (e.g., in response to certain triggers) by the carrier system 100 to the appropriate mobile stations 105. Thus, for instance, carrier personnel can scan an item/shipment identifier (or other identifier) on an item (e.g., using a mobile station 105) to view, access, provide, and/or retrieve information about the handling and/or delivery of the item and carry out the instructions regarding the same.

C. Return Messages/Notifications/Alerts & Customized Refunds

As described previously, customers can customize their communication preferences for notifications they wish to receive regarding shipments. This also includes items being returned. In one embodiment, the notifications regarding returns can be used to address the challenge of operational planning for "lumpy" return volume and to reduce end-to-end cycle times for processing recovered assets.

In one embodiment, customers (e.g., original vendors) can refund original consignees (e.g., purchasers) for items being returned at a variety of stages in the reverse logistics cycle. For example, customers (e.g., operating a consignee computing device 110 or consignor computing device 120) may identify/define triggering events (e.g., one or more parameters) for which the notifications providing information regarding items should be transmitted from the carrier system 100 to the customer (e.g., original vendor or associated party) to trigger/initiate refunds. In one embodiment, a customer may track any number (e.g., four in the following example) of different triggering events (e.g., one or more parameters) in the returns logistics cycle: generating a label or receipt for returning an item and/or authorizing an item for return, receiving/collecting an item from a consignor for induction into the carrier's transportation and logistics network, sortation and/or consolidation of items, delivery of items to intermediate or final delivery points, and/or the like. Based on the previously discussed communication preferences, the carrier system 100 can automatically generate (e.g., via the message module 260) one or more notifications providing information regarding a return item to the customer in compliance with the customer's communication preferences. Such notifications may include the RMA, the carrier-assigned customer identifier, the item/shipment identifier, the customer-defined handling identifier, the triggering event, and/or the like. And the carrier system 100 can automatically transmit the one or more notifications to the electronic destination addresses in compliance with the customer's communication preferences.

In one embodiment, with an address associated with the original consignor (e.g., second consignee or vendor), the RMA, the return address, the carrier-assigned customer identifier, the item/shipment identifier, and/or the customer-defined handling identifier, the carrier system 100 can provide notifications to the corresponding customers (e.g., operating customer computing devices 110/120) in accordance with the communication preferences as described above. These notifications may be triggered based on matching return addresses, names, RMAs, carrier-assigned customer identifiers, item/shipment identifiers, customer-defined handling identifiers, and/or the like. In one embodiment, in the returns context, the carrier system 100 may provide notifications to customers (e.g., operating customer computing devices 110/120) when an RMA has been approved, when a customer-defined handling identifier has been assigned, when an item has been collected by a carrier, when a minimum number of items have been consolidated by a carrier, when an item reaches various points in the carrier's transportation and logistics network, when an item has been shipped and is being transported by a carrier (e.g., confirmed as being in transit), when an item has been repaired or refurbished, when an item has been recycled or disposed of, when an item has been returned to the appropriate returns location, when an item has been returned to the appropriate returns location and has been inspected upon return, and/or the like. Such events can be used to trigger/initiate refunds for items being returned.

As previously noted, the appropriate party can define various refund triggers or parameters that can be used to automatically determine when customers (e.g., original vendors) are to refund initial or original consignees (e.g., purchasers) for items being returned at a variety of stages in the reverse logistics cycle. For instance, a customer (e.g., original vendor or associated party) and/or a carrier can define any number of refund triggers that are to be used to provide refunds for specific items. In the following example, four different refund triggers are described for illustrative purposes—see Table 4 below.

TABLE 4

| CLASSIFICATION | TRIGGER/PARAMETER |
| --- | --- |
| R1 | Initiation of return |
| R2 | Item in transit |
| R3 | Item delivered via return |
| R4 | Item returned and inspected |

As shown in the above table, in this example, for refund classification as "R1," an appropriate computing entity (e.g., carrier system 100, customer computing device 110/120, payment system) can be used to determine and initiate payment for a refund for an item being returned when the return is initiated, such as by issuance of an RMA. R1 may be used for valued customers (e.g., participating in a vendor program, such as a reward program) to help make their refunds as fast and efficient as possible. Further, for the refund classification as "R2," an appropriate computing entity (e.g., carrier system 100, customer computing device 110/120, payment system) can be used to determine and initiate payment for a refund for an item being returned when the item has been received by the carrier and is in transit. For the refund classification as "R3," an appropriate computing entity (e.g., carrier system 100, customer computing device 110/120, payment system) can be used to determine and initiate payment for a refund for an item being returned when the item has been delivered by the carrier as a return. For the refund classification as "R4," an appropriate computing entity (e.g., carrier system 100, customer computing device 110/120, payment system) can be used to determine and initiate payment for a refund for an item being returned when the item has been delivered by the carrier as a return and has been inspected by the customer (e.g., original vendor). R4 may be used for returns of high-value items to ensure that they are received in the proper condition before a refund is processed. As will be recognized, any number or return classifications can be defined to adapt to various needs and circumstances.

In one embodiment, the returns process may require an RMA. In such an embodiment, if an appropriate computing entity (e.g., carrier system 100, customer computing device 110/120, payment system) determines that a return is in compliance with the corresponding consignor's business rules (e.g., based at least in part on the return attributes), the appropriate computing entity (e.g., carrier system 100, customer computing device 110/120, payment system) can authorize the return and assign or associate therewith an RMA number to the item being returned. In addition to the RMA, a refund classification can be assigned to or associated with the RMA, the carrier-assigned customer identifier, the item/shipment identifier, the customer-defined handling identifier, and/or the like. Table 5 below shows the RMA, the refund classification, and the item/shipment identifier for four items being returned.

TABLE 5

| RMA | CLASSIFICATION | Item ID |
| --- | --- | --- |
| 5PRGF | R1 | 123456789 |
| 76LOE | R2 | 123456788 |
| 98FOR | R3 | 123456787 |
| 99CBD | R4 | 123456786 |

As items progress through the carrier's transportation and logistics network, the carrier system 100 can provide notifications to the corresponding customers (e.g., operating customer computing devices 110/120) in accordance with the communication preferences as described above. As previously described, in the returns context, the carrier system 100 may provide notifications to customers (e.g., operating customer computing devices 110/120) when an RMA has been approved, when a customer-defined handling identifier has been assigned, when an item has been collected by a carrier, when a minimum number of items have been consolidated by a carrier, when an item reaches various points in the carrier's transportation and logistics network, when an item has been shipped and is being transported by a carrier (e.g., confirmed as being in transit), when an item has been repaired or refurbished, when an item has been recycled or disposed of, when an item has been returned to the appropriate returns location, when an item has been returned to the appropriate returns location and has been inspected upon return, and/or the like. As a result of such notifications, an appropriate computing entity (e.g., carrier system 100, customer computing device 110/120, payment system) can automatically determine regularly, periodically, continuously, or in response to certain triggers (e.g., notifications received) whether a refund payment should be initiated based on the refund classification corresponding to the appropriate item or items.

Continuing with the above example, once the RMA is generated for the item corresponding to shipment identifier 123456789, an appropriate computing entity (e.g., carrier system 100, customer computing device 110/120, payment system) can receive such a notification and initiate payment of the refund based at least in part on the refund classification R1 and its associated refund parameters (e.g., triggering events). Similarly, once the item corresponding to shipment identifier 123456788 has been received by the carrier, an appropriate computing entity (e.g., carrier system 100, customer computing device 110/120, payment system) can receive such a notification and initiate payment of the refund based at least in part on the refund classification R2 and its associated refund parameters (e.g., triggering events). Further, once the item corresponding to shipment identifier 123456787 has been delivered by the carrier as a return, the appropriate computing entity (e.g., carrier system 100, customer computing device 110/120, payment system) can receive such a notification and initiate payment of the refund based at least in part on the refund classification R3 and its associated refund parameters (e.g., triggering events). And once the item corresponding to shipment identifier 123456786 has been delivered by the carrier as a return and has been inspected by the customer (e.g., original vendor), the appropriate computing entity (e.g., carrier system 100, customer computing device 110/120, payment system) can receive such a notification and initiate payment of the refund based at least in part on the refund classification R4 and its associated refund parameters (e.g., triggering events).

In one embodiment, once a refund is initiated by the appropriate computing entity, a payment system may complete the refund to the customer (e.g., purchaser). As previously described, such payments/refunds may be in a variety of forms, including via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Notification of the processed refund can also be provided to the customers (e.g., operating customer computing devices 110/120). As will be recognized, a variety of techniques and approaches can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for generating and using machine-readable handling identifiers, the method comprising:
via one or more processors:
receiving an electronic request to return an item, the electronic request input by a user selecting a visible indicia displayed by an interactive user interface executing on a user device;
determining whether to authorize the return of the item based on programmatically applying a first plurality of business rules for processing returns;
generating one machine-readable handling identifier associated with the item when programmatically applying the first plurality of business rules for processing the returns determines that the return of the item is authorized, wherein the one machine-readable handling identifier is a single Quick Response code or a single Maxi Code, wherein the single Quick Response code or the single Maxi Code comprises a collection method portion, a return category portion, and a delivery point portion, wherein:
the collection method portion indicating at least one collection method for the authorized return of the item based on a second plurality of business rules defined by a carrier, wherein the second plurality of business rules specify, based on a particular class of the item, at least one of a personnel pickup of the item, a carrier-specific drop-off location, or a carrier-designated drop-off location that is authorized by the carrier as the at least one collection method for facilitating the authorized return of the item,
the return category portion indicating whether to consolidate the item with other items at a consolidation location based on the second plurality of business rules, and
the delivery point portion indicating the delivery destination of the item after any consolidation with the other items based on the second plurality of business rules;
generating a shipping label in a digital format that is enabled for printing by a printing device, wherein the shipping label includes the one machine-readable handling identifier;
capturing an image of the one machine-readable handling identifier from the shipping label using a scanning device in a carrier's transportation network; and
responsive to capturing the image of the one machine-readable handling identifier from the shipping label of a parcel for the item:
programmatically determining which of the collection method portion, the return category portion, and the delivery point portion is currently applicable based on tracking data for the parcel,
programmatically determining whether data associated with the captured image complies with the currently applicable portion of the one machine readable handling identifier, and
when the data associated with the captured image is determined to comply with the currently applicable portion of the one machine readable handling identifier, generating and providing a visible indication that the data associated with the captured image complies with the currently applicable portion of the one machine readable handling identifier.

2. The method of claim 1, the delivery point portion further indicates actions to be performed at the delivery destination.

3. The method of claim 1 further comprising associating, by a processor, a return merchandise authorization with the item.

4. The method of claim 1 further comprising programmatically determining, by a processor, whether the collection method indicated in the collection method portion is available for the item.

5. The method of claim 1 further comprising programmatically determining, by a processor, whether to consolidate the item with the other items based on the return category portion.

6. The method of claim 1 further comprising programmatically determining, by a processor, the delivery destination of the item based on the delivery point portion.

7. An apparatus comprising at least one processor and at least one memory including program code, the at least one memory and the program code configured to, with the processor, cause the apparatus to at least:
receive an electronic request to return an item, the electronic request input by a user selection of a visible indicia displayed by an interactive user interface executing on a user device;
determine whether to authorize the return of the item based on programmatically applying a first plurality of business rules for processing returns;
generate one machine-readable handling identifier associated with the item when programmatically applying the first plurality of business rules for processing the returns determines that the return of the item is authorized, wherein the one machine-readable handling identifier is a single Quick Response code or a single Maxi Code, wherein the single Quick Response code or the single Maxi Code comprises a collection method portion, a return category portion, and a delivery point portion, wherein:
the collection method portion indicating collection methods for the authorized return of the item based on a second plurality of business rules defined by a carrier, wherein the second plurality of business rules specify, based on a particular class of the item, two or more of a personnel pickup of the item, a carrier-specific drop-off location, or a carrier-designated drop-off location that is authorized by the carrier as the collection methods for facilitating the authorized return of the item,
the return category portion indicating whether to consolidate the item with other items at a consolidation location based on the second plurality of business rules, and
the delivery point portion indicating a delivery destination of the item after any consolidation with similar items based on the second plurality of business rules;
generate a shipping label in a digital format that is enabled for printing by a printing device, wherein the shipping label includes the one machine-readable handling identifier;
capture an image of the one machine-readable handling identifier from the shipping label using a scanning device in a carrier's transportation network; and
responsive to capturing the image of the one machine-readable handling identifier from the shipping label of a parcel for the item:
programmatically determine which of the collection method portion, the return category portion, and the delivery point portion is currently applicable based on tracking data for the parcel,
programmatically determine whether data associated with the captured image complies with the currently applicable portion of the one machine readable handling identifier, and
when it is determined that the data associated with the captured image complies with the currently applicable portion of the one machine readable handling identifier, generate and provide a visible indication that the data associated with the captured image complies with the currently applicable portion of the one machine readable handling identifier.

8. The apparatus claim 7, wherein the delivery point portion further indicates actions to be performed at the delivery destination.

9. The apparatus claim 7, wherein the memory and program code are further configured to, with the processor, cause the apparatus to associate a return merchandise authorization with the item.

10. The apparatus claim 7, wherein the memory and program code are further configured to, with the processor, cause the apparatus to determine whether the collection method indicated in the collection method portion is available for the item.

11. The apparatus claim 7, wherein the memory and program code are further configured to, with the processor, cause the apparatus to determine whether to consolidate the item with other items based on the return category portion.

12. The apparatus claim 7, wherein the memory and program code are further configured to, with the processor, cause the apparatus to determine the delivery destination of the item based on the delivery point portion.

13. A computer program product, the computer program product comprising at least one non-transitory computer-readable storage medium having computer-readable program code portions stored therein, the computer-readable program code portions comprising:
one or more executable portions that:
receive an electronic request to return an item, the electronic request input by a user selection of a visible indicia displayed by an interactive user interface executing on a user device;
determine whether to authorize the return of the item based on programmatically applying a first plurality of business rules for processing returns;
generate one machine-readable handling identifier associated with the item when programmatically applying the first plurality of business rules for processing the returns determines that the return of the item is authorized, wherein the one machine-readable handling identifier is a single Quick Response code or a single Maxi Code, wherein the single Quick Response Code or the single Maxi Code comprises a collection method portion, a return category portion, and a delivery point portion, wherein:
the collection method portion of the machine-readable handling identifier indicating one or more collection methods for the authorized return or the item based on a second plurality of business rules defined by a carrier, wherein the second plurality of business rules specify, based on a particular class of the item, at least one of a personnel pickup of the item, a carrier-specific drop-off location, or a carrier-designated drop-off location that is authorized by the carrier as the one or more collection methods for facilitating the authorized return of the item, the return category portion indicating whether to consolidate the item with other items at an intermediate consolidation location based on the second plurality of business rules, and the delivery point portion of the machine-readable handling identifier indicating a delivery destination of the item after any consolidation with other items based on the second plurality of business rules;

generate a shipping label in a digital format that is enabled for printing by a printing device, wherein the shipping label includes the one machine-readable handling identifier;

capture an image of the one machine-readable handling identifier from the shipping label using a scanning device in a carrier's transportation network; and responsive to capturing the image of the one machine-readable handling identifier from the shipping label associated with a parcel for the item:
  programmatically determine which of the collection method portion, the return category portion, and the delivery point portion is currently applicable based on tracking data for the parcel,
  programmatically determine whether data associated with the captured image complies with the currently applicable portion of the one machine readable handling identifier, and
  when it is determined that the data associated with the captured image complies with the currently applicable portion of the one machine readable identifier, generate and provide a visible indication that the data associated with the captured image complies with the currently applicable portion of the one machine readable handling identifier.

14. The computer program product of claim 13, wherein the delivery point portion further indicates actions to be performed at the delivery destination.

15. The computer program product of claim 13 further comprising an executable portion configured to associate a return merchandise authorization with the item.

16. The computer program product of claim 13 further comprising an executable portion configured to determine whether the collection method is available for the item based on the collection method portion.

17. The computer program product of claim 13 further comprising an executable portion configured to determine whether to consolidate the item with similar items based on the return category portion.

18. The computer program product of claim 13 further comprising an executable portion configured to determine the delivery destination of the item based on the delivery point portion.

* * * * *

UNITED STATES PATENT AND TRADEMARK OFFICE
CERTIFICATE OF CORRECTION

PATENT NO. : 10,664,787 B2
APPLICATION NO. : 14/049605
DATED : May 26, 2020
INVENTOR(S) : Carrie Parris Page 1 of 1

It is certified that error appears in the above-identified patent and that said Letters Patent is hereby corrected as shown below:

On the Title Page

On page 6, in Column 1, item (56), Other Publications, Line 54, delete "Dedesigned" and insert -- Redesigned --, therefor.

On page 6, in Column 2, item (56), Other Publications, Line 6, delete "Applicaton" and insert -- Application --, therefor.

In the Specification

In Column 5, Line 44, delete "datan" and insert -- data --, therefor.

In Column 15, Line 56, delete "11:45 am-3:45pm" and insert -- 11:45 am-3:45 pm --, therefor.

In the Claims

In Column 38, Line 13, Claim 8, before "claim" insert -- of --.

In Column 38, Line 16, Claim 9, before "claim" insert -- of --.

In Column 38, Line 20, Claim 10, before "claim" insert -- of --.

In Column 38, Line 25, Claim 11, before "claim" insert -- of --.

In Column 38, Line 29, Claim 12, before "claim" insert -- of --.

Signed and Sealed this
First Day of September, 2020

Andrei Iancu
*Director of the United States Patent and Trademark Office*